US012754014B2

(12) United States Patent
Fuyuno et al.

(10) Patent No.: US 12,754,014 B2
(45) Date of Patent: Oct. 6, 2026

(54) OPTICAL DISPLACEMENT METER

(71) Applicant: Keyence Corporation, Osaka (JP)

(72) Inventors: Akira Fuyuno, Osaka (JP); Tatsuro Homma, Osaka (JP); Izumi Mori, Osaka (JP); Atsushi Sube, Osaka (JP)

(73) Assignee: KEYENCE CORPORATION, Osaka (JP)

(*) Notice: Subject to any disclaimer, the term of this patent is extended or adjusted under 35 U.S.C. 154(b) by 107 days.

(21) Appl. No.: 18/780,680

(22) Filed: Jul. 23, 2024

(65) Prior Publication Data

US 2025/0076033 A1 Mar. 6, 2025

(30) Foreign Application Priority Data

Aug. 30, 2023 (JP) ................................ 2023-139428
Apr. 16, 2024 (JP) ................................ 2024-065851

(51) Int. Cl.
*G01B 11/25* (2006.01)

(52) U.S. Cl.
CPC ................................ *G01B 11/2518* (2013.01)

(58) Field of Classification Search
CPC ................................................ G01B 11/2518
See application file for complete search history.

(56) References Cited

U.S. PATENT DOCUMENTS 10,746,529 B1 8/2020 Miyagawa
10,746,536 B2 8/2020 Tsuchida
10,767,976 B2 9/2020 Tsuchida
10,921,114 B2 2/2021 Fuyuno et al.
11,073,376 B2 7/2021 Fuyuno
11,112,236 B2 9/2021 Homma
11,293,749 B2 4/2022 Tsuchida
(Continued)

FOREIGN PATENT DOCUMENTS

CN 210664364 U 6/2020
EP 3232152 A1 10/2017
(Continued)

OTHER PUBLICATIONS

U.S. Appl. No. 19/095,066, filed Mar. 31, 2025 (58 pages).
(Continued)

*Primary Examiner* — Michelle M Iacoletti
*Assistant Examiner* — Alexandria Mendoza
(74) *Attorney, Agent, or Firm* — Kilyk & Bowersox, P.L.L.C.

(57) ABSTRACT

Provided is an optical displacement meter capable of solving problems such as dustproof and safety at the time of an operation and acquiring profiles of a plurality of positions of a workpiece with high accuracy without providing a conveyor or a linear motion mechanism. An optical displacement meter includes a light projecting and receiving module that integrally holds a light projecting unit, a light collecting unit, and a capturing unit to have a Scheimpflug relationship, a motor that integrally rotates the light projecting and receiving module, a housing that stores the light projecting and receiving module, and a control unit that controls the motor, and rotates the light projecting and receiving module in a state where the Scheimpflug relationship is maintained inside the housing to scan the slit light in a direction orthogonal to an X direction.

20 Claims, 33 Drawing Sheets

(56) References Cited

U.S. PATENT DOCUMENTS

| | | | | |
|---|---|---|---|---|
| 11,747,136 | B2 | 9/2023 | Fujimoto | |
| 12,000,688 | B2 | 6/2024 | Kanayama et al. | |
| 2021/0140757 | A1* | 5/2021 | Fuyuno | G01B 11/04 |
| 2022/0107489 | A1* | 4/2022 | Tobisch | G02B 7/06 |
| 2022/0163321 | A1* | 5/2022 | Minamigawa | G01B 11/254 |
| 2024/0271925 | A1 | 8/2024 | Kanayama et al. | |

FOREIGN PATENT DOCUMENTS

| | | | | | |
|---|---|---|---|---|---|
| EP | 3798568 | A1 | * | 3/2021 | G01B 11/24 |
| JP | H08145675 | A | * | 6/1996 | |

OTHER PUBLICATIONS

U.S. Appl. No. 19/095,069, filed Mar. 31, 2025 (64 pages).
U.S. Appl. No. 18/780,568, filed Jul. 23, 2024 (61 pages).
U.S. Appl. No. 18/780,584, filed Jul. 23, 2024 (64 pages).
U.S. Appl. No. 18/780,601, filed Jul. 23, 2024 (38 pages).
U.S. Appl. No. 18/780,619, filed Jul. 23, 2024 (47 pages).
U.S. Appl. No. 18/780,710, filed Jul. 23, 2024 (92 pages).

* cited by examiner

OPTICAL DISPLACEMENT METER

CROSS-REFERENCE TO RELATED APPLICATIONS

The present application claims foreign priority based on Japanese Patent Application No. 2023-139428, filed Aug. 30, 2023, and No. 2024-065851, filed Apr. 16, 2024, the contents of which are incorporated herein by references.

BACKGROUND OF THE INVENTION

1. Technical Field

The disclosure relates to an optical displacement meter that measures displacement of a workpiece by using light.

2. Description of the Related Art

As an optical displacement meter, for example, there is known an optical displacement meter configured to be able to acquire an XZ sectional profile by irradiating a workpiece with slit light extending in an X direction and receiving reflected light reflected on a surface of the workpiece.

It is possible to generate data of a three-dimensional shape of the workpiece by acquiring a plurality of XZ sectional profiles at different positions in a Y direction of the workpiece. However, in this case, equipment such as a conveyor for conveying the workpiece in the Y direction and a linear motion mechanism for moving a displacement meter body in the Y direction with respect to the workpiece is required, and introduction may be difficult.

On the other hand, for example, as in EP3232152A and CN210664364Y, a structure in which a light projecting system that projects slit light and a light receiving system that receives reflected light (collectively referred to as a light projecting and receiving system) is configured to be rotatable and the light projecting and receiving system is rotated such that the slit light is scanned in a Y direction with respect to the workpiece is known.

Incidentally, the light projecting and receiving system is rotated as in EP3232152A and CN210664364Y, and thus, it is possible to acquire a plurality of sectional profiles at different positions of the workpiece without providing equipment such as a conveyor and a linear motion mechanism. As a result, there is advantageous in that introduction is facilitated.

However, in order to acquire a profile with high accuracy regardless of a rotation angle of the light projecting and receiving system, it is important to have a so-called Scheimpflug optical system in which a light receiving surface of a capturing unit is inclined with respect to an optical axis of a lens such that a depth of field in a Z direction becomes deep. However, since the Scheimpflug optical system is not maintained in EP3232152A, it is considered that it is difficult to obtain a profile with high accuracy.

In addition, when an actual operation is considered, it is assumed that the light projecting and receiving system is stored in a housing for dustproof and disturbance light countermeasures. In addition to the dustproof and disturbance light countermeasures, as long as there is no housing, since the rotating light projecting and receiving system is exposed, it is visually troublesome. It is also necessary to consider safety not to come into contact with the rotating light projecting and receiving system. However, since neither EP3232152A nor CN210664364Y discloses the housing capable of storing the light projecting and receiving system, it is considered that various problems such as dustproof, disturbance light countermeasures, visual troublesome, and safety may occur.

SUMMARY OF THE INVENTION

The disclosure has been made in view of such a point, and an object of the disclosure is to provide an optical displacement meter capable of solving problems such as dustproof and safety at the time of an operation and acquiring profiles of a plurality of positions of a workpiece with high accuracy without providing a conveyor or a linear motion mechanism by setting a light projecting and receiving system maintaining a Scheimpflug optical system to be rotatable inside a housing.

In order to achieve the above object, in one embodiment, an optical displacement meter that measures displacement of a workpiece by using light can be assumed. An optical displacement meter comprises a light projecting and receiving module including a light projecting unit that applies slit light extending in an X direction, a light collecting unit that has a light receiving lens which collects reflected light reflected by a workpiece, a capturing unit that receives the light collected by the light collecting unit, and a support member which integrally holds the light projecting unit, the light collecting unit, and the capturing unit to have a Scheimpflug relationship in which a light receiving surface of the capturing unit is inclined with respect to an optical axis of the light receiving lens. The optical displacement meter further comprises a motor that integrally rotates the light projecting and receiving module, and a housing that stores the light projecting and receiving module. The optical displacement meter further includes a control unit that controls the motor, and rotates the light projecting and receiving module in a state where the Scheimpflug relationship is maintained inside the housing to scan the slit light in a direction orthogonal to the X direction.

According to this configuration, when the light projecting and receiving module is rotated in a state where the housing is fixed, the slit light extending in the X direction with respect to the workpiece is scanned in a direction orthogonal to the X direction. As a result, it is possible to generate the data of the three-dimensional shape of the workpiece by acquiring the plurality of sectional profiles at different rotation angles of the workpiece while eliminating the need for equipment such as a conveyor for conveying the workpiece in the Y direction and the linear motion mechanism for moving the displacement meter body in the Y direction with respect to the workpiece. In addition, since the light projecting and receiving module rotates in a state of being stored in the housing, dustproof and disturbance light countermeasures can be performed, visual troublesome is eliminated, and safety when the light projecting and receiving module rotates is further enhanced.

In addition, since the Scheimpflug relationship is maintained when the light projecting and receiving module is rotated, it is possible to maintain the formation of a focal plane in a light projecting direction of the light projecting unit. Thus, it is possible to acquire the profile with high accuracy.

As described above, since the slit light can be scanned in the direction orthogonal to the X direction by rotating the light projecting and receiving module having the Scheimpflug relationship in the state of being stored in the housing, it is possible to acquire the profiles of the plurality of positions of the workpiece with high accuracy without providing the conveyor or the linear motion mechanism while solving problems such as dustproof and safety at the time of the operation.

DETAILED DESCRIPTION

Hereinafter, embodiments of the invention will be described in detail with reference to the drawings. Note that, the following description of preferred embodiments is merely exemplary in nature and is not intended to limit the invention, an application thereof, or an intended use thereof.

First Embodiment

Figure 1:
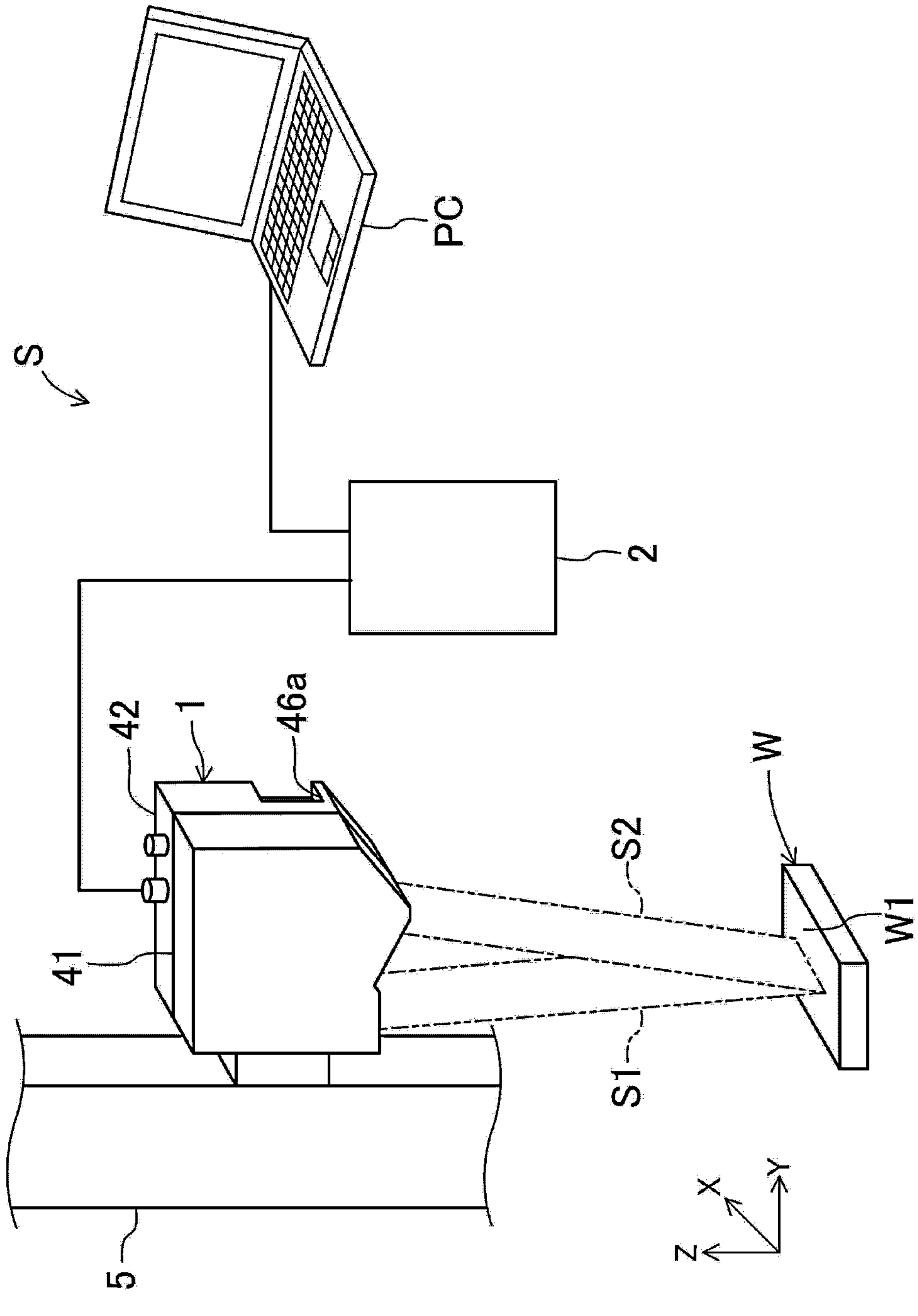
FIG. 1 is a diagram for explaining an optical displacement meter according to a first embodiment of the invention at the time of an operation.

FIG. 1 is a diagram illustrating an optical displacement meter 1 according to a first embodiment of the invention at the time of an operation. The optical displacement meter 1 is an example of a light sectioning type optical displacement meter that measures a sectional profile of a workpiece W (measurement object) having a height in a Z direction by using slit light S1 based on the principle of triangulation. In the present embodiment, although an example in which an inspection system S includes the optical displacement meter 1, a controller 2, and a personal computer PC will be described, the invention is not limited to this configuration example, and for example, a programmable logic controller (PLC) or the like may be included in the inspection system S.

At the time of setting before an operation of the inspection system S, for example, various inspection settings can be performed by the controller 2 and the personal computer PC. At the time of an operation after setting, the optical displacement meter 1 measures displacement of the workpiece W at a predetermined timing. Data indicating a measurement result is transmitted from the optical displacement meter 1 to the controller 2 or the personal computer PC, and the inspection based on the inspection setting is executed. The data indicating the measurement result of the optical displacement meter 1, an inspection result, and the like can be stored in the controller 2 or the personal computer PC.

At the time of the operation, it is also possible to operate only the optical displacement meter 1 without using the controller 2 and the personal computer PC, and an operation mode is not limited to the operation mode illustrated in FIG. 1. Note that, in the following description, although the inspection system S including the optical displacement meter 1 will be described, the invention is also applicable to a case where the inspection system S is operated only by the optical displacement meter 1 or a case where the inspection system S is operated by a system in which the optical displacement meter 1 and the PLC are combined.

The inspection system S is a system that executes appearance inspection of the workpiece W in-line. In the in-line appearance inspection, for example, the appearance inspection of the workpiece W is sequentially executed at a site where a plurality of workpieces W are sequentially conveyed. As illustrated in FIG. 1, an X direction, a Y direction, and a Z direction of the workpiece W are defined. The X direction and the Y direction are directions orthogonal to each other in plan view of the workpiece W. The Z direction is a height direction of the workpiece W, and is a direction orthogonal to the X direction and orthogonal to the Y direction. Although the X direction of the workpiece W can be referred to as a depth direction of the workpiece W, and the Y direction of the workpiece W can be referred to as a width direction of the workpiece W, this definition is an example, and the X direction, the Y direction, and the Z direction of the workpiece W can be randomly defined.

Since height data of the workpiece W can be acquired by the optical displacement meter 1, the appearance inspection includes dimensional inspection, shape inspection, defect inspection, and the like based on the height data. The workpiece W is not particularly limited, and examples thereof include various components, members, devices, instruments, and parts thereof. The workpiece W can also be referred to as a measurement object. After the workpiece W is conveyed to a measurable region of the optical displacement meter 1 by a conveying device (not illustrated), the displacement is measured by the optical displacement meter 1.

The optical displacement meter 1 is used, for example, in a state of being fixed to an attachment member 5. The attachment member 5 is a part of equipment installed in a factory or the like, and is fixed not to move relative to the workpiece W. Thus, the optical displacement meter 1 also does not move relative to the workpiece W. Although details will be described later, even though the optical displacement meter 1 is fixed to the attachment member 5, an internal projecting and receiving module 10 (illustrated in FIG. 4) can rotate about an axis parallel to the X direction, and thus, the slit light S1 extending in the X direction of the workpiece W is scanned from a light projecting and receiving module 10 in a direction orthogonal to the X direction of the workpiece W. As a result, reflected light S2 reflected at a plurality of locations in the Y direction on a surface W1 of the workpiece W can be received by the light projecting and receiving module 10. As described above, even in a case where the light projecting and receiving module 10 is rotated about the axis parallel to the X direction, the surface W1 of the workpiece W can be scanned with the slit light S1 as in a case where the workpiece W or the optical displacement meter 1 is linearly moved. Note that, since the optical displacement meter 1 scans the slit light S1 by rotating the light projecting and receiving module 10, a scanning direction of the slit light S1 is a direction orthogonal to the X direction on a YZ plane including the Y direction. Note that, in the present specification, "rotation" means swinging motion that reciprocates around a rotation shaft.

Signal processing is executed based on a light reception amount of reflected light S2, it is possible to acquire a plurality of sectional profiles of the workpiece W at different rotation angles. Data (height data) of a three-dimensional shape of the workpiece W can be generated based on the acquired sectional profile. Note that, since the slit light S1 rotates, the sectional profile is not necessarily parallel to an XZ plane.

As described above, the light projecting and receiving module 10 provided inside the optical displacement meter 1 is set to be rotatable, and thus, it is possible to acquire the plurality of sectional profiles of the workpiece W at the different rotation angles without conveying the workpiece W in the Y direction and without moving the optical displacement meter 1 in the Y direction with respect to the workpiece W. Accordingly, equipment such as a conveyor for conveying the workpiece W and a linear motion mechanism for moving the optical displacement meter 1 in the Y direction with respect to the workpiece W becomes unnecessary, and introduction of an inspection process using the optical displacement meter 1 becomes easy.

Note that, although the workpiece W may be set to be relatively movable with respect to the optical displacement meter 1, the plurality of sectional profiles can be acquired in a state where the workpiece W is stopped at the time of measurement. In addition, although the optical displacement meter 1 may be relatively movable with respect to the workpiece W, the plurality of sectional profiles can be acquired in a state where the optical displacement meter 1 is stopped at the time of measurement. The invention is not limited to a case where the optical displacement meter 1 is completely fixed, and may be movably supported with respect to the attachment member 5, or may be attached to a robot arm or the like and may be movable to an any measurement place.

Figure 2:
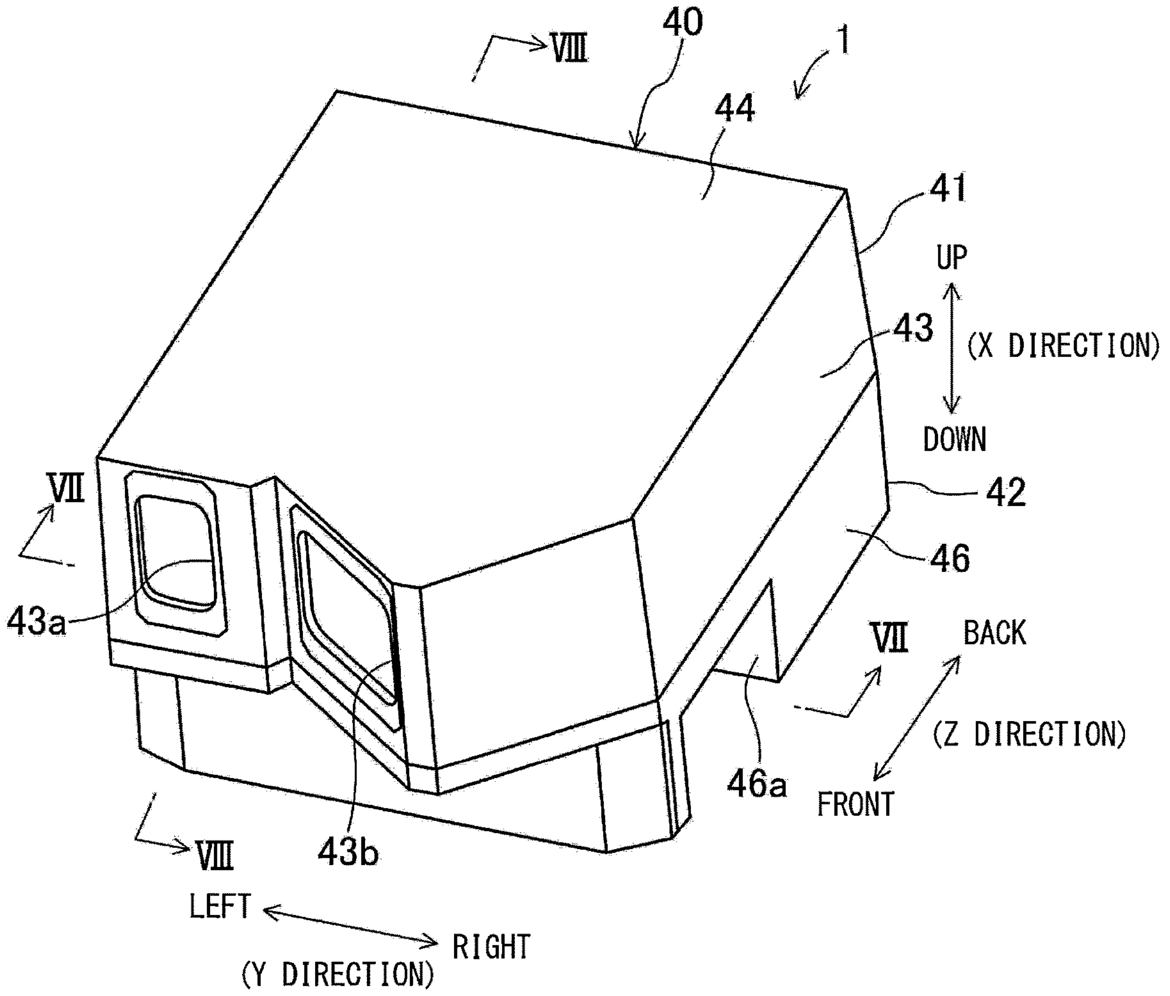
FIG. 2 is a perspective view of the optical displacement meter according to the first embodiment of the invention as viewed from above.
Figure 3:
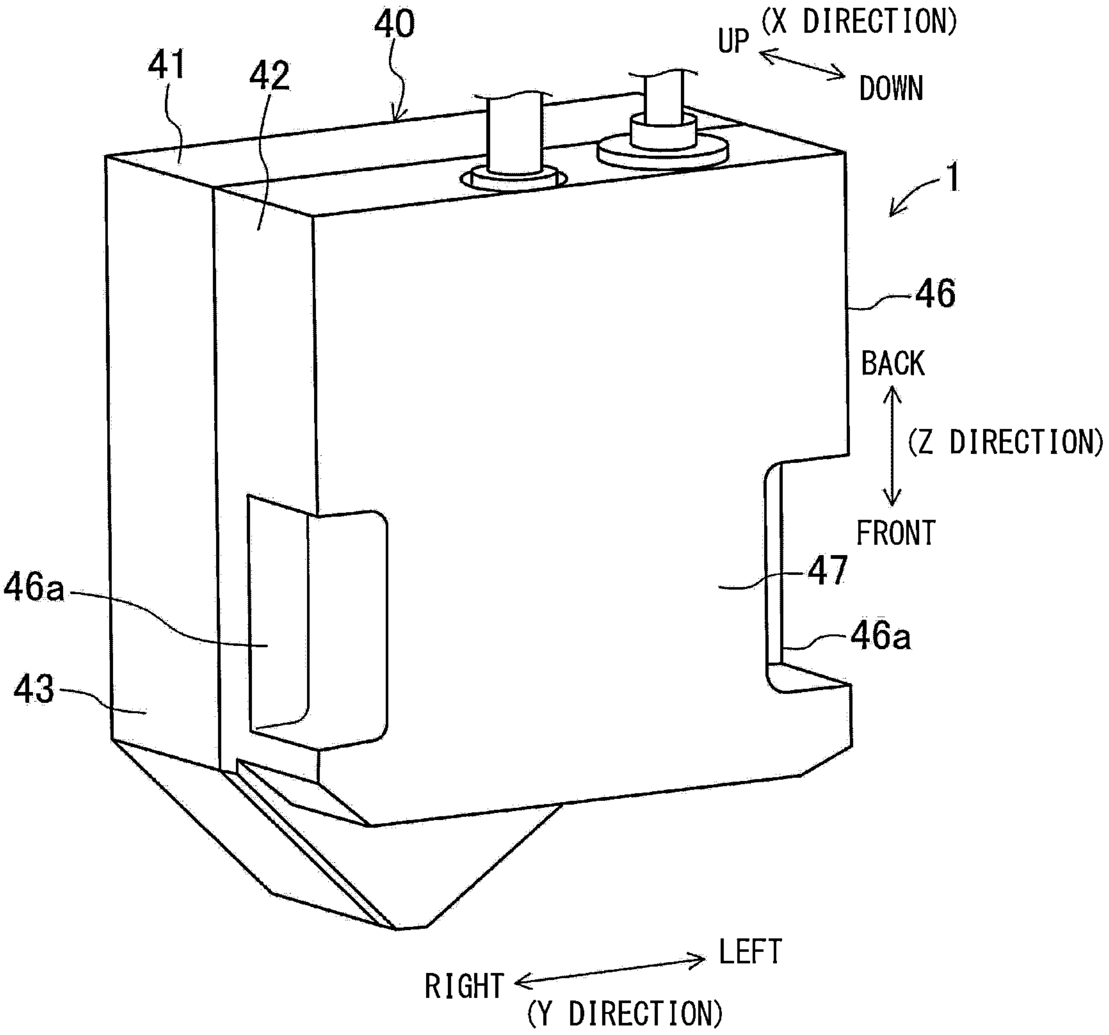
FIG. 3 is a perspective view of the optical displacement meter according to the first embodiment of the invention as viewed from below.

FIG. 2 is a perspective view of the optical displacement meter 1 according to the first embodiment of the invention as viewed from above, and FIG. 3 is a perspective view of the optical displacement meter 1 according to the first embodiment of the invention as viewed from below. As illustrated in each drawing, a left-right direction, a depth direction, and an up-down direction of the optical displacement meter 1 are defined, but are for the sake of convenience in description and do not limit a posture of the optical displacement meter 1 at the time of the operation. In the operation mode illustrated in FIG. 1, since the optical displacement meter 1 is installed above the workpiece W, the slit light S1 is emitted downward and the reflected light S2 travels upward. In this operation mode, the left-right direction of the optical displacement meter 1 corresponds to the Y direction of the workpiece W, the up-down direction of the optical displacement meter 1 corresponds to the X direction of the workpiece W, and the depth direction of the optical displacement meter 1 corresponds to the Z direction of the workpiece W. Note that, the optical displacement meter 1 may be installed such that the workpiece W is irradiated with the slit light S1 in a horizontal direction from the optical displacement meter 1, or the optical displacement meter 1 may be installed such that the workpiece W is irradiated with the slit light S1 downward from the optical displacement meter 1. A posture of the optical displacement meter 1 at the time of installation is not particularly limited.

Figure 4:
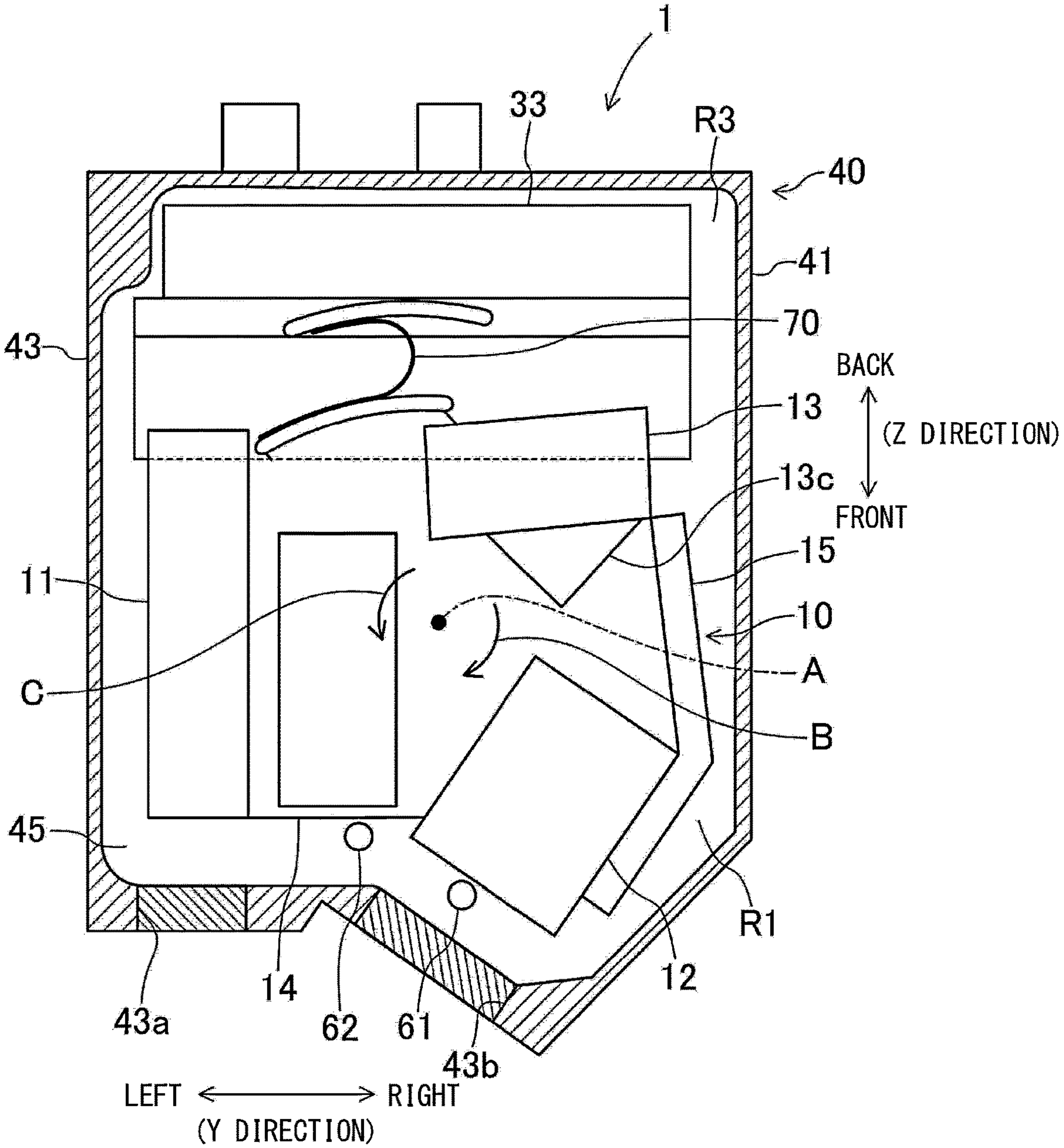
FIG. 4 is a plan view illustrating an inside of an upper space of the optical displacement meter according to the first embodiment of the invention.
Figure 5:
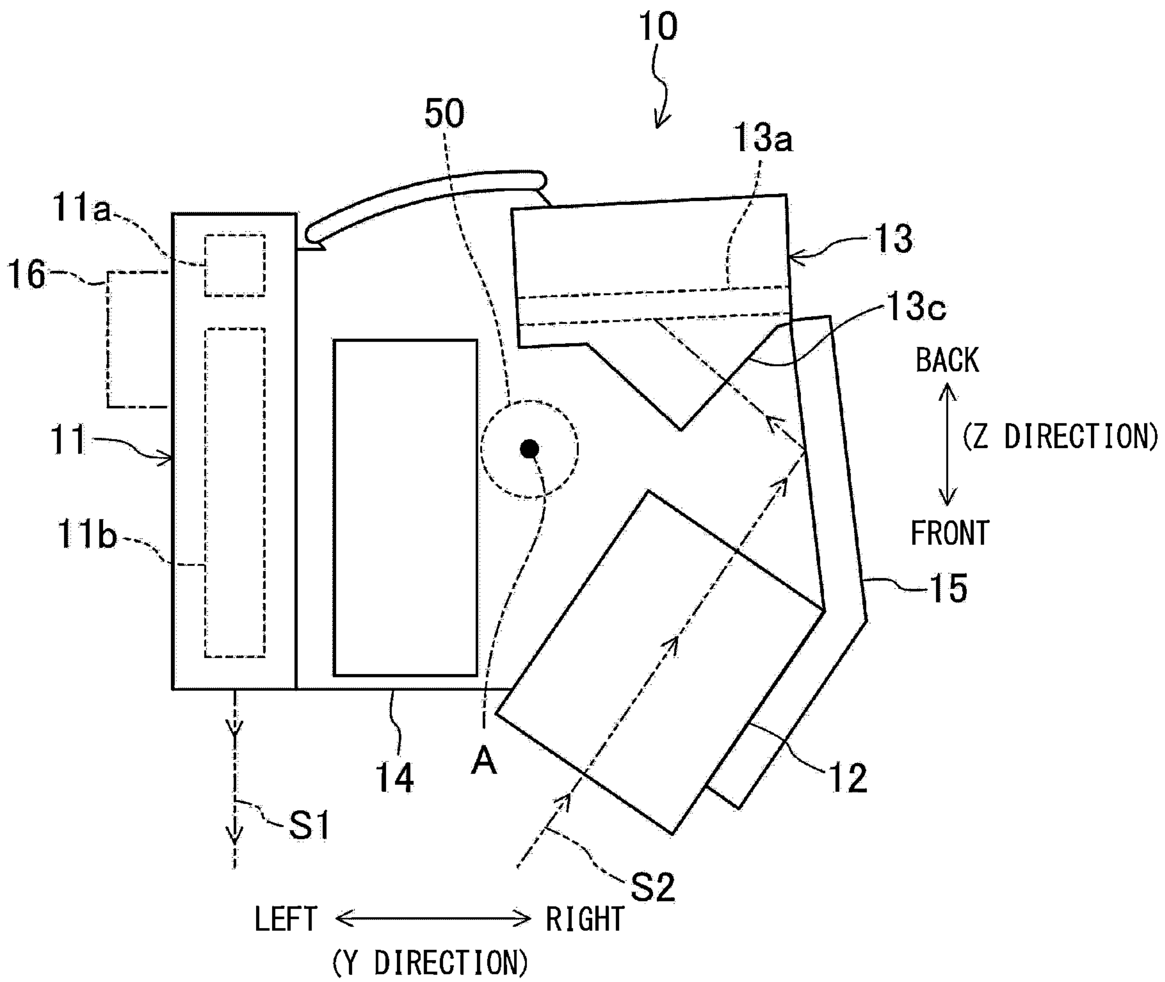
FIG. 5 is a plan view of a light projecting and receiving module of the optical displacement meter according to the first embodiment of the invention.
Figure 6:
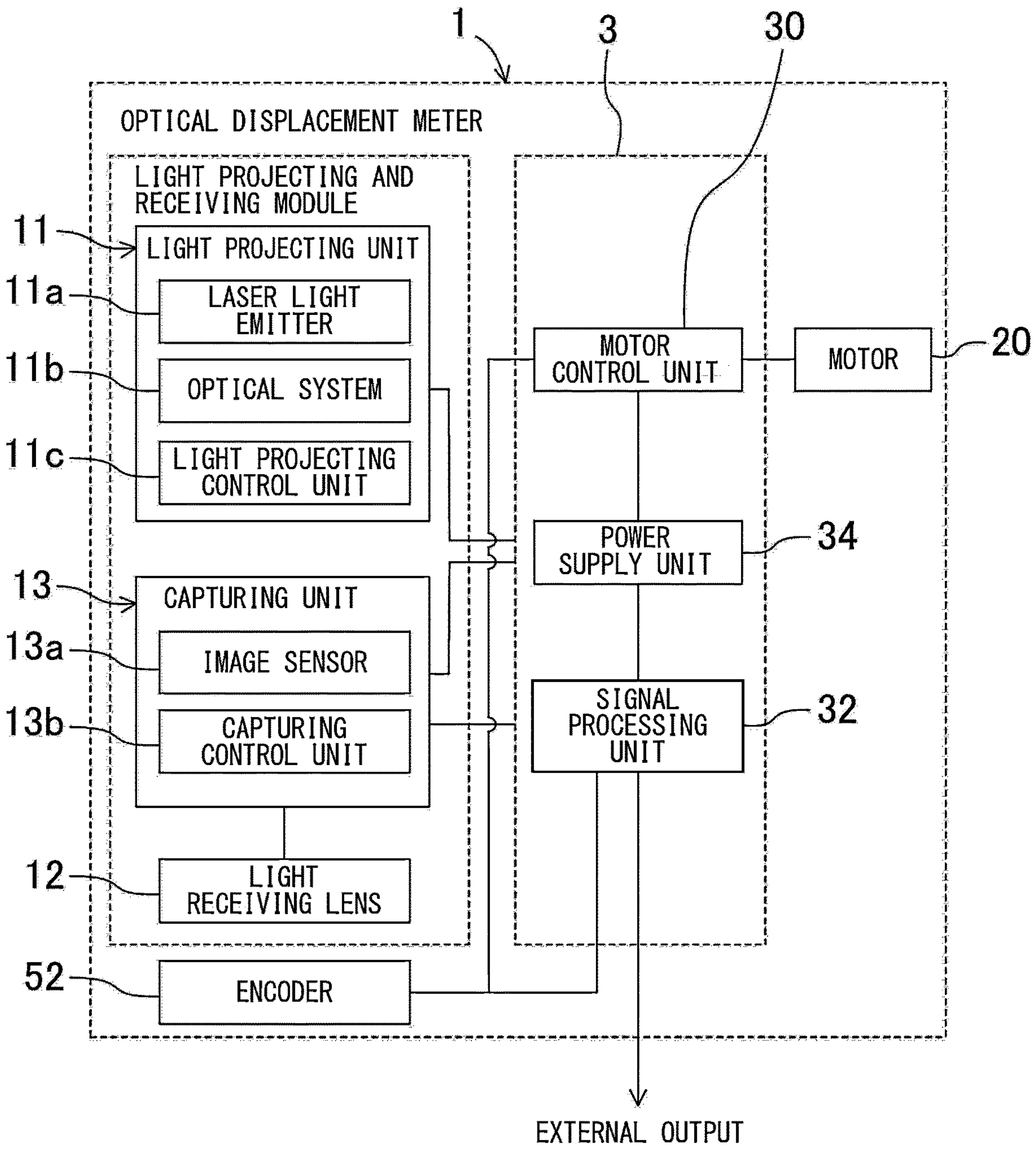
FIG. 6 is a block diagram illustrating a configuration of the optical displacement meter according to the first embodiment of the invention.

FIG. 4 is a diagram illustrating an internal structure of the optical displacement meter 1. The optical displacement meter 1 includes a light projecting and receiving module 10 (also illustrated in FIG. 5), a motor 20 (illustrated in FIG. 7) for rotating the light projecting and receiving module 10, a motor control unit 30 (illustrated in FIG. 8), and a housing 40. The light projecting and receiving module 10, the motor 20, and the motor control unit 30 are stored in the housing 40. As illustrated in FIG. 6, in the first embodiment, a control unit 3 includes the motor control unit 30, a power supply unit 34 (to be described later), and a signal processing unit 32 (to be described later). Note that, although the motor control unit 30 and the signal processing unit 32 are separately illustrated in FIG. 6 for the sake of convenience in description, the motor control unit 30 and the signal processing unit 32 may be integrated.

The light projecting and receiving module 10 includes a light projecting unit 11 that emits the slit light S1 extending in the X direction, a light collecting unit 12 having a light receiving lens that collects the reflected light S2 reflected by the workpiece W, a capturing unit 13 that receives the light collected by the light collecting unit 12, and a support member 14 that integrally holds the light projecting unit 11, the light collecting unit 12, and the capturing unit 13.

As illustrated in FIG. 6, the light projecting unit 11 includes a laser light emitter (light source) 11*a*, an optical system 11*b*, a light source housing that stores the laser light emitter 11*a* and the optical system 11*b*, and a light projection control unit 11*c* that controls the laser light emitter 11*a*. The laser light emitter 11*a* is controlled by the light projection control unit 11*c* to emit a predetermined light amount of laser light at a predetermined timing for a predetermined time. The light emitted from the laser light emitter 11*a* is incident on the optical system 11*b*. Although not illustrated, the optical system 11*b* includes a plurality of lenses including, for example, a cylindrical lens, and irradiates the workpiece W with the slit light S1 by spreading the incident laser light in a band shape. The light projecting unit 11 has a shape elongated in an irradiation direction of the slit light S1.

In order to improve the light reception amount, the light collecting unit 12 is formed as a lens unit including a plurality of large-diameter light receiving lenses, and includes a light receiving lens and a lens housing that stores the light receiving lens. Since such a plurality of large-diameter lenses are included and a size of the light collecting unit is relatively large, a weight of the light collecting unit 12 is larger than a weight of the light projecting unit 11.

The capturing unit 13 includes, for example, an image sensor 13*a* such as a complementary MOS (CMOS) and a capturing control unit 13*b*. The image sensor 13*a* is controlled by the capturing control unit 13*b* and executes capturing at a predetermined timing. An exposure time at the time of capturing by the image sensor 13*a* can be controlled by the capturing control unit 13*b*.

Figure 7:
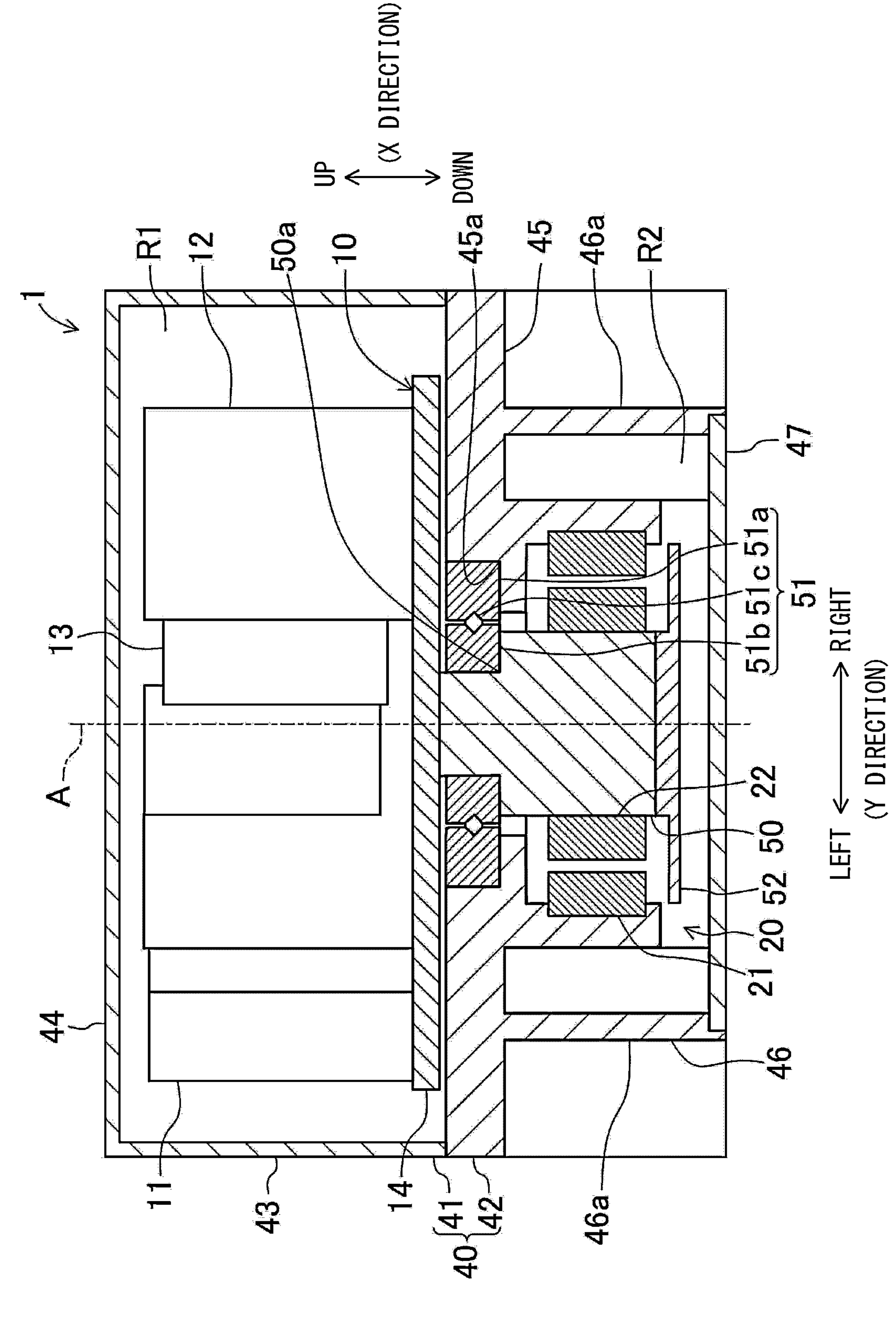
FIG. 7 is a sectional view taken along line VII-VII of FIG. 2.
Figure 8:
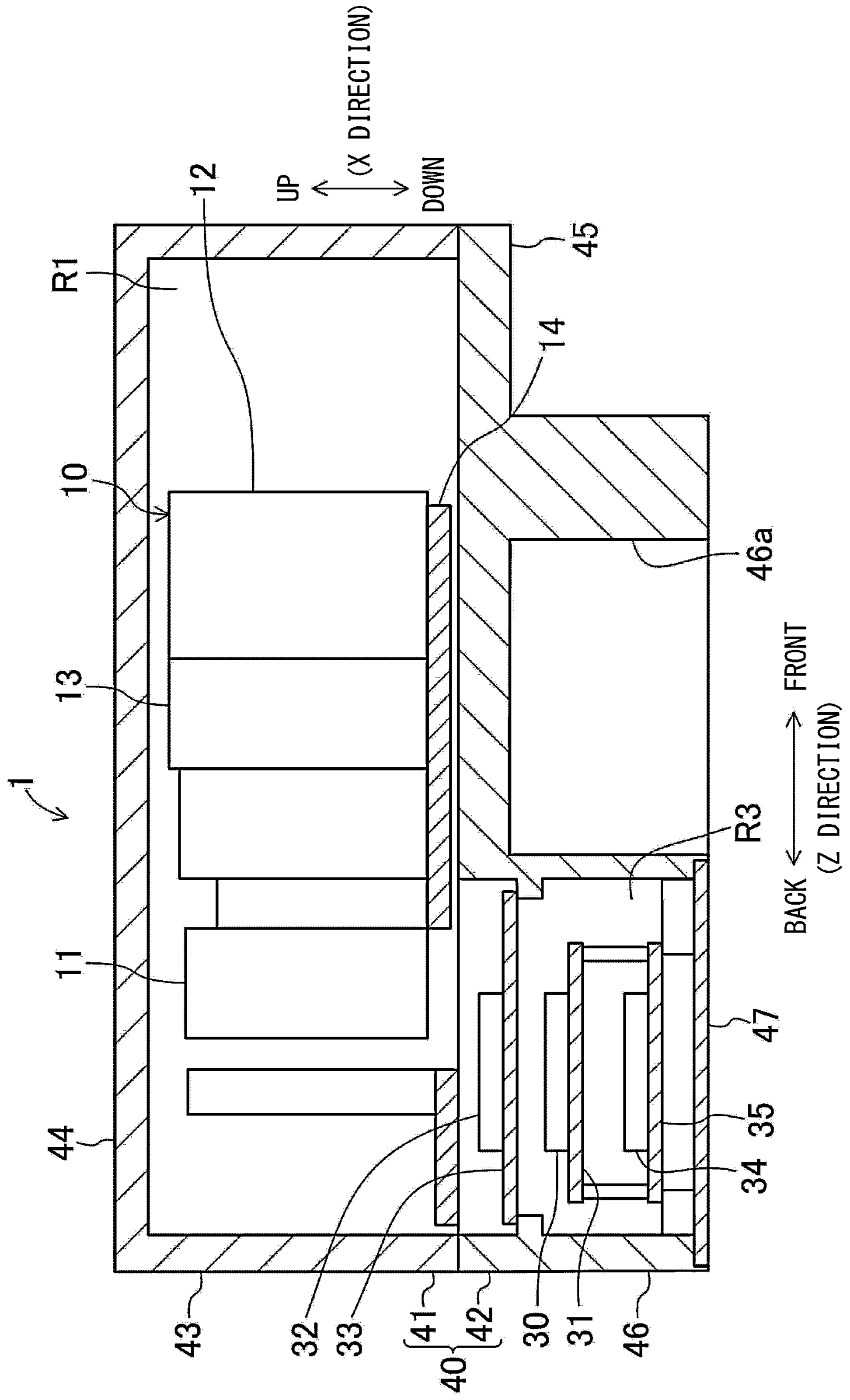
FIG. 8 is a sectional view taken along line VIII-VIII in FIG. 2.

As illustrated in FIGS. 7 and 8, the support member 14 is made of a flat plate-shaped high rigidity member, for example, a metal plate material. As illustrated in FIG. 7, the support member 14 is fixed to a rotation shaft 50 constituting a part of the optical displacement meter 1, and is supported by the housing 40 to be rotatable about a rotation center line A which is an axis of the rotation shaft 50. An extending direction of the support member 14 is a direction orthogonal to the rotation center line A.

The light projecting unit 11, the light collecting unit 12, and the capturing unit 13 are fixed to an upper surface of the support member 14. Specifically, in plan view of the light projecting and receiving module 10 illustrated in FIG. 5, the light projecting unit 11 is fixed to a left side portion of the support member 14 with respect to the rotation center line A, and the light collecting unit 12 and the capturing unit 13 are fixed to opposite sides thereof. As a result, the light projecting unit 11 and the light collecting unit 12 are provided at intervals in a radial direction (Y direction or Z direction) of the rotation shaft 50.

The light projecting unit 11 is disposed such that the irradiation direction of the slit light S1 is directed in the Z direction. The light collecting unit 12 is disposed such that an optical axis is along an incident direction of the reflected light S2 at a portion on a front side (workpiece W side) of the support member 14. Accordingly, although both the light projecting unit 11 and the light collecting unit 12 are directed in the Z direction, an optical axis of the optical system 11*b* of the light projecting unit 11 and an optical axis of the light collecting unit 12 (an optical axis of the light receiving lens) are in a relationship of intersecting each other at a location away from the light projecting and receiving module 10 in the Z direction. Since a distance in the left-right direction between the light projecting unit 11 and the light collecting unit 12 and the relationship between the optical axis of the optical system 11*b* of the light projecting unit 11 and the optical axis of the light collecting unit 12 can be changed in accordance with an installation distance of the optical displacement meter 1 with respect to the workpiece W, measurement accuracy, and the like, the illustrated example is merely an example.

The longer a distance between the light collecting unit 12 and the rotation shaft, the larger the moment of inertia of the light collecting unit 12 due to rotation. When a rotation direction of the light projecting and receiving module 10 is switched, it is necessary to temporarily stop the light projecting and receiving module 10. At this time, the larger the moment of inertia, the larger energy required to decelerate a rotational motion of the light projecting and receiving module 10. Thus, distance and time until the rotational motion stops are increased. Therefore, the light projecting and receiving module 10 further includes a light receiving side reflecting member 15 fixed to the support member 14. As a result, not only a size of the light projecting and receiving module 10 can be set to be compact, but also the moment of inertia due to rotation is reduced. Thus, a measurement interval is reduced. The light receiving side reflecting member 15 is made of, for example, a mirror, and the reflected light S2 emitted from the light collecting unit 12 is folded back toward the light projecting unit 11. Thus, a distance between the capturing unit 13 or the light collecting unit 12 and the rotation shaft 50 of the light projecting and receiving module 10 on the YZ plane is shortened. A folding direction may be, for example, a direction toward a center position of the housing 40 in the Y direction. The YZ plane is a plane including both a straight line extending in the Y direction and a straight line extending in the Z direction, and is a plane orthogonal to the X direction.

Specifically, the light receiving side reflecting member 15 is positioned at a right end portion of the support member 14 on a back side of the light collecting unit 12, is disposed on an optical path between the capturing unit 13 and the light collecting unit 12 on the YZ plane, and reflects the light collected by the light collecting unit 12 toward the capturing unit 13. In addition, the rotation shaft 50 of the light projecting and receiving module 10 is disposed between the light receiving side reflecting member 15 and the light projecting unit 11 on the YZ plane.

The light receiving side reflecting member 15 is disposed on the optical path between the capturing unit 13 and the light collecting unit 12, and thus, the light after being collected by the light collecting unit 12 may be reflected. As a result, an area of the light receiving side reflecting member 15 can be reduced. Note that, a position of the light receiving side reflecting member 15 may not be on the optical path between the capturing unit 13 and the light collecting unit 12, and the light collecting unit 12 may be disposed on an optical path between the light receiving side reflecting member 15 and the capturing unit 13 as in a first modification (illustrated in FIG. 10) to be described later.

The light receiving side reflecting member 15 protrudes upward from the upper surface of the support member 14. In addition, an extending direction of the light receiving side reflecting member 15 is the depth direction. An emission direction of the reflected light S2 incident on the light receiving side reflecting member 15 can be set by an installation angle of the light receiving side reflecting member 15, and the emission direction of the reflected light S2 is directed to a light receiving surface of the image sensor 13*a*.

A positional relationship between the image sensor 13*a* of the capturing unit 13 and the optical axis of the light collecting unit 12 is set to have a Scheimpflug relationship in which the light receiving surface of the image sensor 13*a* is inclined with respect to the optical axis of the light collecting unit 12. The optical system satisfying the Scheimpflug relationship can be referred to as a Scheimpflug optical system. In this embodiment, the light projecting unit 11, the light collecting unit 12, and the capturing unit 13 are integrally held by the support member 14 to have the Scheimpflug relationship, and thus, the light projecting and receiving module 10 is formed. With the Scheimpflug relationship, since the slit light is focused along a light projection axis of the light projecting unit 11, a profile image focused on the reflected light reflected by the workpiece W can be acquired. Thus, measurement accuracy of three-dimensional shape data of the workpiece W is improved, and as a result, a highly accurate profile can be acquired.

Even in a case where the light projecting and receiving module 10 is rotated about the rotation center line A, a relative positional relationship among the light projecting unit 11, the light collecting unit 12, the capturing unit 13, and the light receiving side reflecting member 15 does not change. Thus, the Scheimpflug relationship is maintained regardless of the rotation angle of the light projecting and receiving module 10.

The capturing unit 13 includes a cover glass 13*c*. The cover glass 13*c* is formed to cover the light receiving surface of the image sensor 13*a*, and is fixed to the image sensor 13*a*. The cover glass 13*c* is made of a light transmissive member having a property of transmitting the reflected light S2 emitted from the light receiving side reflecting member 15. The reflected light S2 transmitted through the cover glass 13*c* forms an image on the light receiving surface of the image sensor 13*a*.

The rotation shaft 50 of the light projecting and receiving module 10 is disposed to substantially coincide with a gravity center position of the light projecting and receiving module 10 on the YZ plane. That is, the light projecting and receiving module 10 includes, in addition to the support member 14, the light projecting unit 11, the light collecting unit 12, the capturing unit 13, and the light receiving side reflecting member 15, and when the gravity center position of the light projecting and receiving module 10 is measured or calculated in a state where the light projecting unit 11, the light collecting unit 12, the capturing unit 13, and the light receiving side reflecting member 15 are fixed to the support member 14, the gravity center position substantially coincides with the rotation center line A. In other words, positions of the rotation shaft 50 in the Y direction and the Z direction with respect to the support member 14 are set such that the gravity center position of the light projecting and receiving module 10 becomes a rotation center. The support member 14 is fixed to the rotation shaft 50 by a plurality of fastening members (not illustrated) or the like, and the support member 14 and the rotation shaft 50 do not rotate relative to each other.

The gravity center position of the light projecting and receiving module 10 substantially coincides with the rotation center line A, and thus, the moment of inertia due to the rotation of the light projecting and receiving module 10 is reduced. In addition, a load of the motor 20 caused by, for example, vibration is suppressed, and a decrease in rotation speed of the light projecting and receiving module 10 is also suppressed. The position of the gravity center of the light projecting and receiving module 10 and the rotation center line A may not exactly coincide with each other, and for example, a deviation amount of an allowable degree in terms of manufacturing tolerance does not cause a problem. In addition, even though the gravity center position of the light projecting and receiving module 10 and the rotation center line A slightly deviate from each other, it can be considered that the gravity center position thereof and the rotation center line substantially coincide with each other. For example, since the moment of inertia of the light projecting and receiving module 10 may be able to be sufficiently reduced, the load of the motor 20 caused by vibration or the like may be sufficiently suppressed, and the decrease in rotation speed of the light projecting and receiving module 10 can also be suppressed, when such an effect can be obtained, a slight deviation between the gravity center position of the light projecting and receiving module and the rotation center line A is allowed, and it can be said that the gravity center position of the light projecting and receiving module 10 and the rotation center line A substantially coincide with each other.

As described above, since a diameter of the light collecting unit 12 is increased, a weight is increased. Thus, in some cases, it is conceivable that the gravity center position of the light projecting and receiving module 10 is too close to the light collecting unit 12 and it becomes difficult to design to bring the gravity center position and the rotation center line A close to each other. In such a case, as illustrated by virtual lines only in FIG. 5, a weight unit 16 can be provided on the light projecting unit 11 side in the light projecting and receiving module 10. As a result, the gravity center position of the light projecting and receiving module 10 can be positioned at an intermediate portion between the light projecting unit 11 and the light collecting unit 12. The weight unit 16 is disposed on a side opposite to the light collecting unit 12 across the rotation center line A. The weight unit 16 may be fixed to the support member 14 or may be fixed to the light projecting unit 11. The number of weight units 16 is not limited to one, and may be plural.

The closer the rotation shaft of the light projecting and receiving module 10 and the gravity center position are, the more stable the rotation is and a load on the rotation shaft 50 can be suppressed. However, it is assumed that a heaviness of the light projecting unit 11 is different from a heaviness of the light collecting unit 12. With this configuration, since the weight unit is provided at a position closer to the light projecting unit 11 than the light collecting unit 12 in the light projecting and receiving module 10 to suppress the deviation between the gravity center position of the light projecting and receiving module 10 and the rotation shaft 50 due to the difference in heaviness, it is possible to stabilize the rotation and it is possible to suppress the load on the rotation shaft 50.

Without providing the weight unit 16, a material of the light source housing of the light projecting unit 11 may be a material having a higher density than a material of the lens housing of the light collecting unit 12. For example, the support member 14 or the lens housing having a large volume can be made of a relatively low density material such as aluminum, and the light source housing can be made of a relatively high density material such as zinc or stainless steel (SUS). As a result, since the light projecting unit 11 can be set to be heavy, the gravity center position of the light projecting and receiving module 10 can be positioned at the intermediate portion between the light projecting unit 11 and the light collecting unit 12. Note that, a material of a housing of the light projecting unit 11 may be a material having a higher density than a material of a housing of the light collecting unit 12, and the weight unit 16 may be provided on the light projecting unit 11 side in the light projecting and receiving module 10. In addition, a volume of the light source housing is configured to be smaller than a volume of the lens housing.

As illustrated in FIG. 7, the housing 40 is a member for storing the light projecting and receiving module 10, the motor 20, and the motor control unit 30, and has a two-stage structure. That is, the housing 40 has an upper housing constituent unit 41 constituting an upper portion and a lower housing constituent unit 42 constituting a lower portion. In addition, the two-stage structure can also be referred to as a two-layer structure, and in this case, the upper housing constituent unit 41 is a first layer and the lower housing constituent unit 42 is a second layer.

The upper housing constituent unit 41 and the lower housing constituent unit 42 may be integrated or may be formed as separate members. In the present embodiment, a case where the upper housing constituent unit 41 and the lower housing constituent unit 42 are formed as separate members will be described. In this case, the housing 40 can be formed by coupling the upper housing constituent unit 41 and the lower housing constituent unit 42 by using, for example, a fastening member (not illustrated) or the like.

As illustrated in FIG. 7, the upper housing constituent unit 41 includes an upper peripheral wall 43 and an upper wall 44. The upper wall 44 extends along the YZ plane. The upper peripheral wall 43 extends from a peripheral edge portion of the upper wall 44 toward the lower housing constituent unit 42. A space formed inside the upper housing constituent unit 41 is an upper space R1. The upper space R1 is closed by the lower housing constituent unit 42, and the upper space R1 is sealed.

As illustrated in FIGS. 2 and 4, a light projecting window 43*a* and a light receiving window 43*b* are provided in a front portion of the upper peripheral wall 43. The light projecting window 43*a* and the light receiving window 43*b* are made of a member having optical transparency. As illustrated in FIG. 4, the light projecting window 43*a* is disposed to face a surface of the light projecting unit 11 irradiated with the slit light S1. Even though the light projecting and receiving module 10 rotates, a size and a position of the light projecting window 43*a* are set such that the slit light S1 can be emitted from the light projecting window 43*a* as long as the rotation angle of the light projecting and receiving module 10 is within a predetermined angle range to be described later.

In addition, the light receiving window 43*b* is disposed to face a light incident surface of the light collecting unit 12. Even though the light projecting and receiving module 10 rotates, a size and a position of the light receiving window 43*b* are set such that the reflected light S2 can be incident on the light collecting unit 12 from the light receiving window 43*b* as long as the rotation angle of the light projecting and receiving module 10 is within a predetermined angle range to be described later.

As illustrated in FIG. 7, the lower housing constituent unit 42 includes a board portion 45, a lower peripheral wall 46 extending downward from the board portion 45, and a lid member 47. The board portion 45 is a portion that extends along the YZ plane and closes a lower open portion of the upper housing constituent unit 41. The lid member 47 is attached to a lower end portion of the lower peripheral wall 46. A space formed inside the lower housing constituent unit 42 is a lower space R2. The lower space R2 is sealed by the lid member 47. In short, the housing 40 has a structure for sealing the inside. The sealing structure is a structure that prevents external dust and dirt from entering the inside of the housing 40, and can be referred to as, for example, a dustproof structure. Note that, the housing 40 may not be completely sealed, and for example, there may be a gap through which air can slightly enter and exit.

As illustrated in FIGS. 3 and 7, recesses 46*a* are formed on left and right sides of the lower peripheral wall 46 of the lower housing constituent unit 42. As viewed along the rotation shaft of the light projecting and receiving module 10, a width of the upper space R1 for storing the light projecting and receiving module is formed to be larger than a width of the lower space R2 for storing the motor 20, and the recesses 46*a* are formed in an outer wall of the housing 40 by a step between the upper space R1 and the lower space R2. The recesses 46*a* can be used as, for example, portions to be gripped by an operator with fingers at the time of installing the optical displacement meter 1. Note that, the recesses 46*a* may be provided as necessary. With this configuration, it is possible to provide a grip that contributes to improvement of user convenience without creating a dead space within the housing 40.

As illustrated in FIG. 7, the motor 20 for integrally rotating the light projecting and receiving module 10 is stored in the lower space (second space) R2. A central axis of the motor 20 stored in the lower space R2 coincides with the axis of the rotation shaft 50, and extends in the up-down direction. On the other hand, the light projecting and receiving module 10 is stored in the upper space (first space) R1. Since the upper space R1 and the lower space R2 are aligned in the direction of the rotation shaft of the light projecting and receiving module 10 (the central axis of the motor 20), the light projecting and receiving module 10 stored in the upper space R1 is disposed in the central axis rotation of the motor 20 with respect to the motor 20 stored in the lower space R2. In other words, the optical displacement meter 1 has a multi-stage structure in which the light projecting and receiving module 10 is disposed in an upper stage and the motor 20 is disposed in a lower stage.

Since the light projecting and receiving module 10 is disposed to be aligned in the central axis direction with respect to the motor 20, it is less likely to be influenced by the motor 20 when a positional relationship between the light projecting unit 11 and the light collecting unit 12 of the light projecting and receiving module 10 is set. Accordingly, for example, as in a case where the installation distance is relatively short, it is also possible to design in consideration of the fact that an interval between the light projecting unit 11 and the light collecting unit 12 cannot be set to be large.

The optical displacement meter 1 further includes a bearing 51 for rotatably supporting the rotation shaft 50 of the light projecting and receiving module 10. Since the light projecting and receiving module 10 increases in weight as described above, for example, when the optical displacement meter 1 is used in the posture illustrated in FIG. 1, a moment load is generated on the rotation shaft 50 due to the weight of the light projecting and receiving module 10. Specifically, the moment load in a direction in which the axis is inclined with respect to a horizontal plane acts on the rotation shaft 50 due to a difference between a portion of the rotation shaft 50 supported by the bearing 51 and the gravity center position of the light projecting and receiving module 10. In particular, in the case of the two-stage structure described above, since the upper housing constituent unit 41 and the lower housing constituent unit 42 are aligned in the direction of the central axis of the motor 20 (the rotation shaft of the light projecting and receiving module 10), the difference between the portion of the rotation shaft 50 supported by the bearing 51 and the gravity center position of the light projecting and receiving module 10 tends to be relatively large. On the other hand, the bearing 51 of the present embodiment is configured to be able to support the moment load generated by the difference between the portion of the rotation shaft 50 supported by the bearing 51 and the gravity center position of the light projecting and receiving module 10.

For example, a cross roller bearing in which a plurality of rollers 51*c* are arrayed between an annular outer ring member 51*a* and an annular inner ring member 51*b* and axes of the rollers 51*c* adjacent in a circumferential direction are orthogonal to each other can be used as the bearing 51 capable of supporting the moment load. That is, a step portion 45*a* into which the outer ring member 51*a* is fitted is formed in an annular shape on the board portion 45 of the lower housing constituent unit 42. The outer ring member 51*a* is fixed to the board portion 45 in a state of being fitted in the step portion 45*a*. On the other hand, a fitting portion 50*a* to which the inner ring member 51*b* is fitted is formed in an upper portion of the rotation shaft 50. The inner ring member 51*b* is fixed in a state of being fitted to the fitting portion 50*a*. Note that, the inner ring member 51*b* may be fixed to the support member 14 of the light projecting and receiving module 10.

The cross roller bearing is used as the bearing 51, and thus, the roller 51*c* comes into line contact with the outer ring member 51*a* and the inner ring member 51*b*. As a result, rigidity is greatly improved as compared with a ball type bearing. Thus, not only a load in a radial direction (radial load) of the rotation shaft 50 but also a load in an axial direction (thrust load) can be received while a bearing structure is thin in the axial direction and compact, and rigidity against the moment load can be improved. Thus, smooth rotation can be realized regardless of the posture of the optical displacement meter 1 at the time of the operation.

The bearing 51 may be incorporated in the motor 20. In addition, the bearing 51 may be a bearing other than the cross roller bearing. In a case where the bearing other than the cross roller bearing is used, for example, two or more ball bearings are disposed at intervals in the axial direction of the rotation shaft 50. As a result, a bearing structure capable of supporting the moment load is obtained. In a case where two or more ball bearings are used, one ball bearing can be held on the board portion 45 of the lower housing constituent unit 42, and the other ball bearing can be incorporated in the motor 20.

The optical displacement meter 1 further includes an encoder 52 for detecting a rotation angle of the rotation shaft 50, that is, the rotation angle of the light projecting and receiving module 10. The encoder 52 is an optical encoder. Although not illustrated, an optical encoder is known in the related art, and includes, for example, a rotating plate that is fixed to a lower end portion of the rotation shaft 50 and rotates together with the rotation shaft 50, and a fixing plate fixed to the housing 40. The optical encoder is configured to receive light emitted from a light emitter by a light receiver through slits formed at equal intervals in the rotating plate and the fixing plate, and convert the light reception amount into an electric signal to generate and output a pulse.

The encoder 52 is the optical encoder, and thus, detection accuracy of the rotation angle is improved as compared with a magnetic encoder, but the encoder is weak against dust or the like. On the other hand, the encoder 52 is stored inside the housing 40, specifically, in the sealed lower space R2 as described above, and thus, dust or the like is prevented from adhering to the encoder 52. For example, even in a case where dust or dirt enters the housing 40 when a position and a posture of the capturing unit 13 are adjusted in the upper space R1 in which the light projecting and receiving module 10 is stored, the space in which the encoder 52 is stored is sealed to prevent dust or dirt from entering the lower space R2 in which the encoder 52 is stored from the upper space R1 in which the light projecting and receiving module 10 is stored and rotated. Thus, it is easy to use an optical encoder that has high accuracy but is easily influenced by dirt and dust, and highly accurate measurement can be performed.

The motor 20 is a direct drive motor that directly drives the light projecting and receiving module 10. The direct drive is a drive mode in which a speed reduction mechanism is not interposed between the motor 20 and a driven body. Note that, although will be described later, the invention is not limited to the direct drive motor.

The motor 20 includes a stator 21 including a coil and a rotor 22 including a permanent magnet. The rotor 22 is fixed between the bearing 51 and the encoder 52 with respect to an outer peripheral portion of the rotation shaft 50. The stator 21 is fixed to the lower housing constituent unit 42 and is disposed to surround the rotor 22.

The motor control unit 30 includes, for example, a microcomputer, a ROM, a RAM, and the like, and operates according to a predetermined program. Specifically, the motor control unit 30 can set the rotation speed of the motor 20 to a desired speed and set the rotation angle of the motor 20 to a desired angle by controlling a current flowing through the stator 21. The encoder 52 is connected to the motor control unit 30. The motor control unit 30 can calculate a current rotation angle of the light projecting and receiving module 10 based on a pulse signal output from the encoder 52.

When a scanning start position, a scanning end position, a scanning range, and the like of the slit light S1 with respect to the workpiece W are set by the inspection setting, a rotation start position, a rotation end position, a rotation angle, and the like of the light projecting and receiving module 10 corresponding to the set scanning start position, scanning end position, and scanning range can be calculated. The motor control unit 30 controls the motor 20 based on the calculation result, and rotates the light projecting and receiving module 10 in a state where the Scheimpflug relationship is maintained inside the housing 40 to scan the slit light S1 in the direction orthogonal to the X direction.

Since the light projecting and receiving module 10 is stored in the upper space R1 of the housing 40, a part of the light projecting and receiving module 10 may come into contact with an inner wall of the housing 40 depending on the rotation angle of the light projecting and receiving module 10. On the other hand, in the present embodiment, a rotation angle range of the light projecting and receiving module 10 that rotates at the time of the operation of the optical displacement meter 1, that is, at the time of measurement is set to a predetermined angle range that avoids the light projecting and receiving module 10 from coming into contact with the inner wall of the housing 40. That is, in a case where it is assumed that the light projecting and receiving module 10 rotates to a first rotation angle, the light projecting and receiving module 10 has a dimension coming into contact with the inner wall of the housing 40 on the YZ plane orthogonal to the X direction, but the rotation angle range of the light projecting and receiving module 10 that rotates at the time of measurement is set to a predetermined angle range smaller than the first rotation angle in order to avoid the contact of the light projecting and receiving module 10 with the inner wall of the housing 40. With this configuration, since the housing 40 may be designed based on an angle range in which the light projecting and receiving module 10 needs to be rotated, the housing 40 can be easily downsized.

Examples of a method for setting the rotation angle range of the light projecting and receiving module 10 to a predetermined angle range include a method for mechanically realizing the rotation angle range and a method for realizing the rotation angle range by software. In the present embodiment, as the method for mechanically realizing the rotation angle range, as illustrated in FIG. 4, a first stopper 61 and a second stopper 62, which are examples of mechanical parts, are provided inside the housing 40. In this example, the first stopper 61 and the second stopper 62 are provided to protrude upward from the board portion 45. When the light projecting and receiving module 10 rotates in a direction of an arrow B about the rotation center line A, the light projecting and receiving module 10 abuts on the first stopper 61 before a part of the light projecting and receiving module 10 abuts on the inner wall of the housing 40, and the light projecting and receiving module 10 is prevented from further rotating in the direction of the arrow B. In addition, when the light projecting and receiving module 10 rotates in a direction of an arrow C about the rotation center line A, the light projecting and receiving module 10 abuts on the second stopper 62 before a part of the light projecting and receiving module 10 abuts on the inner wall of the housing 40, and the light projecting and receiving module 10 is prevented from further rotating in the direction of the arrow C. That is, the first stopper 61 and the second stopper 62 that prevent the light projecting and receiving module 10 from rotating to an outside of the predetermined angle range at the time of measurement are provided inside the housing 40.

The first stopper 61 and the second stopper 62 may be made of an elastic member such as rubber or thermoplastic elastomer. In addition, the first stopper 61 and the second stopper 62 may be made of metal, and an elastic member may be provided at a portion of the support member 14 where the first stopper 61 and the second stopper 62 abut. As a result, it is possible to reduce sound generated when the light projecting and receiving module 10 abuts on the first stopper 61 and the second stopper 62.

In addition, the support member 14 preferably abuts on the first stopper 61 and the second stopper 62. This is because when the light projecting unit 11, the light collecting unit 12, and the like abut on the first stopper 61 and the second stopper 62, the optical axis may be deviated due to an impact at the time of contact. In addition, the first stopper 61 and the second stopper 62 may be provided on the upper peripheral wall 43. Further, only one of the first stopper 61 and the second stopper 62 may be provided.

Next, a method by software will be described. That is, the motor control unit 30 executes the contact avoidance control, and thus, it is also possible to avoid the light projecting and receiving module 10 from coming into contact with the inner wall of the housing 40. The motor control unit 30 controls the motor 20 to rotate the light projecting and receiving module 10 within a predetermined angle range at the time of measurement based on the rotation angle acquired by calculating the pulse signal output from the encoder 52. This control is contact avoidance control. The contact avoidance control is executed, and thus, the light projecting and receiving module 10 can be avoided from coming into contact with the inner wall of the housing 40 without providing the stoppers 61 and 62. Note that, the stoppers 61 and 62 may also be provided in a case where the contact avoidance control is executed.

The light projecting and receiving module 10 may not come into contact with the inner wall of the housing 40 at the time of measurement. For example, since the light projecting and receiving module 10 may come into contact with the inner wall of the housing 40 at the time of non-measurement such as at the time of maintenance or various settings, the motor control unit 30 can be configured to execute the contact avoidance control only at the time of measurement.

As illustrated in FIG. 8, a board storing space (third space) R3 is provided in the lower housing constituent unit 42. In plan view illustrated in FIG. 4, the board storing space R3 is displaced from a center of the housing 40 toward a back side, and is accordingly positioned on a back side of the motor 20 (illustrated in FIG. 7). In addition, since the board storing space R3 is positioned below the upper space R1 in which the light projecting and receiving module 10 is stored, the board storing space R3 is a space different from the upper space R1, and is also a space different from the lower space R2. The board storing space R3 is disposed at a position different from the upper space R1 with respect to a rotation shaft direction of the light projecting and receiving module 10, and is disposed at the same position as the lower space R2 in which the motor 20 is stored. As viewed along the rotation shaft of the light projecting and receiving module 10, the upper space R1 and the lower space R2 are disposed at positions overlapping with the rotation shaft, while the board storing space R3 is disposed at positions not overlapping with the rotation shaft. For example, in a case where the size of the light projecting and receiving module 10 is larger than a size of the motor 20, an outer shape of the housing 40 can be set to be more compact by adopting the two-stage structure in which the upper space R1 for storing the light projecting and receiving module 10 is a first stage, and the lower space R2 for storing the motor 20 and the board storing space R3 for storing the motor control unit 30 are second stages.

As illustrated in FIG. 8, the board storing space R3 stores a motor control board 31 on which the motor control unit 30 is implemented, a signal processing board 33 on which the signal processing unit 32 is implemented, and a power supply board 35 on which the power supply unit 34 is implemented. On the motor control board 31 and the signal processing board 33, a processor such as a central processing unit (CPU), a digital signal processor (DSP), or a field programmable gate array (FPGA) that functions as the motor control unit 30 and the signal processing unit 32, and a storage element (not illustrated) such as a random access memory (RAM) or a read-only memory (ROM) for storing a program executed by the processor are mounted. Each of the boards 31, 33, and 35 is fixed to the lower housing constituent unit 42. Since the motor control unit 30 and the signal processing unit 32 are stored in the board storing space R3 different from the upper space R1, it is possible to thermally separate the light projecting unit 11 that particularly easily generates heat from the motor control unit 30 and the signal processing unit 32, and it is possible to stabilize the operations of the motor control unit 30 and the signal processing unit 32. Note that, the disposition of the control unit 3 is not limited to the above example, and for example, the signal processing unit 32 may be stored within the housing 40 while the motor control unit 30 may be disposed outside the housing 40.

Since the reflected light S2 is incident from the front side of the housing 40, the motor control unit 30, the signal processing unit 32, and the power supply unit 34 stored on the back side of the housing 40 are disposed on the side opposite to the light projecting and receiving module 10 from the side on which the reflected light S2 is incident. As a result, the motor control unit 30, the signal processing unit 32, and the power supply unit 34 can be prevented from interfering with displacement measurement. In addition, with the Z direction as a reference, the motor control unit 30, the signal processing unit 32, and the power supply unit 34 are disposed adjacent to the light projecting and receiving module 10 in the Z direction. In addition, since the board storing space R3 is sealed by the lid member 47, it is possible to suppress dust and the like from adhering to each of the boards 31, 33, and 35.

The signal processing board 33 is positioned at the top, the motor control board 31 is positioned below the signal processing board 33, and the power supply board 35 is positioned below the motor control board 31. The signal processing board 33 positioned at the top comes closest to the light projecting and receiving module 10, and the signal processing board 33 is positioned below the support member 14 of the light projecting and receiving module 10. As a result, the light projecting and receiving module 10 does not come into contact with the signal processing board 33 when rotating in the predetermined angle range. That is, all of the motor control unit 30, the signal processing unit 32, and the power supply unit 34 are disposed to avoid contact with the light projecting and receiving module 10 that rotates at the time of measurement.

The power supply unit 34 is a unit that supplies power to the light projecting unit 11, the capturing unit 13, the motor control unit 30, the signal processing unit 32, and the like. In the present embodiment, although the power supply unit 34, the motor control unit 30, and the signal processing unit 32 are implemented on different boards, the invention is not limited thereto, and any two or more thereof may be integrated and implemented on one board.

The signal processing unit 32 includes, for example, a microcomputer, a ROM, a RAM, and the like, and is a unit that operates in accordance with a predetermined program and generates sectional profile data of the workpiece W based on the light reception amount of the capturing unit 13. The boards 31, 33, and 35, the light projecting unit 11, and the capturing unit 13 are connected by a wiring indicated by reference numeral 70 in FIG. 4. The wiring 70 has flexibility and is configured not to influence a rotation operation of the light projecting and receiving module 10.

Figure 9:
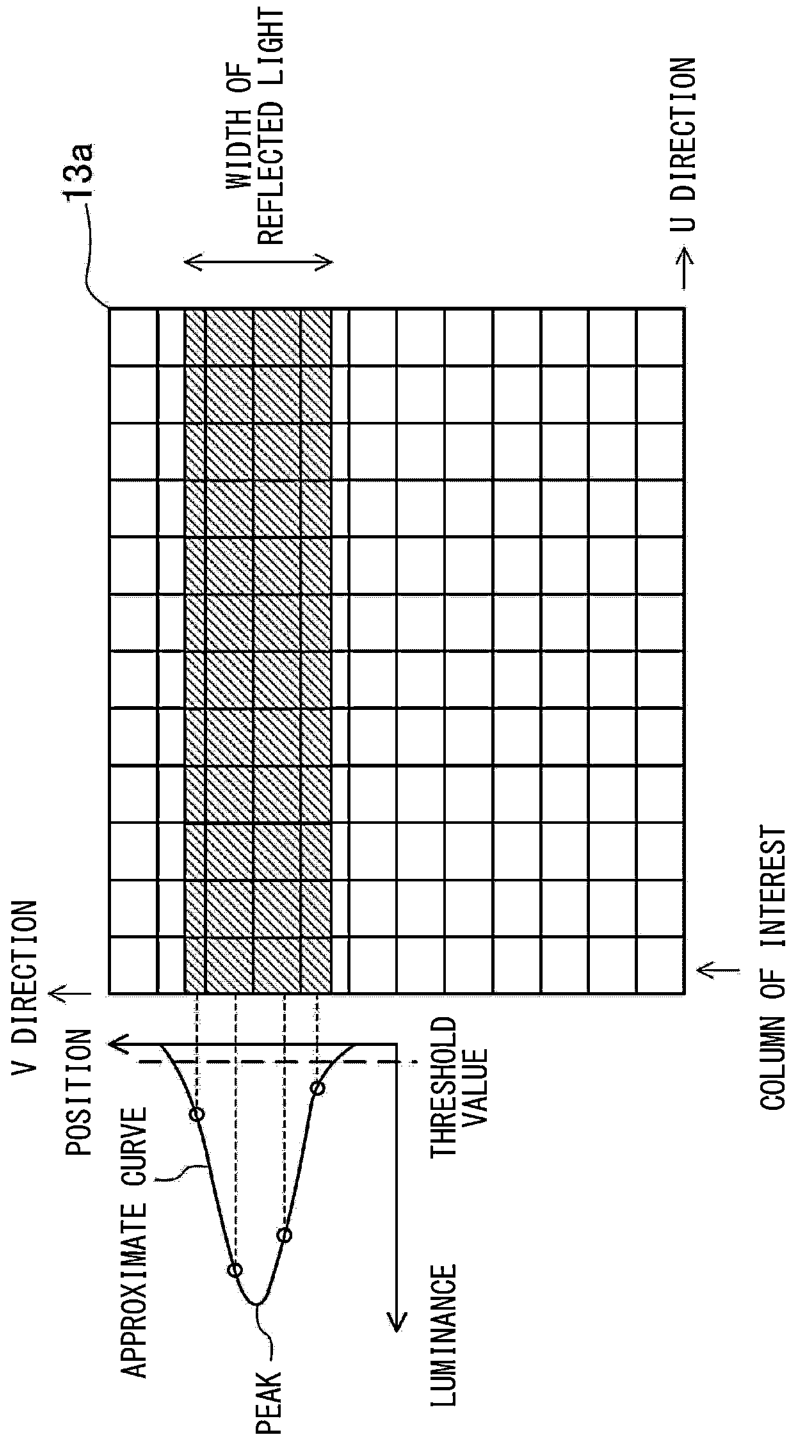
FIG. 9 is a diagram for explaining a method of displacement measurement.

As illustrated in FIG. 9, the image sensor 13*a* of the capturing unit 13 has a plurality of pixels two-dimensionally arrayed in a U direction corresponding to the X direction and a V direction orthogonal to the U direction. The signal processing unit 32 acquires a luminance value (light reception amount) of each pixel included in the image sensor 13*a*, and obtains an approximate curve of a luminance value change. The signal processing unit 32 calculates a peak position in the V direction of each pixel column in the obtained approximate curve, and acquires the calculated peak position as the displacement of the workpiece W.

The signal processing unit 32 executes the calculation of the peak position described above multiple times during the rotation operation of the light projecting and receiving module 10. The signal processing unit 32 associates the obtained peak position with the rotation angle of the light projecting and receiving module 10 when the peak position is obtained, and stores the peak position and the rotation angle thereof as measurement data. Since the rotation angle and UV coordinates of the light projecting and receiving module 10 correspond to XYZ coordinates of the workpiece, the sectional profile data of the workpiece W at a desired rotation angle can be generated based on the measurement data. In addition, a plurality of sectional profiles of the workpiece W are acquired at different rotation angles, and thus, the signal processing unit 32 can generate the data of the three-dimensional shape of the workpiece W.

First Modification of First Embodiment

Figure 10:
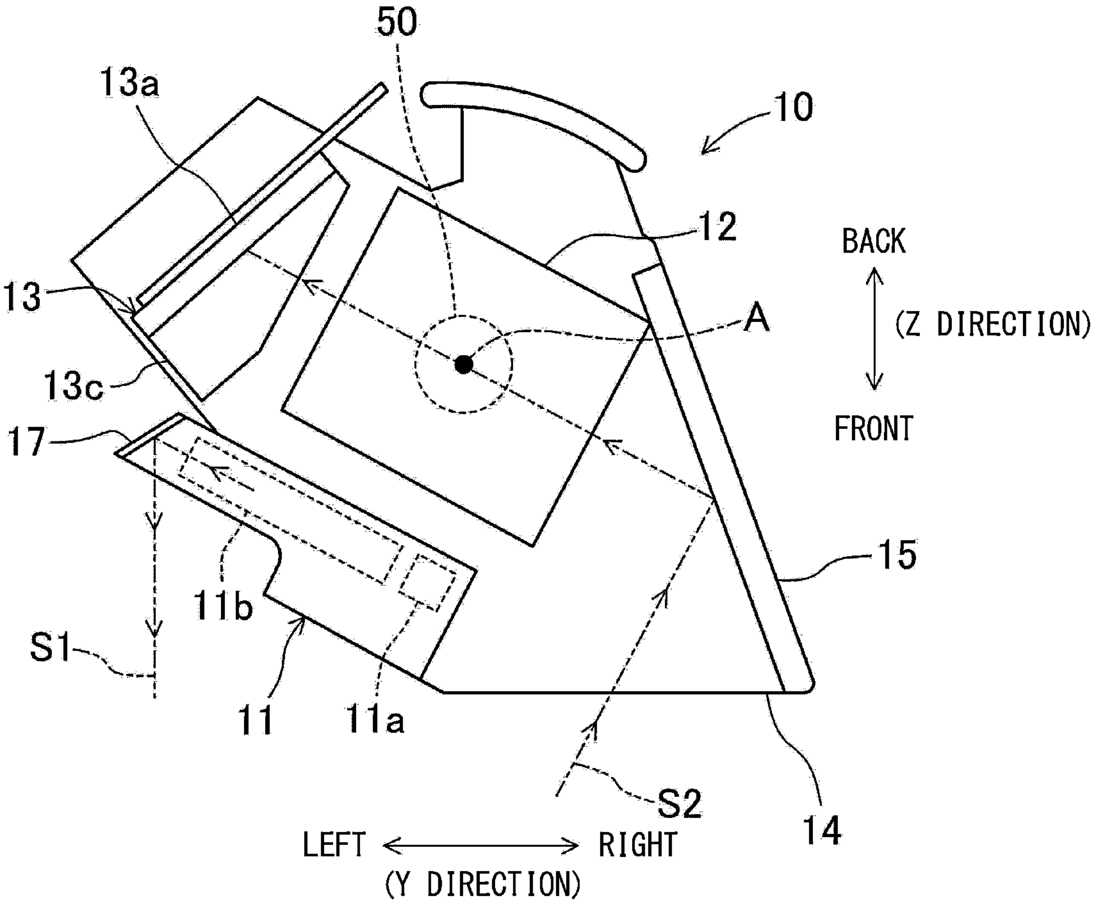
FIG. 10 is a diagram corresponding to FIG. 5 according to a first modification of the first embodiment.

FIG. 10 illustrates a light projecting and receiving module 10 according to a first modification of the first embodiment. The light projecting and receiving module 10 of the first modification is different from the light projecting and receiving module of the above embodiment in the positions of the light projecting unit 11, the light collecting unit 12, the capturing unit 13, and the light receiving side reflecting member 15. Specifically, the rotation shaft 50 of the light projecting and receiving module 10 is disposed at a position overlapping with the light collecting unit 12 on the YZ plane. That is, as described above, although it is desired to reduce the moment of inertia due to the rotation of the light projecting and receiving module 10 as much as possible, when the weight unit 16 indicated by a virtual line in FIG. 5 is provided, the weight of the light projecting and receiving module 10 may increase and it may be unpreferable. Thus, as a method for reducing the moment of inertia due to the rotation of the light projecting and receiving module 10 without providing the weight unit 16, it is possible to adopt a method for overlapping the light collecting unit 12 having a large weight and the rotation shaft 50 of the light projecting and receiving module 10 with each other on the YZ plane. As a result, at least a part of the light collecting unit 12 is disposed on an extension line of the rotation shaft 50 of the light projecting and receiving module 10. Note that, the rotation shaft 50 may not completely overlap with the light collecting unit 12, and at least a part of the rotation shaft 50 and at least a part of the light collecting unit 12 may be overlapped with each other as viewed from the direction of the rotation center line A. As a result, the weight unit 16 can be set to be unnecessary or the weight unit 16 can be set to be light.

In addition, in the first modification, the capturing unit 13 and the light receiving side reflecting member 15 are disposed to sandwich the light collecting unit 12. As a result, the light collecting unit 12 of the first modification is disposed on the optical path between the light receiving side reflecting member 15 and the capturing unit 13 on the YZ plane, and collects the light reflected by the light receiving side reflecting member 15 to be incident on the capturing unit 13.

Further, the light projecting and receiving module 10 of the first modification includes a light projecting side reflecting member 17. That is, the light projecting unit 11 of the first modification is disposed such that the slit light S1 emitted from the optical system 11*b* is directed toward a left back side. As a result, the light projecting unit 11 can be close to the rotation center line A, and the moment of inertia due to the rotation of the light projecting and receiving module 10 can be further reduced. However, the workpiece W is positioned on the side opposite to the slit light S1 emitted from the optical system 11*b*. To cope with this, the light projecting side reflecting member 17 is disposed to reflect the slit light S1 emitted from the optical system 11*b* of the light projecting unit 11 toward the workpiece W. The light projecting side reflecting member 17 is fixed to the support member 14 or the light projecting unit 11, and the relative positional relationship with respect to the light projecting unit 11 does not change even though the light projecting and receiving module 10 rotates.

Second Modification of First Embodiment

Figure 11:
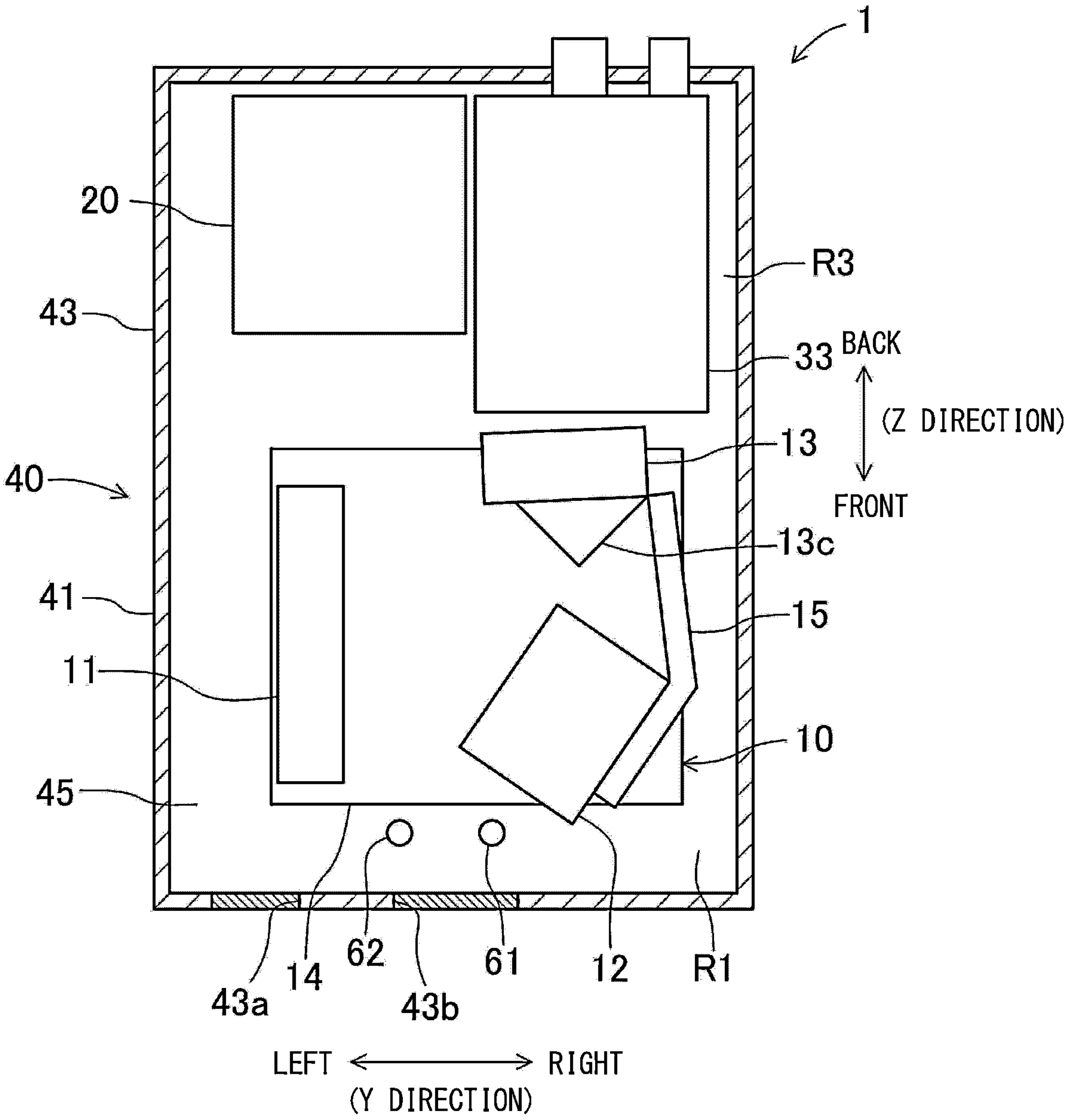
FIG. 11 is a diagram corresponding to FIG. 4 according to a second modification of the first embodiment.
Figure 12:
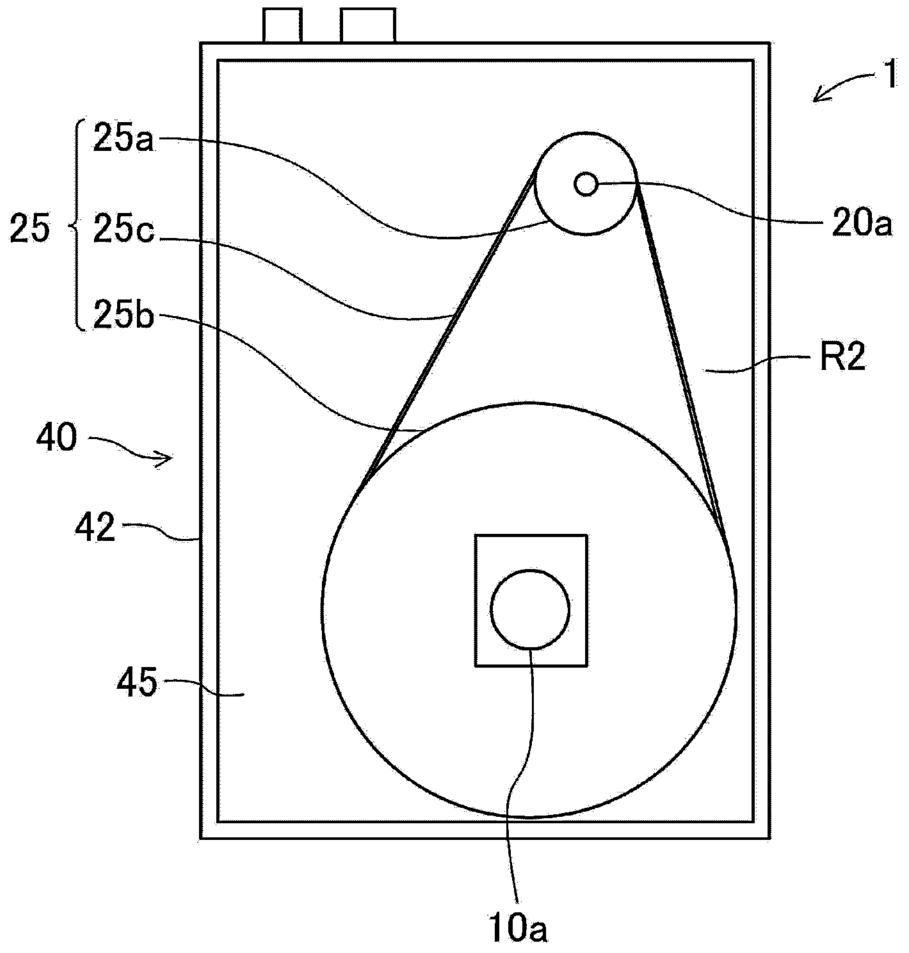
FIG. 12 is a diagram of an internal structure of an optical displacement meter according to the second modification of the first embodiment as viewed from below.

FIGS. 11 and 12 illustrate an optical displacement meter 1 according to a second modification of the first embodiment. FIG. 11 is a diagram of an internal structure of the optical displacement meter 1 as viewed from above, and FIG. 12 is a diagram of the internal structure of the optical displacement meter 1 as viewed from below.

In the optical displacement meter 1 of the second modification, the motor 20 is configured to rotate the light projecting and receiving module 10 via the speed reduction mechanism 25 instead of the direct drive motor. As illustrated in FIG. 11, the motor 20 is stored in the upper space R1 together with the light projecting and receiving module 10. As illustrated in FIG. 12, an output shaft 20*a* of the motor 20 penetrates the board portion 45 downward and reaches the lower space R2. In addition, a driven shaft 10*a* fixed to the light projecting and receiving module 10 also penetrates the board portion 45 downward and reaches the lower space R2.

The speed reduction mechanism 25 is stored in the lower space R2 and includes a driving pulley 25*a* fixed to the output shaft 20*a* of the motor 20, a driven pulley 25*b* fixed to the driven shaft 10*a*, and a transmission belt 25*c* wound around the driving pulley 25*a* and the driven pulley 25*b*. The driving pulley 25*a* is smaller in diameter than the driven pulley 25*b*. The transmission belt 25*c* is a timing belt.

In the second modification, when the output shaft 20*a* of the motor 20 stored in the upper space R1 rotates, the driving pulley 25*a* rotates, and a rotational force of the driving pulley 25*a* is transmitted to the driven pulley 25*b* via the transmission belt 25*c*. Since a driving force transmitted to the driven pulley 25*b* is transmitted to the driven shaft 10*a*, the light projecting and receiving module 10 can be rotated by the motor 20. In the case of the second modification, the driven shaft 10*a* is the rotation shaft of the light projecting and receiving module 10.

Note that, the speed reduction mechanism 25 is not limited to the combination of the pulleys 25*a* and 25*b* and the transmission belt 25*c*, and may include by, for example, a combination of a drive sprocket, a driven sprocket, and a timing chain, or a combination of a plurality of gears. For example, a DC motor, a stepping motor, a servo motor, or the like can be used as a type of the motor 20.

Second Embodiment

Figure 13:
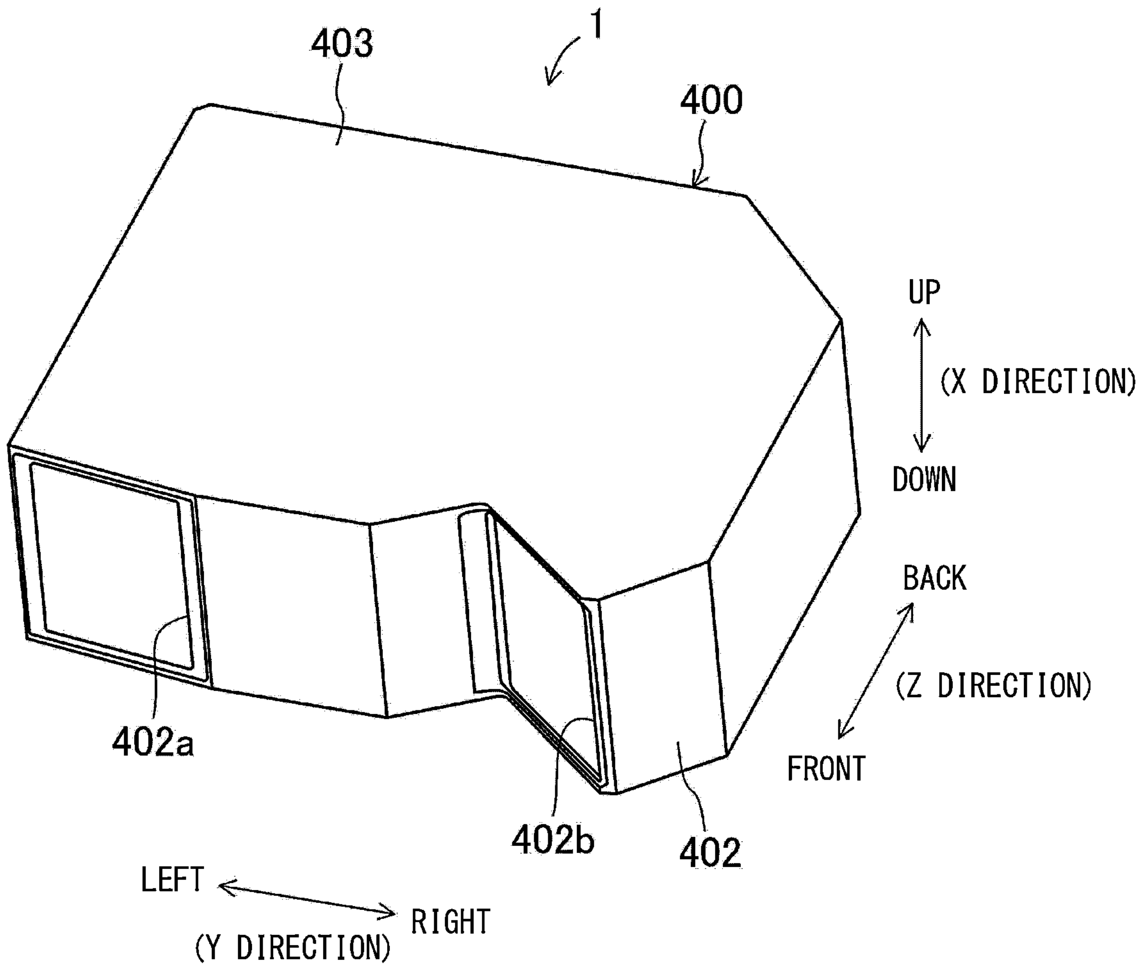
FIG. 13 is a diagram corresponding to FIG. 2 according to a second embodiment.
Figure 14:
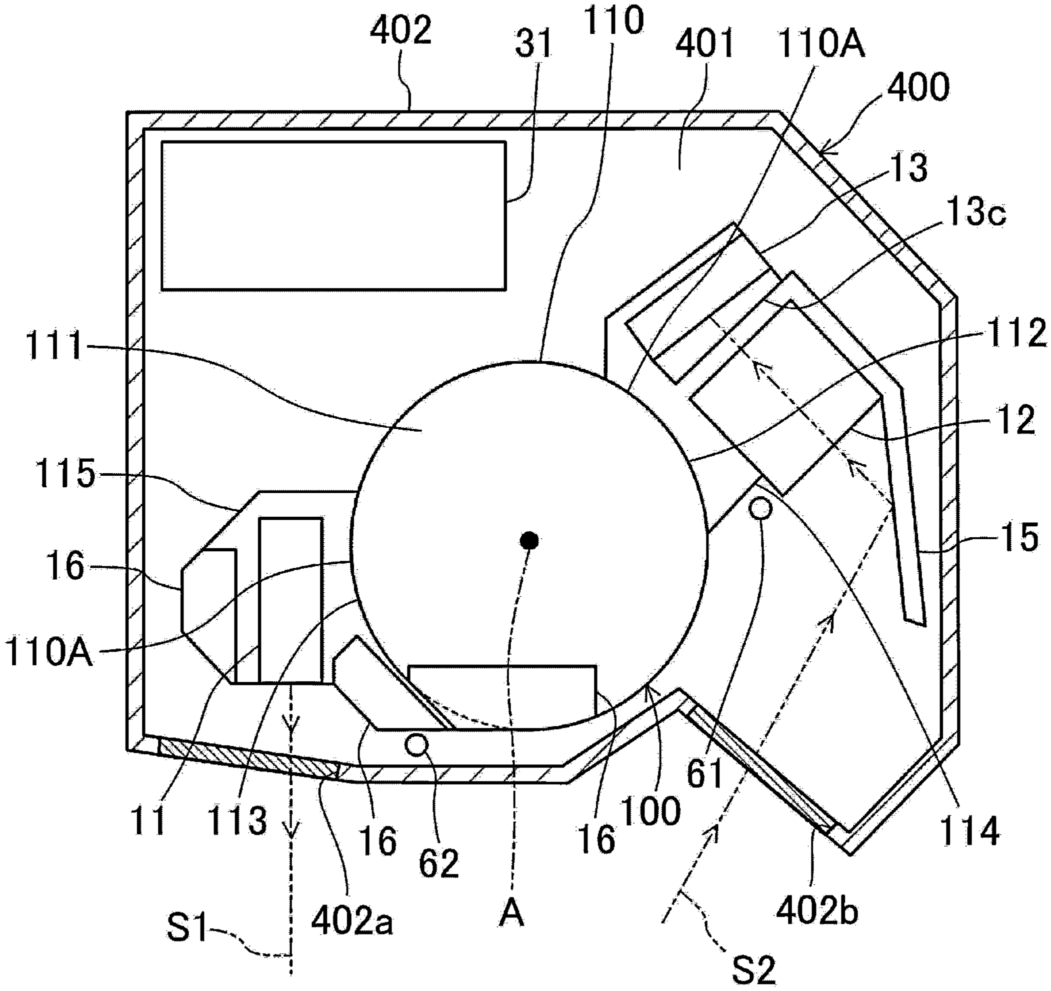
FIG. 14 is a diagram of an internal structure of an optical displacement meter according to the second embodiment as viewed from above.
Figure 15:
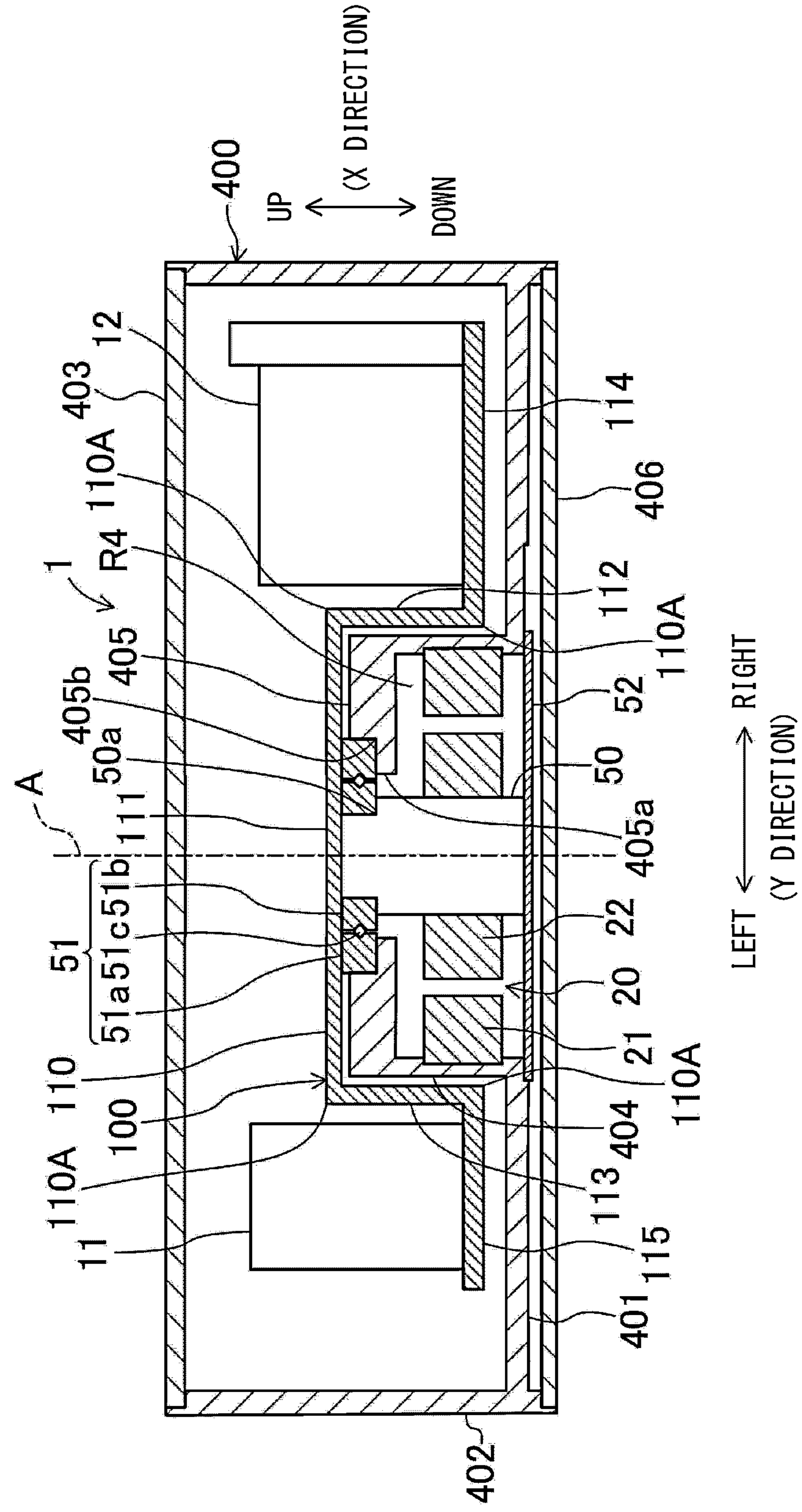
FIG. 15 is a diagram corresponding to FIG. 7 according to the second embodiment.

FIGS. 13 to 15 illustrate an optical displacement meter 1 according to a second embodiment of the invention. The second embodiment is different from the first embodiment in a structure of a housing 400, a positional relationship between the motor 20 and a light projecting and receiving module 100, and the like. Hereinafter, the same portions as the portions in the first embodiment will be denoted by the same reference numerals, description thereof will be omitted, and different portions will be described in detail.

As illustrated in FIGS. 13 and 15, the housing 400 has a one-stage structure, and the boards 31, 33, and 35 are also stored inside the housing 400. An inside of the housing 400 is partitioned, and thus, a space in which the boards 31, 33, and 35 are stored and a space in which the light projecting and receiving module 100 is stored can be set to be different from each other.

The housing 400 includes a lower wall 401, a peripheral wall 402 extending upward from a peripheral edge portion of the lower wall 401, and an upper lid member 403 for closing an upper open portion. A light projecting window 402*a* through which the slit light S1 emitted from the light projecting unit 11 is transmitted and a light receiving window 402*b* through which the reflected light S2 reflected from the workpiece W is transmitted are provided in a front portion of the peripheral wall 402.

As illustrated in FIG. 15, an annular wall 404 protruding to the inside of the housing 400 and extending about the rotation center line A is formed at a central portion of the lower wall 401. An end wall 405 extending in a radial direction of the rotation center line A is formed at a distal end portion of the annular wall 404. An opening 405*a* into which the rotation shaft 50 is inserted is formed in a central portion of the end wall 405.

A motor storing space R4 is formed inside the annular wall 404. The stator 21 and the rotor 22 of the motor 20 are stored in the motor storing space R4. The stator 21 of the motor 20 is fixed to an inner surface of the annular wall 404. That is, in the present embodiment, the annular wall 404 and the end wall 405 constitute a stator holding portion. On the other hand, the rotor 22 of the motor 20 is fixed to the rotation shaft 50.

The outer ring member 51*a* of the bearing 51 is fixed to the end wall 405 in a state of being fitted in a step portion 405*b* formed in the end wall 405. As a result, the bearing 51 is held by the stator holding portion constituted by the annular wall 404 and the end wall 405. On the other hand, the inner ring member 51*b* is fitted to the fitting portion 50*a* formed in the rotation shaft 50.

The encoder 52 is also stored in the motor storing space R4. A lower lid member 406 is provided at a lower end portion of the housing 400. Since the motor storing space R4 is sealed by the lower lid member 406, dust or the like is prevented from adhering to the encoder 52.

As in the first embodiment, although the light projecting and receiving module 100 includes the light projecting unit 11, the light collecting unit 12, the capturing unit 13, the weight unit 16, and the like, a support member 110 integrally holding the light projecting unit 11, the light collecting unit 12, and the capturing unit 13 is greatly different from the support member 14 of the first embodiment.

That is, in the first embodiment, the light projecting and receiving module 10 and the motor 20 (the bearing 51 and the encoder 52) are aligned in the direction of the rotation shaft 50 (height direction), whereas in the second embodiment, at least one of the motor 20, the bearing 51 supporting the rotation shaft 50, or the encoder 52 connected to the motor 20 is included in a part within the height range in the direction of the rotation shaft 50 of the light projecting and receiving module 100. As a result, when a positional relationship between the light projecting unit 11 and the light collecting unit 12 of the light projecting and receiving module 100 is set, it is possible to design in consideration of increasing the interval between the light projecting unit 11 and the light collecting unit 12, for example, as in a case where the installation distance is relatively long.

More specifically, the support member 110 includes a fixing portion 111 fixed to the rotation shaft 50, a one-side vertical plate portion 112 and an other-side vertical plate portion 113, a light collecting unit holding portion 114, and a light projecting unit holding portion 115. The fixing portion 111, the one-side vertical plate portion 112, the other-side vertical plate portion 113, the light collecting unit holding portion 114, and the light projecting unit holding portion 115 may be integrally formed, or may be formed by combining different members. The fixing portion 111 has a plate shape extending in the radial direction of the rotation shaft 50. In the present embodiment, the fixing portion has a circular shape as illustrated in FIG. 14, and is disposed to cover the end wall 405 from above as illustrated in FIG. 15. The one-side vertical plate portion 112 extends downward along the direction of the rotation shaft 50 from a right side in FIG. 15, that is, from one side in the radial direction of the rotation shaft 50 in the fixing portion 111. The other-side vertical plate portion 113 extends downward along the direction of the rotation shaft 50 from a left side in FIG. 15, that is, from the other side in the radial direction of the rotation shaft 50 in the fixing portion 111. The one-side vertical plate portion 112 and the other-side vertical plate portion 113 are disposed to face the annular wall 404. In addition, the one-side vertical plate portion 112 and the other-side vertical plate portion 113 are curved in an arc shape similarly to the annular wall 404, and rotate in a state where a constant gap with the annular wall 404 is maintained at the time of rotation of the light projecting and receiving module 100.

Note that, the one-side vertical plate portion 112 and the other-side vertical plate portion 113 may be integrally formed. For example, it is also possible to form an annular peripheral wall (not illustrated) extending downward from the peripheral edge portion of the fixing portion 111, and it is also possible to form the one-side vertical plate portion 112 and the other-side vertical plate portion 113 in a part of the peripheral wall in the circumferential direction.

The light collecting unit holding portion 114 has a plate shape extending in the radial direction of the rotation shaft 50 from the lower end portion of the one-side vertical plate portion 112. The light collecting unit 12, the capturing unit 13, the cover glass 13*c*, and the like are held on an upper surface of the light collecting unit holding portion 114. Thus, the rotation shaft 50 of the light projecting and receiving module 100 is disposed at a position not overlapping with the light collecting unit 12 and the capturing unit 13 on the YZ plane.

The light projecting unit holding portion 115 has a plate shape extending in the radial direction of the rotation shaft 50 from a lower end portion of the other-side vertical plate portion 113. The light projecting unit 11, the weight unit 16, and the like are held on an upper surface of the light projecting unit holding portion 115. Thus, the rotation shaft 50 of the light projecting and receiving module 100 is disposed at a position not overlapping with the light projecting unit 11 on the YZ plane.

As described above, the light collecting unit holding portion 114 and the light projecting unit holding portion 115 are disposed to sandwich the rotation shaft 50, and protrude in directions opposite to each other with respect to the radial direction of the rotation shaft 50. The weight unit 16 can be fixed to the light projecting unit holding portion 115. In addition, the weight unit 16 may be fixed to the side of the fixing portion 111 opposite to the side where the one-side vertical plate portion 112 is formed.

The support member 110 having the fixing portion 111, the one-side vertical plate portion 112, the other-side vertical plate portion 113, the light collecting unit holding portion 114, and the light projecting unit holding portion 115 has a plurality of bent portions 110A in a section in the X direction. As described above, since the support member 110 has the structure having the plurality of bent portions 110A, the rigidity can be enhanced as compared with a case where the support member 110 is a flat plate.

The motor 20 and the bearing 51 are disposed between the one-side vertical plate portion 112 and the other-side vertical plate portion 113 of the support member 110. The bearing 51 is disposed at a location closer to the fixing portion 111 than the motor 20 between the one-side vertical plate portion 112 and the other-side vertical plate portion 113. As a result, the motor 20 and the bearing 51 are included in a part within the height range of the light projecting and receiving module 100. Note that, although not illustrated, only the motor 20 may be included within the height range of the light projecting and receiving module 100, or only the bearing 51 may be included within the height range of the light projecting and receiving module 100.

At least the motor 20, the bearing 51, and the encoder 52 constitute a rotation drive unit. In addition, the motor 20 is fixed to a wall surface (the lower wall 401 and the annular wall 404) adjacent to a light projecting and receiving surface on which the light projecting window 402*a* through which the slit light passes and the light receiving window 402*b* through which the reflected light passes (collectively referred to as a light projecting and receiving window).

The light projecting and receiving window of the present embodiment includes the light projecting window 402*a* and the separate light receiving window 402*b*, but the light projecting window and the light receiving window may be integrally formed. In addition, the light projecting and receiving surface is a surface, on which the light projecting and receiving window, among surfaces constituting an outer shape of the housing 400, and is a surface including a plurality of planes formed by the windows as illustrated in FIGS. 4 and 14. In a case where the light projecting and receiving window is integrally formed, the light projecting and receiving surface may be a surface including one plane formed by the light projecting and receiving window.

The support member 110 supports the light projecting and receiving module 100 such that the light projecting and receiving module 100 is positioned in a plane orthogonal to the X direction and in which the rotation drive unit is present. The support member 110 has a first portion (for example, the fixing portion 111) and second portions (for example, the light collecting unit holding portion 114 and the light projecting unit holding portion 115) having different heights in the rotation shaft direction formed by the plurality of bent portions 110A, and the rotation drive unit and the light projecting and receiving module 100 are present between the plane formed by the first portion and the plane formed by the second portion in at least a part of the section including the rotation shaft. With this configuration, the rigidity of the support member 110 can be enhanced, and a thickness of the housing 400 in the X direction can be reduced.

Although not illustrated, the encoder 52 may be included within the height range of the light projecting and receiving module 100. For example, the encoder 52 is provided at the intermediate portion or the upper end portion of the rotation shaft 50, and thus, the encoder 52 is included within the height range of the light projecting and receiving module 100. Only the encoder 52 may be included within the height range of the light projecting and receiving module 100, only the motor 20 and the encoder 52 may be included within the height range of the light projecting and receiving module 100, or only the bearing 51 and the encoder 52 may be included within the height range of the light projecting and receiving module 100.

The light receiving side reflecting member 15 is disposed on an optical path between the light collecting unit 12 and the light receiving window 402*b* of the housing 400 on the YZ plane, and reflects the reflected light S2 transmitted through the light receiving window 402*b* toward the light collecting unit 12. That is, the light collecting unit 12 is disposed on the optical path between the light receiving side reflecting member 15 and the capturing unit 13 on the YZ plane, and collects the reflected light S2 reflected by the light receiving side reflecting member 15 to be incident on the capturing unit 13. As a result, the reflected light S2 can be folded back toward the light projecting unit 11 such that a distance between the capturing unit 13 or the light collecting unit 12 and the rotation shaft 50 of the light projecting and receiving module 100 on the YZ plane is shortened.

Modification of Second Embodiment

Figure 16:
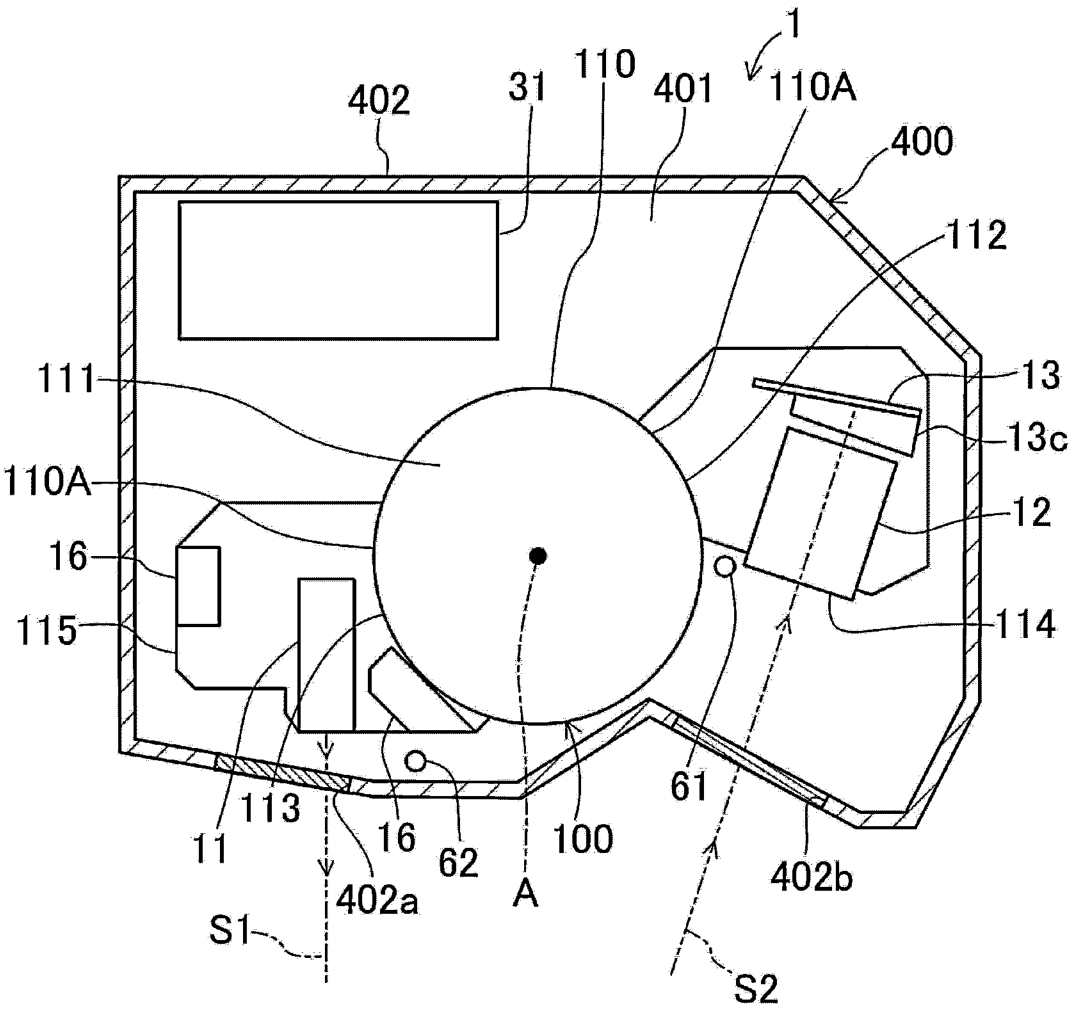
FIG. 16 is a diagram corresponding to FIG. 14 according to a modification of the second embodiment.

FIG. 16 illustrates an optical displacement meter 1 according to a modification of the second embodiment. In this modification, the light receiving side reflecting member 15 is omitted. The light collecting unit 12 is disposed such that the optical axis of the light collecting unit 12 faces the light receiving window 402*b* of the housing 400, and thus, the light receiving side reflecting member 15 becomes unnecessary.

In addition, this modification is an example of a layout in a case where a wide interval between the light projecting unit 11 and the light collecting unit 12 is secured. For example, the present modification can be applied to a case where the installation distance is relatively long.

The above-described embodiment are merely examples in all respects, and should not be construed in a limiting manner. Further, all modifications and changes falling within an equivalent scope of the claims are within the scope of the invention. For example, in the second embodiment, the light projecting side reflecting member may be provided. In addition, in the second embodiment, the speed reduction mechanism may be provided. In addition, in the first and second embodiments, the motor 20 may be provided outside the housings 40 and 400.

Third Embodiment

Figure 17:
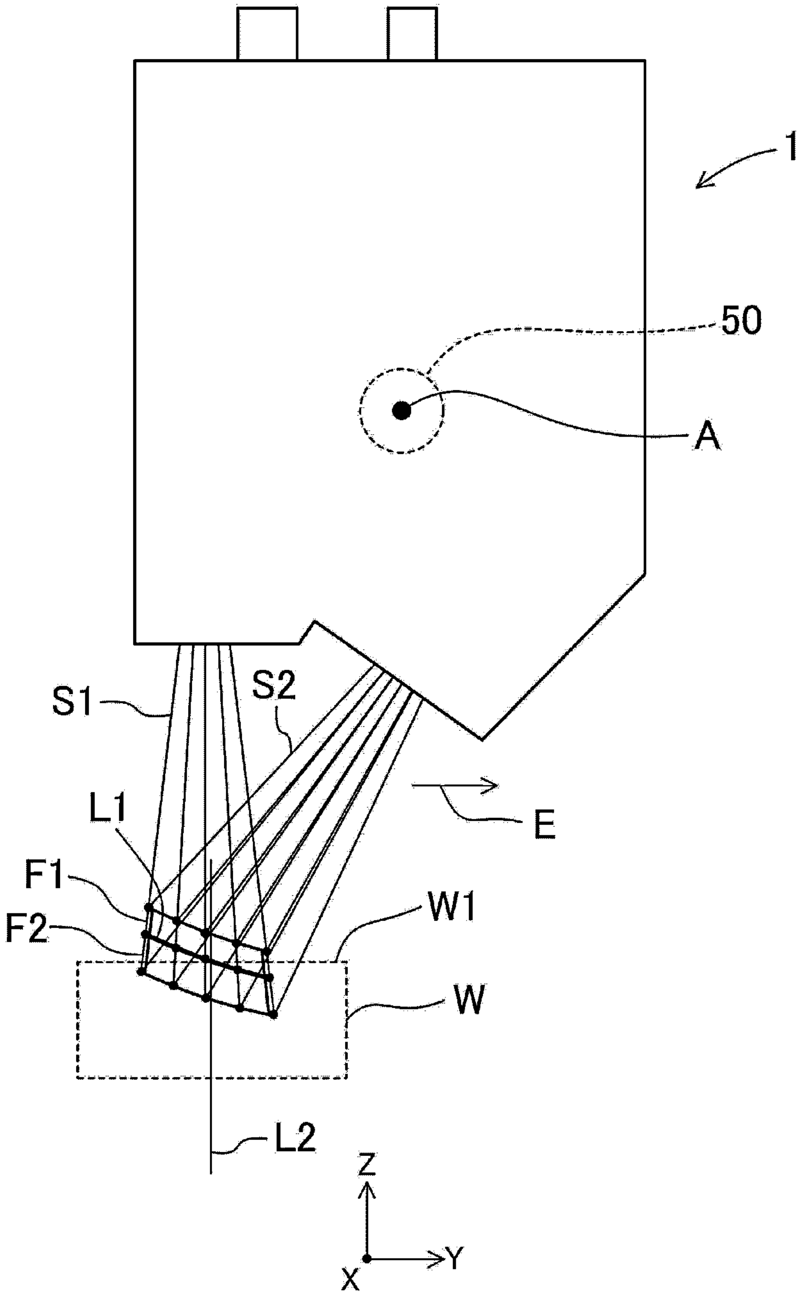
FIG. 17 is a schematic diagram illustrating a capture range of a measurement result at the time of three-dimensional measurement.
Figure 18:
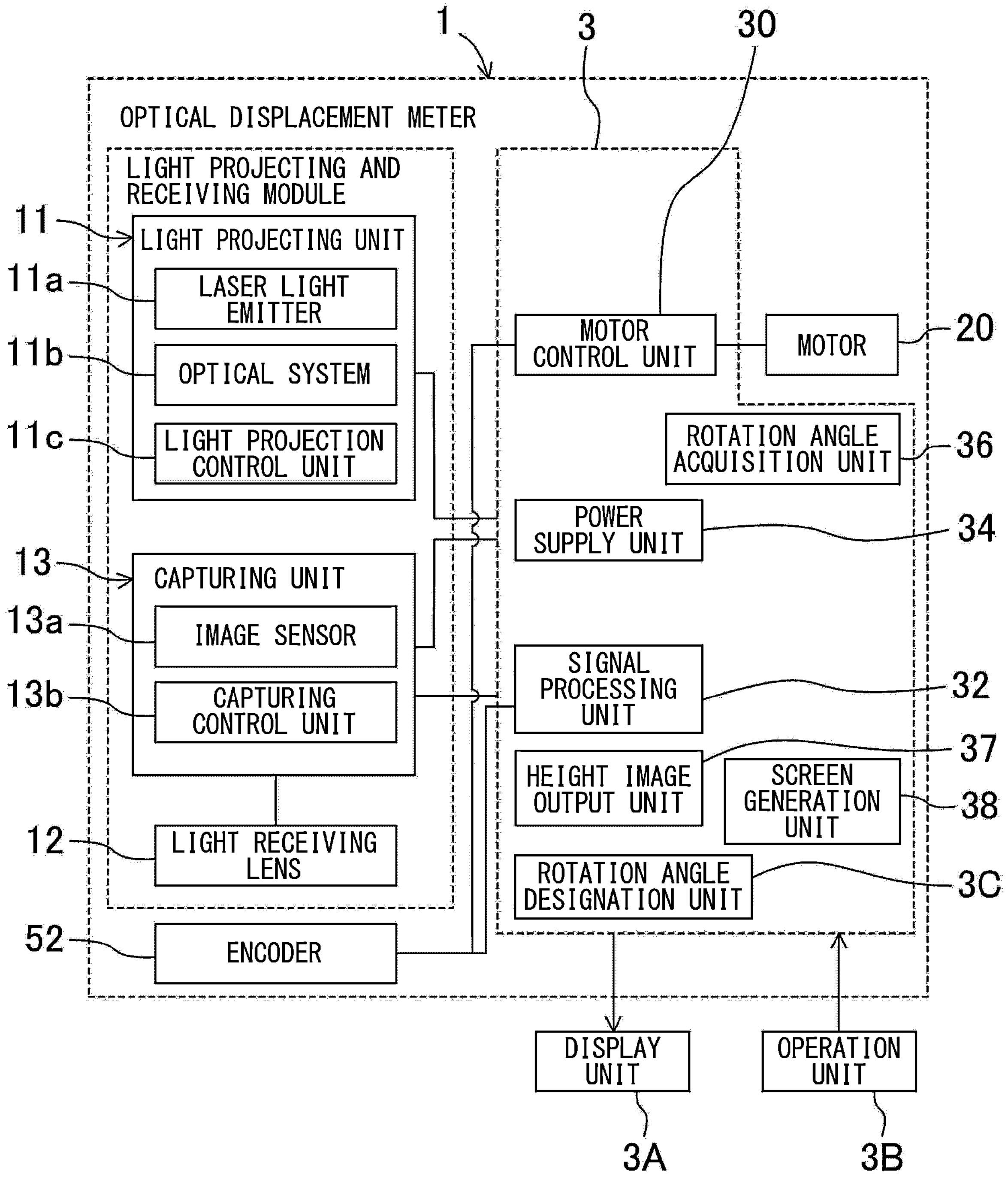
FIG. 18 is a diagram corresponding to FIG. 6 according to a third embodiment.

FIG. 17 is a schematic diagram illustrating a scene in which a three-dimensional shape of a workpiece W is measured. FIG. 18 is a block diagram illustrating an optical displacement meter 1 according to a third embodiment of the invention. Reference numeral W1 in FIG. 17 indicates a surface of the workpiece W. The optical displacement meter 1 is installed to irradiate the surface W1 with slit light S1 from above the workpiece W. A motor 20 integrally swings a light projecting and receiving module 10 around a rotation shaft 50 of a support member 14 to reciprocate in two directions of clockwise or counterclockwise. The clockwise is a right-handed rotation as viewed along a direction in which the rotation shaft 50 extends (X direction), and the counterclockwise is a left-handed rotation as viewed along the rotation shaft 50. A motor control unit 30 controls the motor 20, and swings the light projecting and receiving module 10 to reciprocate in the two directions to scan the slit light S1 in a direction orthogonal to the X direction. As a result, a capturing unit 13 can acquire a plurality of received light images while the light projecting and receiving module 10 is being swung in one of the two directions by the motor control unit 30.

As described above, since the slit light S1 is scanned with respect to the workpiece W in the direction orthogonal to the X direction by rotating the light projecting and receiving module 10, a capturing control unit 13*b* can generate a sectional profile representing a height of the workpiece W in a Z direction based on a pixel signal read out from an image sensor 13*a* at each of different rotation angles of the light projecting and receiving module 10.

As illustrated in FIG. 17, in a case where the displacement of the workpiece W in which the surface W1 is at the same height (the surface W1 and the Y direction are parallel) is measured, if the optical displacement meter 1 is linearly moved in a direction (indicated by an arrow E) parallel to the surface W1 of the workpiece W, since the surface W1 is at the same height, it is possible to narrow a region of the image sensor 13*a* from which pixel signals are to be read to a partial region to speed up the processing.

On the other hand, in a case where the slit light S1 is scanned in the direction orthogonal to the X direction by rotating the light projecting and receiving module 10 as in the present embodiment, the surface W1 of the workpiece W may not be able to be measured in the entire Y direction as will be described below. That is, in FIG. 17, a maximum region that can be read out by the image sensor 13*a* is a substantially arc-shaped maximum region (measurable range) F1 having a predetermined depth at a center of the rotation shaft 50 of the capturing unit 13. When a region of the image sensor 13*a* from which the pixel signal is to be read out at the time of displacement measurement is constantly set to the maximum region F1, since a processing amount of a signal processing unit 32 increases and it becomes difficult to speed up the measurement, it is conceivable that the region of the image sensor 13*a* from which the pixel signal is to be read out is set to a region below a line L1, that is, a partial region (capture range) F2.

However, in a case where the light projecting and receiving module 10 is rotated, the partial region F2 is a region that is long in an arc shape with the rotation center line A of the light projecting and receiving module 10 as a center. Thus, even though the surface W1 of the workpiece W has the same height, since a portion on a right side of a straight line L2 is positioned outside the partial region F2, the measurement cannot be performed in the partial region F2.

Figure 19:
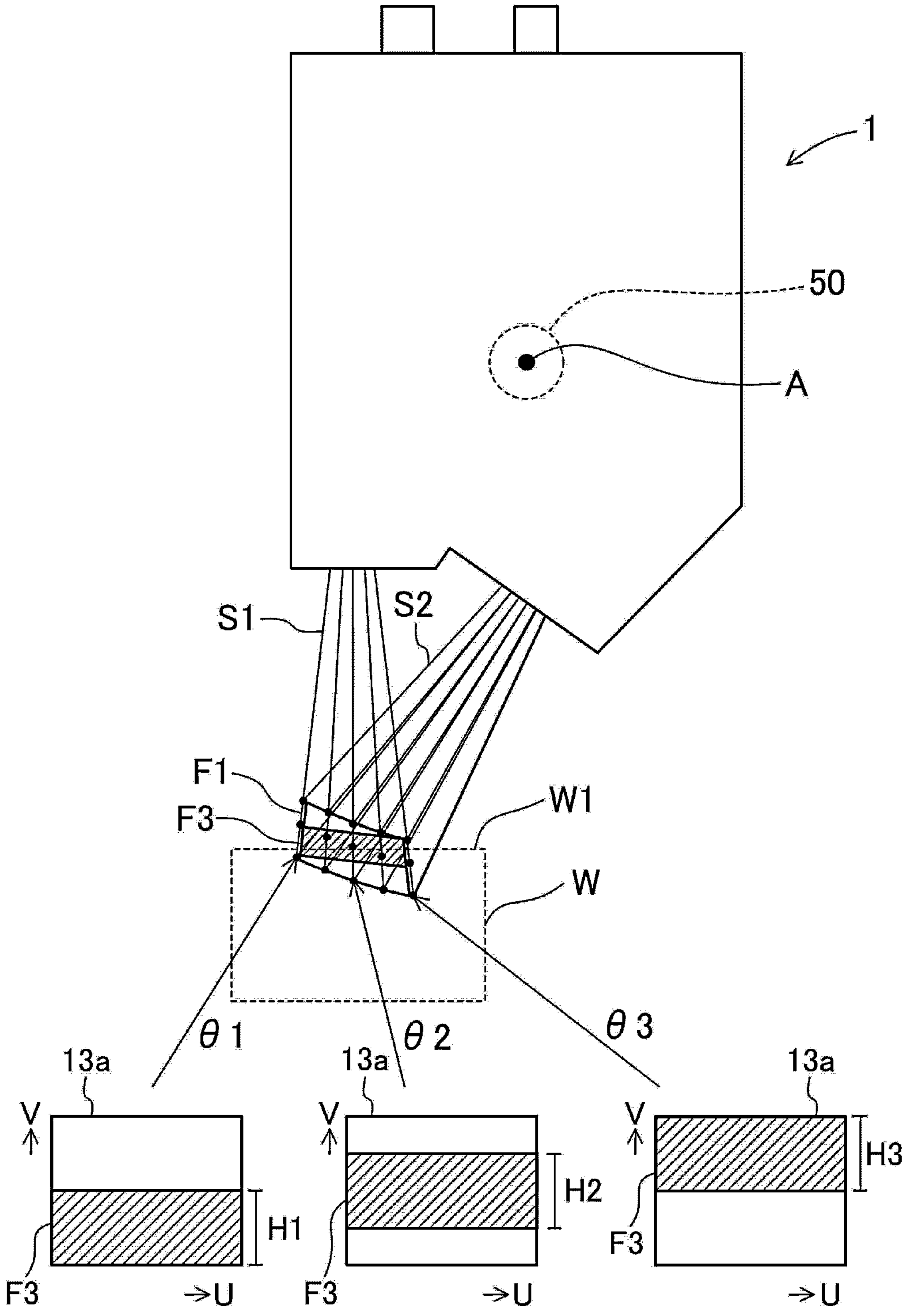
FIG. 19 is a diagram corresponding to FIG. 17 for explaining a case where a capture range of the image sensor is dynamically changed.

On the other hand, as illustrated in FIG. 19, the capturing control unit 13*b* of the third embodiment is configured to be able to dynamically change a partial region F3 (a portion indicated by hatching and corresponding to the capture range) of the image sensor 13*a* from which the pixel signal is to be read out in accordance with the rotation angle of the light projecting and receiving module 10. Since the capturing control unit 13*b* is configured to be able to acquire a rotation angle of the motor 20 based on a rotation angle acquisition unit 36 to be described later, a position of the partial region F3 in the image sensor 13*a* can be changed in a V direction of the image sensor 13*a* in accordance with the rotation angle of the motor 20.

An example in which the capturing control unit 13*b* changes the position of the partial region F3 will be described with reference to FIG. 19. When the rotation angle of the light projecting and receiving module 10 is $\theta 1$, the capturing control unit 13*b* sets the position of the partial region F3 in the image sensor 13*a* such that the partial region F3 is a lower region of the image sensor 13*a*. When the rotation angle of the light projecting and receiving module 10 is θ2, the capturing control unit 13*b* sets the position of the partial region F3 in the image sensor 13*a* such that the partial region F3 is an intermediate region in the up-down direction of the image sensor 13*a*. When the rotation angle of the light projecting and receiving module 10 is θ3, the capturing control unit 13*b* sets the position of the partial region F3 in the image sensor 13*a* such that the partial region F3 is an upper region of the image sensor 13*a*. That is, when the rotation angle of the light projecting and receiving module 10 changes from θ1 to θ3, the partial region F3 changes from a lower region to the upper region of the image sensor 13*a* with a change in angle, and conversely, when the rotation angle of the light projecting and receiving module 10 changes from θ3 to θ1, the partial region F3 changes from the upper region to the lower region of the image sensor 13*a* with the change in angle. Note that, since the rotation angle of the motor 20 corresponds to the rotation angle of the light projecting and receiving module 10, any one of the rotation angle of the motor 20 and the rotation angle of the light projecting and receiving module 10 may be used in performing the present control. Here, since it is assumed that the motor 20 is a direct drive motor to be described later, the rotation angle of the motor 20 is equal to the rotation angle of the light projecting and receiving module 10. Note that, in a case where the motor 20, a speed reduction mechanism 25, and the like are used, the rotation angle of the motor 20 and the rotation angle of the light projecting and receiving module 10 may be different depending on a rotation ratio.

The capturing control unit 13*b* sets a width H1 of the partial region F3 in the V direction when the rotation angle of the light projecting and receiving module 10 is θ1, a width H2 of the partial region F3 in the V direction when the rotation angle of the light projecting and receiving module 10 is θ2, and a width H3 of the partial region F3 in the V direction when the rotation angle of the light projecting and receiving module 10 is θ3 to be the same. In short, the capturing control unit 13*b* sets the number of readout pixels of the partial region F3 in the V direction to be common at different rotation angles of the light projecting and receiving module 10, and changes the partial region F3 for each rotation angle such that a common height in the Z direction is included in the region from which the light reception amount is read out in the substantially arc-shaped measurable range F1. When the surface of the workpiece W is flat, the capturing control unit 13*b* can also change the partial region F3 for each rotation angle such that a region of the substantially arc-shaped measurable range F1 from which the light reception amount is read out substantially coincides with the Z direction from one end to the other end of the substantially arc shape. As a result, the capturing control unit 13*b* can move the partial region F3 where the pixel signal is read out from the image sensor 13*a* in the V direction such that at least a part of a measurement range in the Z direction is common regardless of the rotation angle of the light projecting and receiving module 10. Note that, the width H1 of the partial region F3 in the V direction when the rotation angle of the light projecting and receiving module 10 is θ1 may be different from the width H2 of the partial region F3 in the V direction when the rotation angle of the light projecting and receiving module 10 is θ2. Similarly, the width H1 of the partial region F3 in the V direction when the rotation angle of the light projecting and receiving module 10 is θ1 may be different from the width H3 of the partial region F3 in the V direction when the rotation angle of the light projecting and receiving module 10 is θ3.

In addition, at least one of the light projecting and receiving module 10 and the signal processing unit 32 may change a parameter related to a light amount in accordance with the rotation angle. The parameter related to the light amount includes, for example, at least one of a light amount of the slit light S1 emitted by a light projecting unit 11, an exposure time of the image sensor 13*a*, a gain of the image sensor 13*a*, and detection sensitivity for detecting a peak position by the signal processing unit 32 (threshold value of a light reception amount detected as a peak).

When a light emission amount is constant regardless of the rotation angle, a light reflection amount at another rotation angle tends to decrease as compared with a light reception amount (light reflection amount) of reflected light S2 at a rotation angle (hereinafter, also referred to as a reference angle) at which a light projection axis of the light projecting unit 11 and a light reception axis of the capturing unit 13 have a specular reflection relationship with respect to an XY plane (relationship in which an incident angle and a reflection angle are equal). For example, in FIG. 19, as θ3 changes to θ1, the light reflection amount tends to decrease. Accordingly, as a change amount of the rotation angle from the reference angle increases, a light projection control unit 11*c* may increase the light emission amount. In addition, as the change amount of the rotation angle from the reference angle increases, the capturing control unit 13*b* may increase the exposure time of the image sensor 13*a* or increase the gain of the image sensor 13*a*. As a result, it is possible to suppress a decrease in light reception amount of each received light image due to a decrease in the light reflection amount and to enhance calculation accuracy of the peak position.

In addition, when UV coordinates of the peak position are calculated from the received light image, the signal processing unit 32 may reduce the detection sensitivity as the change amount of the rotation angle from the reference angle at which the received light image is acquired increases. As a result, it is possible to suppress a decrease in calculation accuracy of the peak position due to a decrease in light reception amount of each received light image due to the decrease in light reflection amount.

Note that, the reference angle is not limited to the rotation angle having the specular reflection relationship, and may be set in accordance with a shape, material, surface state, or external environment of the workpiece.

(Generation of Height Image)

As illustrated in FIG. 18, the optical displacement meter 1 of the third embodiment includes the rotation angle acquisition unit 36 that acquires the rotation angle by the motor 20. The rotation angle acquisition unit 36 may be constituted by an encoder 52 that detects the rotation angle of the light projecting and receiving module 10 described above, or may be constituted by a calculation unit that detects a rotation start timing by the motor 20 and calculates the rotation angle of the light projecting and receiving module 10 on the assumption that the light projecting and receiving module 10 is moving at a constant speed.

The signal processing unit 32 acquires a light reception amount distribution output by the image sensor 13*a* and the rotation angle of the motor 20 detected by the rotation angle acquisition unit 36. The signal processing unit 32 is a unit that executes conversion processing of calculating UV coordinates based on the light reception amount distribution output by the image sensor 13*a* and converting the UV coordinates and the rotation angle by the motor 20 into XYZ coordinates based on a predetermined conversion condition.

Since the light projecting and receiving module 10 is swung, the signal processing unit 32 acquires, from the capturing unit 13, a plurality of received light images obtained while the light projecting and receiving module 10 is being swung in one of the clockwise and the counter-clockwise. Further, the signal processing unit 32 acquires, from the rotation angle acquisition unit 36, rotation angles corresponding to a plurality of received light images obtained while the light projecting and receiving module 10 is being swung in one direction. The signal processing unit 32 converts the plurality of received light images and the rotation angles corresponding to the received light images obtained while the light projecting and receiving module 10 is being swung in one direction into a plurality of XYZ coordinates based on a predetermined conversion condition.

The optical displacement meter 1 includes a height image output unit 37. The height image output unit 37 includes, for example, a microcomputer, a ROM, a RAM, and the like, operates according to a predetermined program stored in the ROM or the like, and acquires XYZ coordinates obtained by conversion processing by the signal processing unit 32. The height image output unit 37 outputs a height image representing a height of the workpiece W in the XY plane based on the acquired XYZ coordinates. The height image is not a three-dimensional image in which a polygon is formed with each pixel as a vertex, and is not an image in which a three-dimensional point group is merely viewed from an angle directly above, but is an image including height data instead of a luminance value, and can also be referred to as a distance image.

(Setting of Capture Range)

In the optical displacement meter 1 according to the present embodiment, a user can set a capture range to be a target for capturing a measurement result while viewing the height image, and can receive setting of the capture range by the user. That is, as illustrated in FIG. 18, the optical displacement meter 1 of the third embodiment includes a screen generation unit 38 that generates various screens. The screen generation unit 38 includes, for example, a microcomputer, a ROM, a RAM, and the like, operates according to a predetermined program stored in the ROM or the like, and outputs generated screen data to a display unit 3A. The display unit 3A is a unit that displays various screens based on the screen data acquired from the screen generation unit 38, and includes, for example, a liquid crystal display device, an organic EL display device, or the like.

In the optical displacement meter 1, a control unit 3 can acquire an operation state of an operation unit 3B by the user. The operation unit 3B includes, for example, a keyboard and a mouse. The display unit 3A and the operation unit 3B may be members constituting a part of the optical displacement meter 1 or may be members constituting a part of a setting device including a personal computer or the like different from the optical displacement meter 1, and are connected to the screen generation unit 38 in any case.

Figure 20:
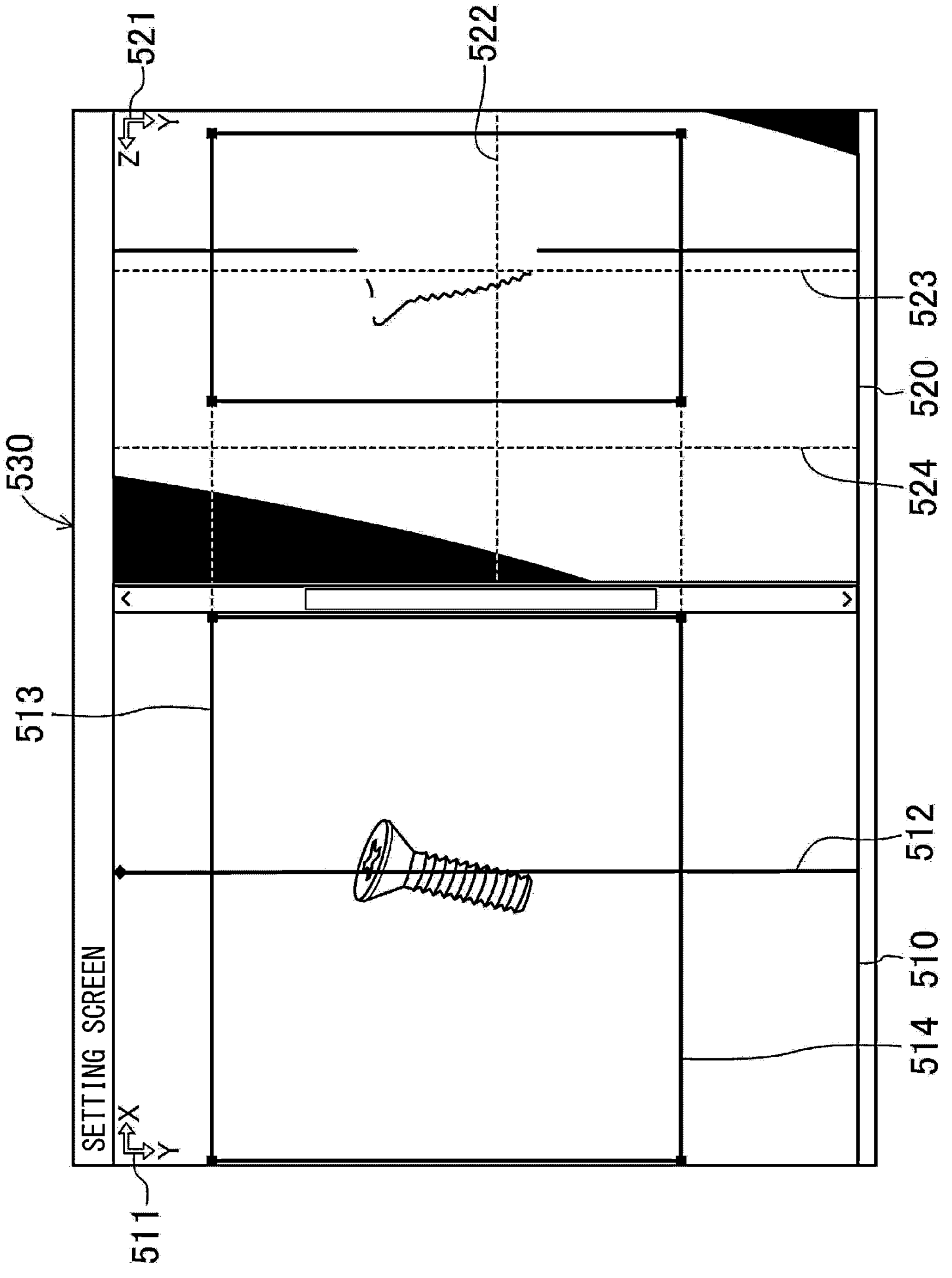
FIG. 20 is a diagram illustrating an example of a setting screen.

As illustrated in FIG. 20, the screen generation unit 38 generates a setting screen 530 for displaying a first screen 510 representing the height image and a second screen 520 representing a YZ sectional profile of the workpiece W corresponding to an X coordinate in the height image simultaneously or in a switching manner, and displays the setting screen on the display unit 3A. In this example, a case where the workpiece W is a screw and a case where the setting screen 530 simultaneously displays the first screen 510 and the second screen 520 is illustrated. The screen generation unit 38 acquires data of the height image output from the height image output unit 37, and displays the height image on the first screen 510. A first coordinate system display section 511 representing the X direction and the Y direction is provided on the first screen 510. In this example, a horizontal direction of the first screen 510 is the X direction, a vertical direction of the first screen 510 is the Y direction, and an axial direction of the screw which is the workpiece W substantially coincides with the Y direction. Although not illustrated in FIG. 20, the height image is represented by a continuous change in color from a low portion to a high portion of the workpiece W, for example, a change such as blue, green, yellow, orange, and red from a low side to a high side. In addition, an invalid pixel is expressed by black or the like, for example.

On the first screen 510, an X coordinate indication line 512 indicating the X coordinate, and a first Y coordinate indication line 513 and a second Y coordinate indication line 514 indicating a Y coordinate are displayed. Since the horizontal direction of the first screen 510 is the X direction, the X coordinate indication line 512 is formed as a straight line extending in the vertical direction. The user can move the X coordinate indication line 512 to any position in the X direction by operating the operation unit 3B.

In addition, since the vertical direction of the first screen 510 is the Y direction, the first Y coordinate indication line 513 and the second Y coordinate indication line 514 are formed as straight lines extending in the horizontal direction. The first Y coordinate indication line 513 and the second Y coordinate indication line 514 are parallel to each other. In addition, the first Y coordinate indication line 513 and the second Y coordinate indication line 514 are orthogonal to the X coordinate indication line 512.

The screen generation unit 38 can acquire the X coordinate in the height image displayed on the first screen 510. When the user operates the operation unit 3B to move the X coordinate indication line 512 displayed on the first screen 510 in the X direction, the screen generation unit 38 can specify the X coordinate in the height image based on a position of the moved X coordinate indication line 512 in the X direction. The X coordinate in the height image is specified, and thus, the screen generation unit 38 acquires the YZ sectional profile of the workpiece W corresponding to the X coordinate in the height image, and displays the YZ sectional profile on the second screen 520. A specifying method of the X coordinate in the height image is not limited to the method using the X coordinate indication line 512, and may be, for example, a specifying method using a point, an arrow, or the like. The setting screen 530 may first display the first screen 510, and when the X coordinate is designated on the first screen 510, the setting screen may switch from the first screen 510 to the second screen 520, and may display the second screen.

A second coordinate system display section 521 representing the Y direction and the Z direction is provided on the second screen 520 of the setting screen 530. The second screen 520 represents a measurable range by the capturing unit 13. Specifically, a white portion on the second screen 520 is a measurable range by the capturing unit 13, and a black portion on the second screen 520 is a range in which the measurement by the capturing unit 13 cannot be performed (outside of the measurable range). As described above, since the measurable range by the capturing unit 13 has a substantially arc shape, the white portion on the second screen 520 also has a substantially arc shape. The coloring of white and black in FIG. 20 is an example, and any color may be used for display as long as it is possible to distinguish between an inside and an outside of the measurable range. Note that, as a display form of the measurable range, in addition to a form in which the color is changed between the inside and the outside of the measurable range, a form in which the inside and the outside of the measurable range are represented by changing a shade of color may be used, or a form in which the inside and the outside of the measurable range are represented by characters, symbols, boundary lines, or the like may be used. The measurable range is displayed on the second screen 520, and thus, the user can easily determine to what extent the capture range can be set only by viewing the second screen 520.

A Y direction reference line 522 representing a reference distance in the Y direction and a Z direction reference line 523 representing a reference distance in the Z direction are displayed on the second screen 520. The Y direction reference line 522 is formed as a straight line extending in the horizontal direction of the second screen 520, and the Z direction reference line 523 is formed as a straight line extending in the vertical direction of the second screen 520. Thus, the Y direction reference line 522 and the Z direction reference line 523 are orthogonal to each other, and an intersection of the Y direction reference line 522 and the Z direction reference line 523 indicates a center of a field of view of the optical displacement meter 1.

On the second screen 520, an accuracy guarantee region can also be displayed as a region in which measurement accuracy of a certain level or more is guaranteed. A line 524 in FIG. 20 is a line indicating a boundary between the accuracy guarantee region and another region, a region on a right side of the line 524 is the accuracy guarantee region, and a region on a left side of the line 524 is an outside of the accuracy guarantee region. The accuracy guarantee region is displayed on the second screen 520 in this manner, and thus, the user can easily determine whether or not the workpiece W is in a measurement range in which sufficiently high measurement accuracy can be obtained only by viewing the second screen 520.

Figure 21:
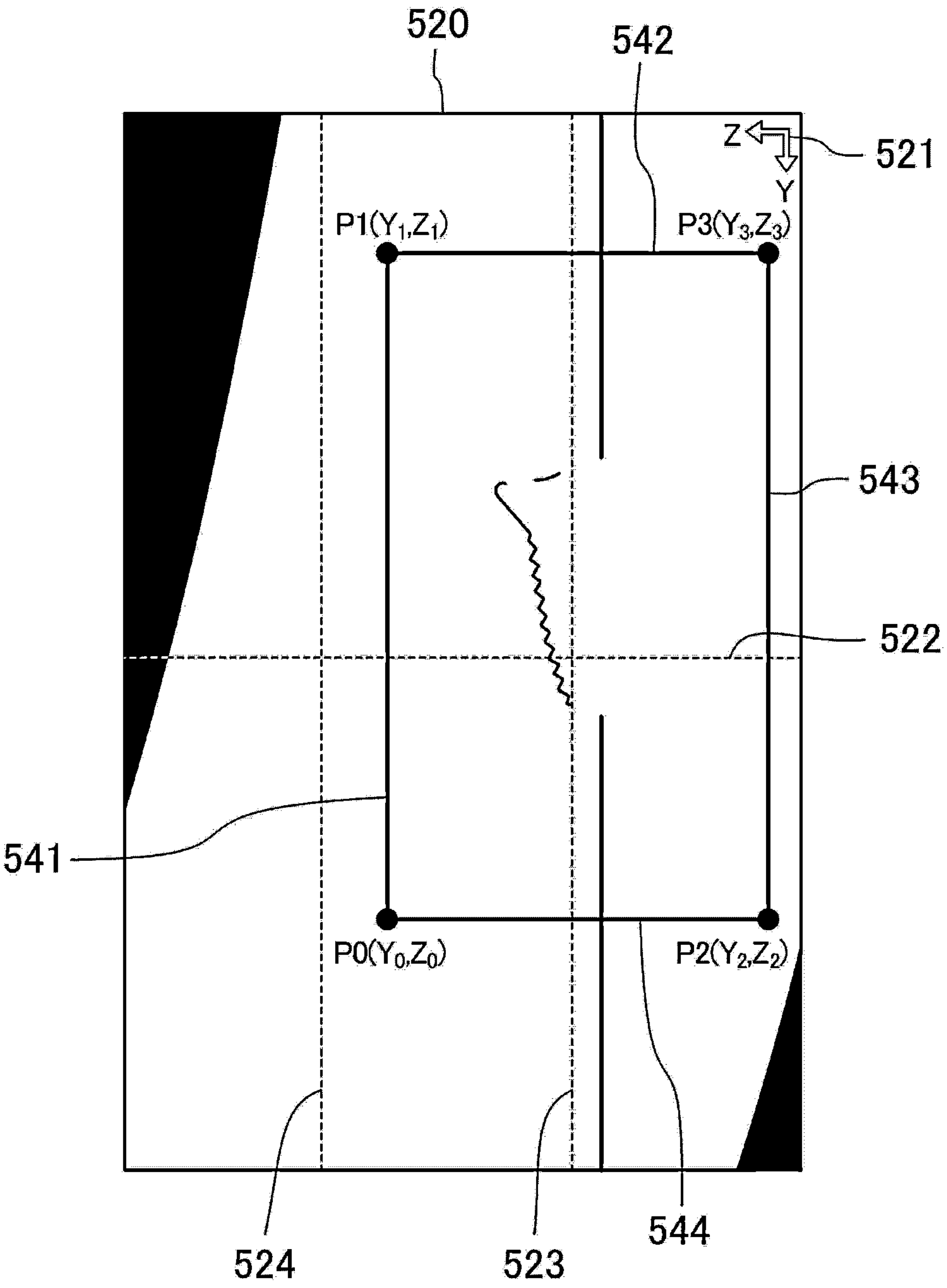
FIG. 21 is a diagram illustrating an example of a rectangular capture range.

The setting screen 530 can receive, via the second screen 520, the setting of the capture range to be the target for capturing the measurement result. As illustrated in FIG. 21, the capture range can be, for example, a rectangle. In the case of the rectangle, YZ coordinates $(Y_0, Z_0)$, $(Y_1, Z_1)$, $(Y_2, Z_2)$, and $(Y_3, Z_3)$ of four points (Point P0, point P1, point P2, and point P3) for defining the capture range are specified. The point P0, the point P1, the point P2, and the point P3 are points for determining vertexes of the rectangle, and a region formed by connecting the point P0, the point P1, the point P3, and the point P4 by four straight lines 541, 542, 543, and 544 is the capture range. The user operates the operation unit 3B illustrated in FIG. 18, and thus, the point P0, the point P1, the point P2, and the point P3 can be moved to any positions on the second screen 520. The shape and size of the capture range and the position on the second screen 520 can be voluntarily set. The point P0, the point P1, the point P2, and the point P3 may be moved by the operation unit 3B, or the straight lines 541, 542, 543, and 544 may be moved by the operation unit 3B. Note that, the capture range may be, for example, a region surrounded by a circle, an ellipse, or a free curve in addition to the rectangle, and can have an any shape on the YZ plane. The setting of the capture range can be received via the second screen 520 regardless of the shape.

Figure 22:
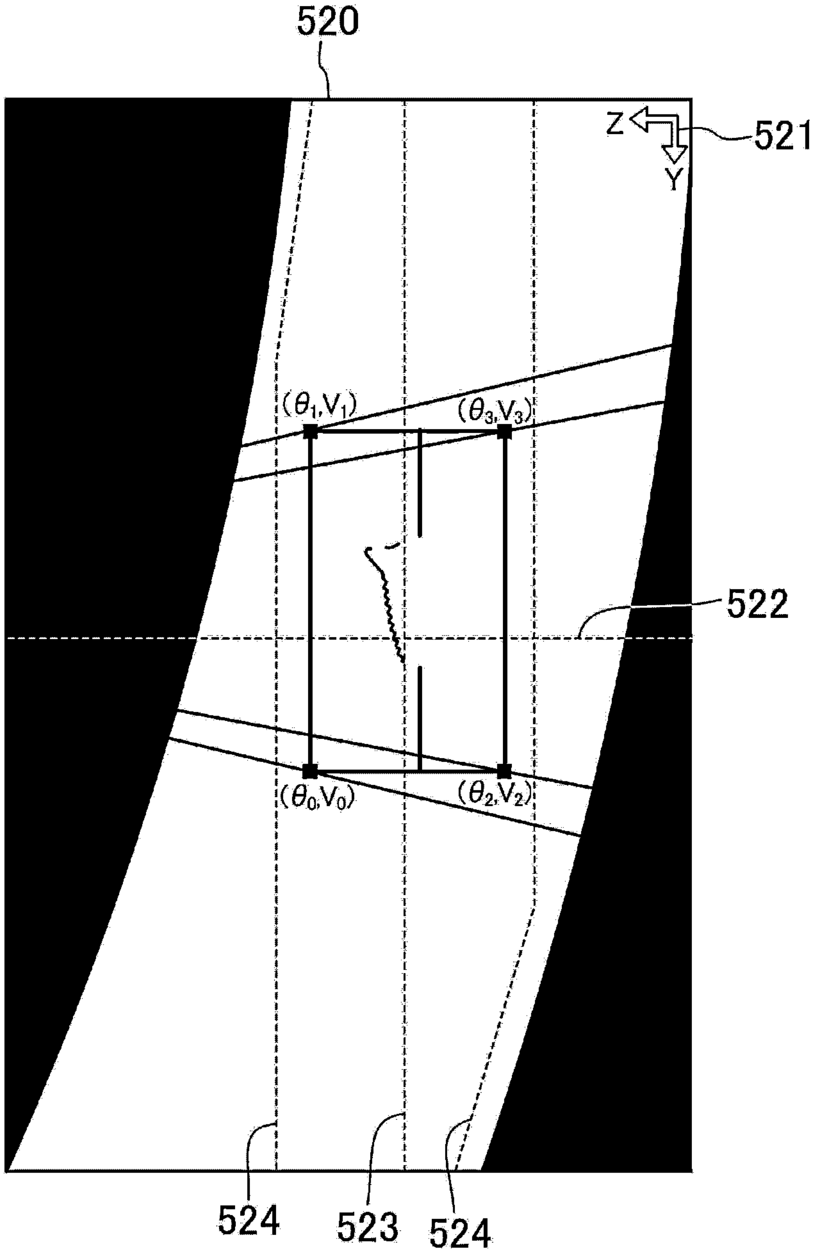
FIG. 22 is a diagram illustrating a case where YZ coordinates of the capture range are converted into a V coordinate and a rotation angle.
Figure 23:
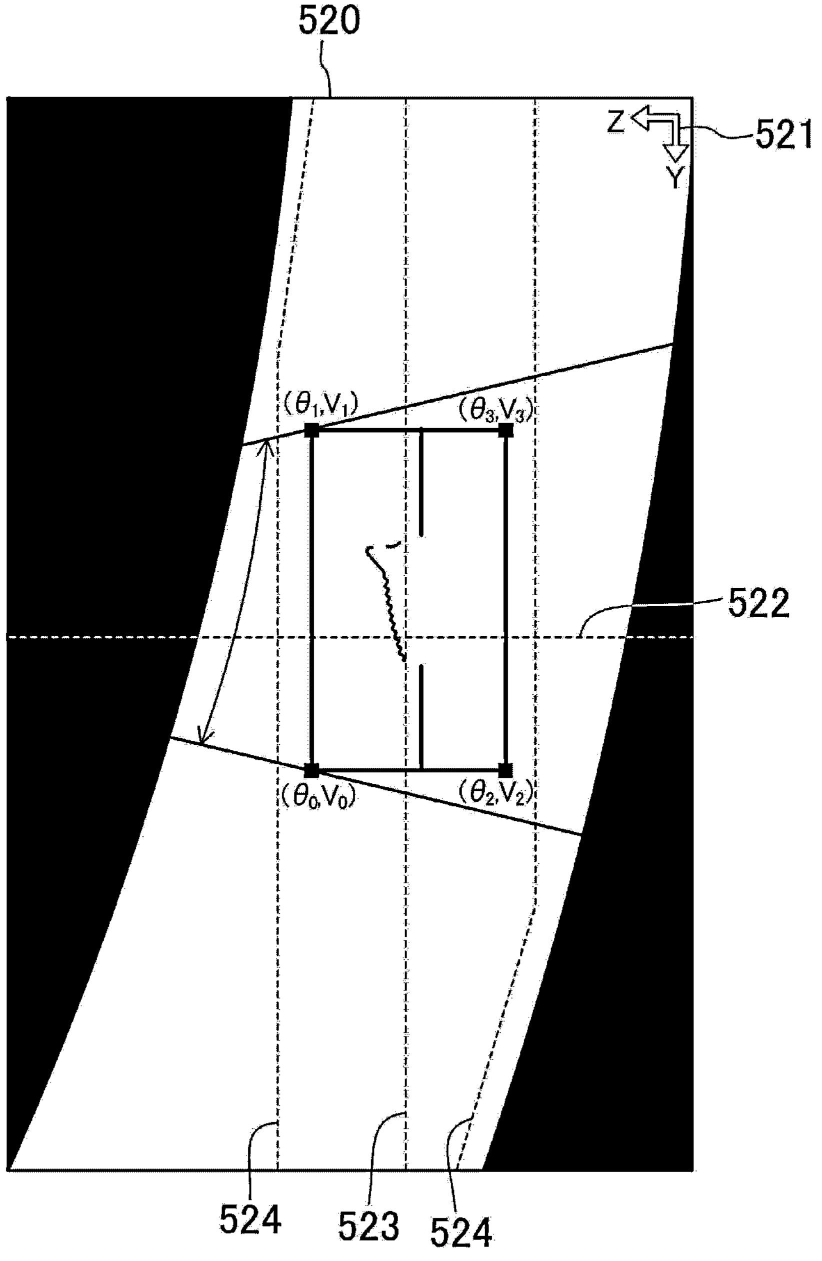
FIG. 23 is a diagram illustrating a state where a rotation angle range is determined.

The signal processing unit 32 converts the YZ coordinates for defining the capture range into a V coordinate and a rotation angle based on a predetermined conversion condition, and determines the rotation angle range of the light projecting and receiving module 10 based on the rotation angle. When the rotation angle range of the light projecting and receiving module 10 is determined, first, the signal processing unit 32 acquires the setting of the capture range received via the second screen 520. In this example, since the capture range is the rectangle, the signal processing unit 32 acquires the YZ coordinates of each of four points P0, P1, P2, and P3 for defining the capture range. After the YZ coordinates of each of the point P0, the point P1, the point P2, and the point P3 constituting the capture range are acquired, the signal processing unit 32 converts the YZ coordinates into the V coordinate and the rotation angle based on a predetermined conversion condition (illustrated in FIG. 22). The signal processing unit 32 determines the rotation angle range based on the rotation angles corresponding to the four points (illustrated in FIG. 23). In this example, a range from $\theta_0$ to $\theta_1$ is the rotation angle range. The YZ coordinates of each point can be converted into the V coordinate and the rotation angle by, for example, inverse conversion of linear correction when a measurement value is calculated.

Figure 24:
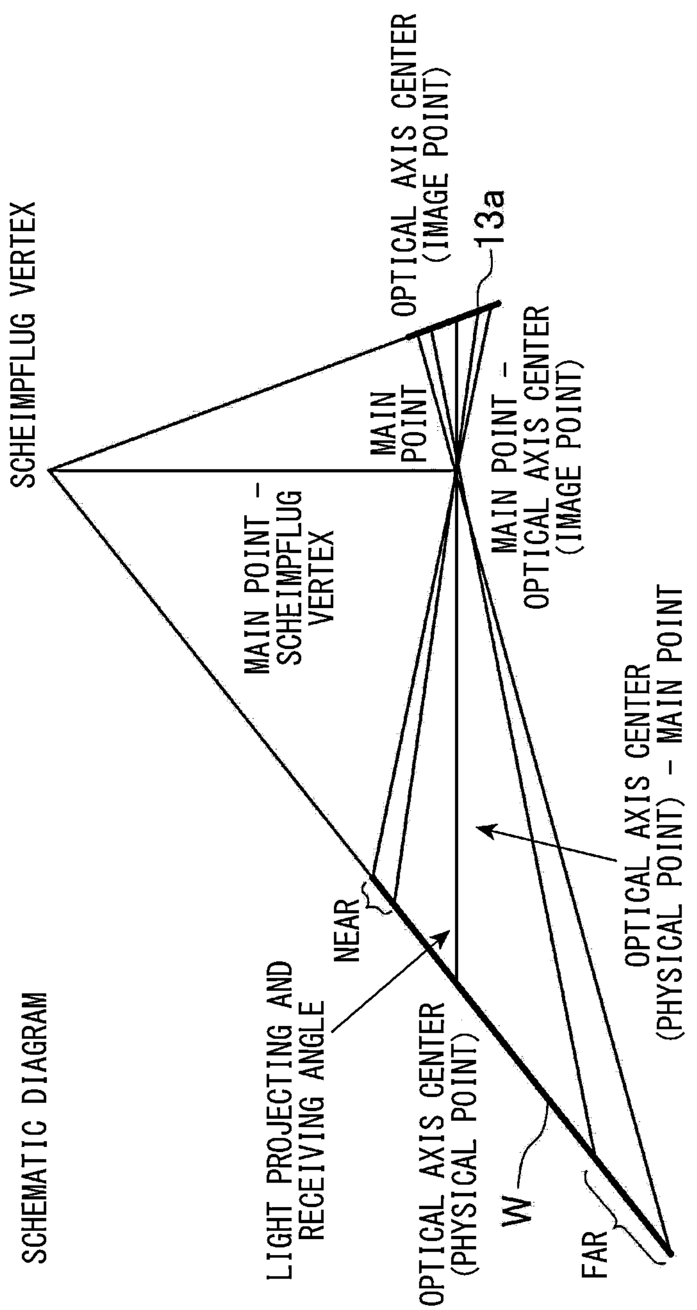
FIG. 24 is a schematic diagram of an optical system.

The capturing control unit 13*b* sets an output region of the light reception amount distribution in the image sensor 13*a* based on the rotation angle. As illustrated in FIG. 24, as a premise, in the optical displacement meter 1 that measures the sectional profile based on the principle of triangulation as in the present embodiment, a distance in a real space for one pixel on the image sensor 13*a* is different between a near side and a far side, and the distance indicated by one pixel is longer on the far side. In addition, the number of pixels in the V direction necessary for measuring a certain Z range (mm) also varies depending on the rotation angle of the light projecting and receiving module 10.

Figure 25:
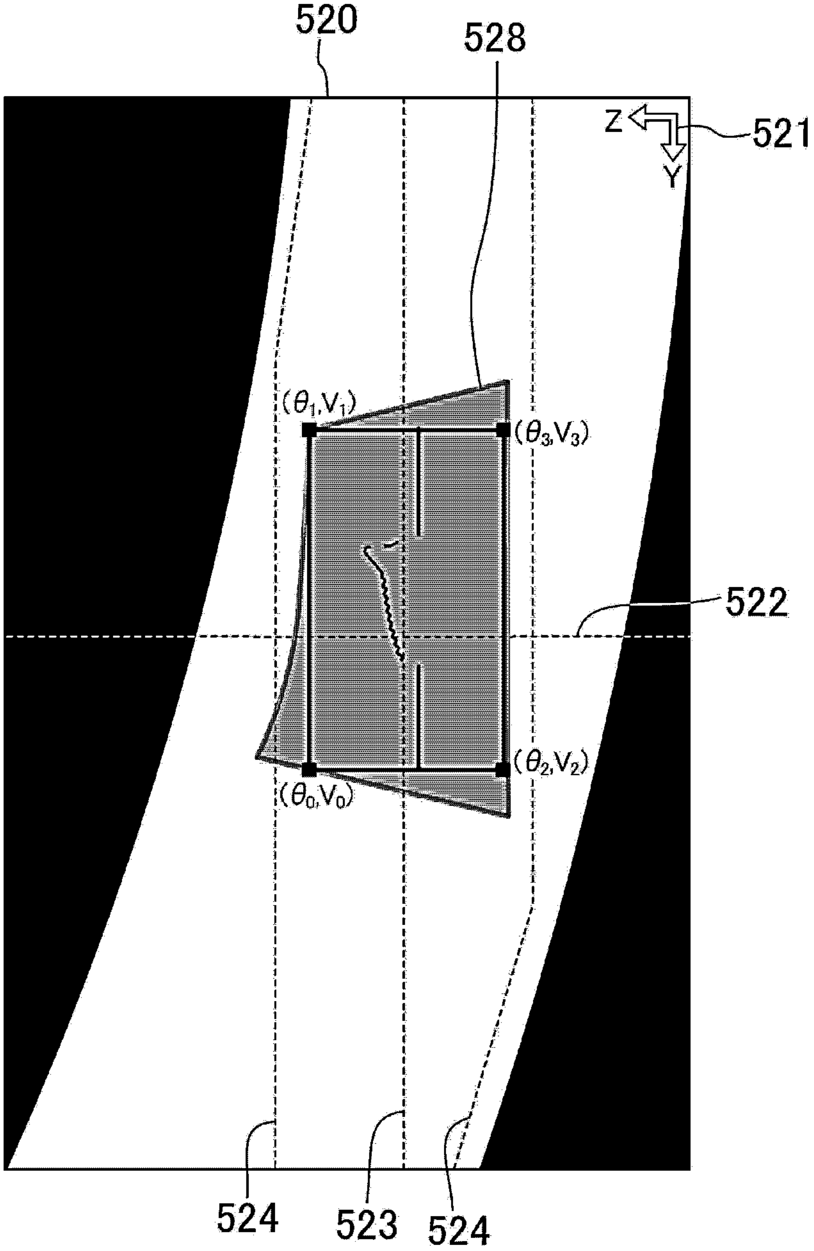
FIG. 25 is a diagram schematically illustrating a range in a case where the number of pixels in a V direction is constantly captured.

When the number of pixels in the V direction is constantly captured, a region indicated by reference numeral 528 in FIG. 25 is obtained. As described above, when a certain number of pixels is continuously captured in the V direction of the image sensor 13*a* within the rotation angle range of the light projecting and receiving module 10, since the measurement range in the Z direction has a complicated shape as viewed on the YZ plane, it is difficult for the user to handle. Specifically, since a measurable Z-direction height varies depending on the position in the Y direction, in a case where the workpiece W having the same height moves in the field of view, there are a case where the height can be measured and a case where the height cannot be measured. For example, since the workpiece W can be measured at the time of installation adjustment before the operation of the optical displacement system 1, the operation is started as it is. However, when the position of the workpiece W is disposed at a position different from the position at the time of the installation adjustment at the time of the operation, the workpiece W cannot be measured, and manual reworking may occur.

On the other hand, the capturing control unit 13*b* adjusts a capture start position and a capture end position in the Z direction to be flat as viewed on the YZ plane by calculating a necessary number of pixels at each rotation angle and dynamically switching the capture range of the image sensor 13*a*. That is, the image sensor 13*a* outputs only the light reception amount distribution of the pixel group included in the capture range among the plurality of pixels for each rotation angle corresponding to each capturing timing within the rotation angle range of the light projecting and receiving module 10. At this time, the image sensor 13*a* changes the pixel range of the pixel group that outputs the light reception amount distribution in the V direction for each rotation angle corresponding to each capturing timing based on a predetermined conversion condition to suppress variation in the Z-direction height of the capture range within the rotation angle range of the light projecting and receiving module 10.

Figure 26:
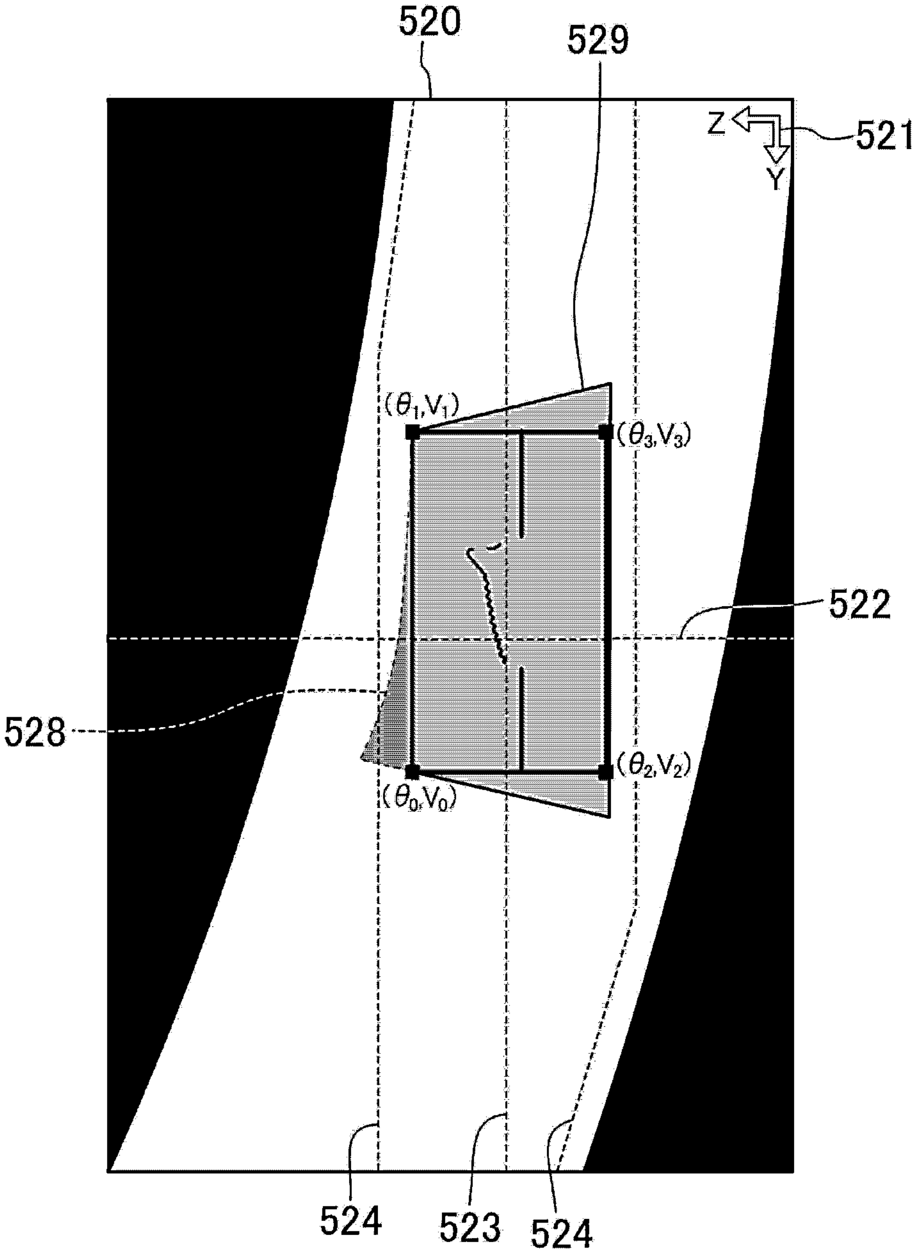
FIG. 26 is a diagram for explaining a case where the number of pixels in the V direction is changed.

As illustrated in FIG. 26, the number of captured pixels in the V direction is reduced in a lower portion of the region 528, and the number of captured pixels in the V direction is not reduced in an upper portion of the region 528. Thus, the capture start position and the capture end position in the Z direction can be adjusted to be flat as viewed on the YZ plane. An adjusted region is indicated by reference numeral 529. Not only the number of captured pixels of the image sensor 13*a* in the V direction but also the capture start position and the capture end position in the Z direction can be similarly adjusted.

As described above, the number of pixels captured from the image sensor 13*a* may be directly varied. However, as a modification, the number of pixels captured from the image sensor 13*a* may be maintained at a constant number without directly varying the number of pixels captured from the image sensor 13*a*, and a range to be masked may be adjusted in subsequent processing. In this case, in the image sensor 13*a*, the pixel range of the pixel group that outputs the light reception amount distribution in the V direction is fixed within the rotation angle range of the light projecting and receiving module 10. The signal processing unit 32 determines a row to be masked in the light reception amount distribution output from the pixel group of the image sensor 13*a* for each rotation angle corresponding to each capturing timing based on a predetermined conversion condition to suppress the variation in the Z-direction height of the capture range within the rotation angle range of the light projecting and receiving module 10. According to this modification, the user can set a handling measurement range.

Figure 27:
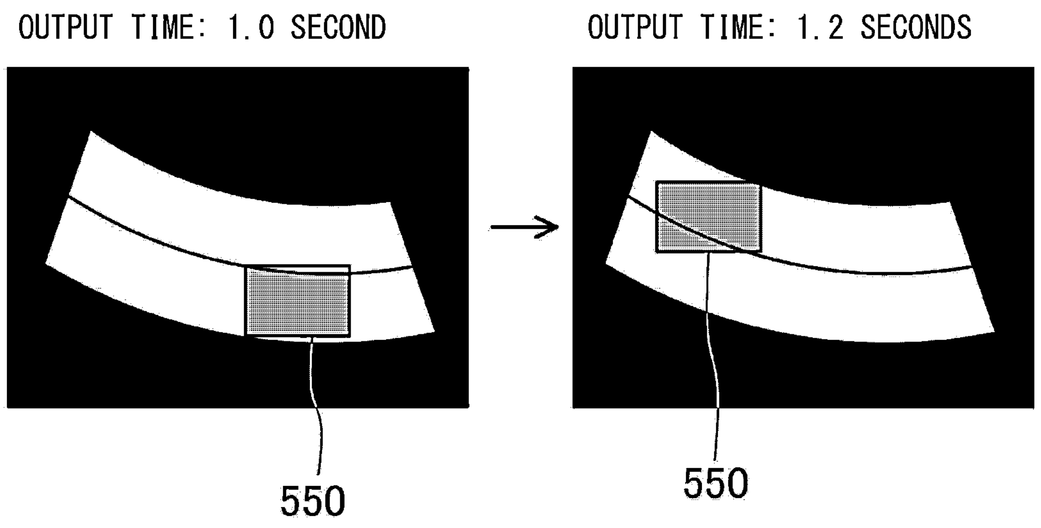
FIG. 27 is a diagram for explaining a difference in output time that changes in a case where parallel movement of the capture range is performed.

As described above, in an XYZ space, the number of captured pixels of the image sensor 13*a* in the V direction is different even in the capture range of the same size. A change in number of captured pixels influences a time required for processing of outputting the light reception amount distribution from the image sensor 13*a*, and may be a rate-limiting stage of the entire processing. In this case, as illustrated in FIG. 27, a takt of the entire processing varies by moving a capture range 550 while keeping the same size in the XYZ space. Specifically, a white region in FIG. 27 indicates the measurable range of the optical displacement meter 1. In a left diagram of FIG. 27, the capture range 550 is positioned on a lower side of the measurable range, but in a case where the capture range is moved to an upper side of the measurable range as illustrated in a right diagram of FIG. 27, a time (output time) required for the output processing of the light reception amount distribution from the image sensor 13*a* becomes longer by, for example, 0.2 seconds.

As described above, there is a correspondence relationship between a position of the capture range 550 and an output time, but this correspondence relationship may be inconvenient in a use case where setting is created in a state where a takt of the device is determined. On the other hand, in the present embodiment, in a case where the capture range 550 is moved, the Z-direction height of the capture range is automatically changed such that a difference in output time before and after the movement is reduced or eliminated.

Figure 28:
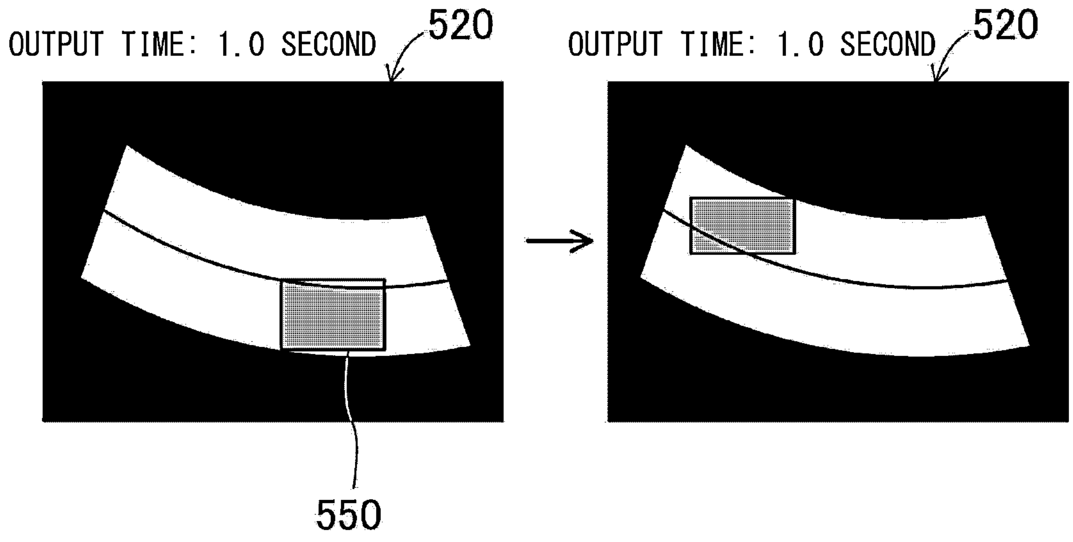
FIG. 28 is a diagram illustrating a case where a Z-direction height of the capture range after the parallel movement is changed to reduce the difference in output time.

That is, although FIG. 28 illustrates the second screen 520 of a setting screen 530, the setting screen 500 receives an instruction of parallel movement of the capture range via the second screen 520. For example, in a case where the capture range is the rectangle, the user operates the operation unit 3B to move four points for defining the capture range in the up-down direction and the left-right direction of the second screen 520, and thus, the instruction of parallel movement of the capture range can be received. In a left diagram of FIG. 28, the capture range 550 is positioned on a lower side of the measurable range, but the parallel movement of the capture range can be performed to an upper side of the measurable range as illustrated in a right diagram of FIG. 28.

The signal processing unit 32 changes the Z-direction height of the capture range 550 before and after the parallel movement based on a predetermined conversion condition to suppress a difference between the output time of the light reception amount distribution from the pixel group included in the capture range 550 before the parallel movement of the capture range 550 and the output time of the light reception amount distribution from the pixel group included in the capture range 550 after the parallel movement of the capture range 550. As illustrated in FIG. 28, when the output time of the light reception amount distribution from the pixel group included in the capture range 550 before the parallel movement of the capture range 550 is 1.0 second, the Z-direction height of the capture range 550 illustrated on the right side of FIG. 28 is lowered such that the output time of the light reception amount distribution from the pixel group included in the capture range 550 after the parallel movement can be set to 1.0 second. As a result, when the setting is created in a state where the takt of the device is determined, even though the capture range 550 is moved, since the output time of the light reception amount distribution from the image sensor 13*a* does not change, the setting can be easily created. Note that, the output time before the parallel movement of the capture range 550 and the output time after the parallel movement may not be exactly the same, and the Z-direction height of the capture range 550 may be changed such that the difference in output time between before and after the parallel movement is reduced. In addition, after the Z-direction height of the capture range 550 is automatically changed, the adjustment of the Z-direction height of the capture range 550 by the user may be allowed to be received.

Figure 29:
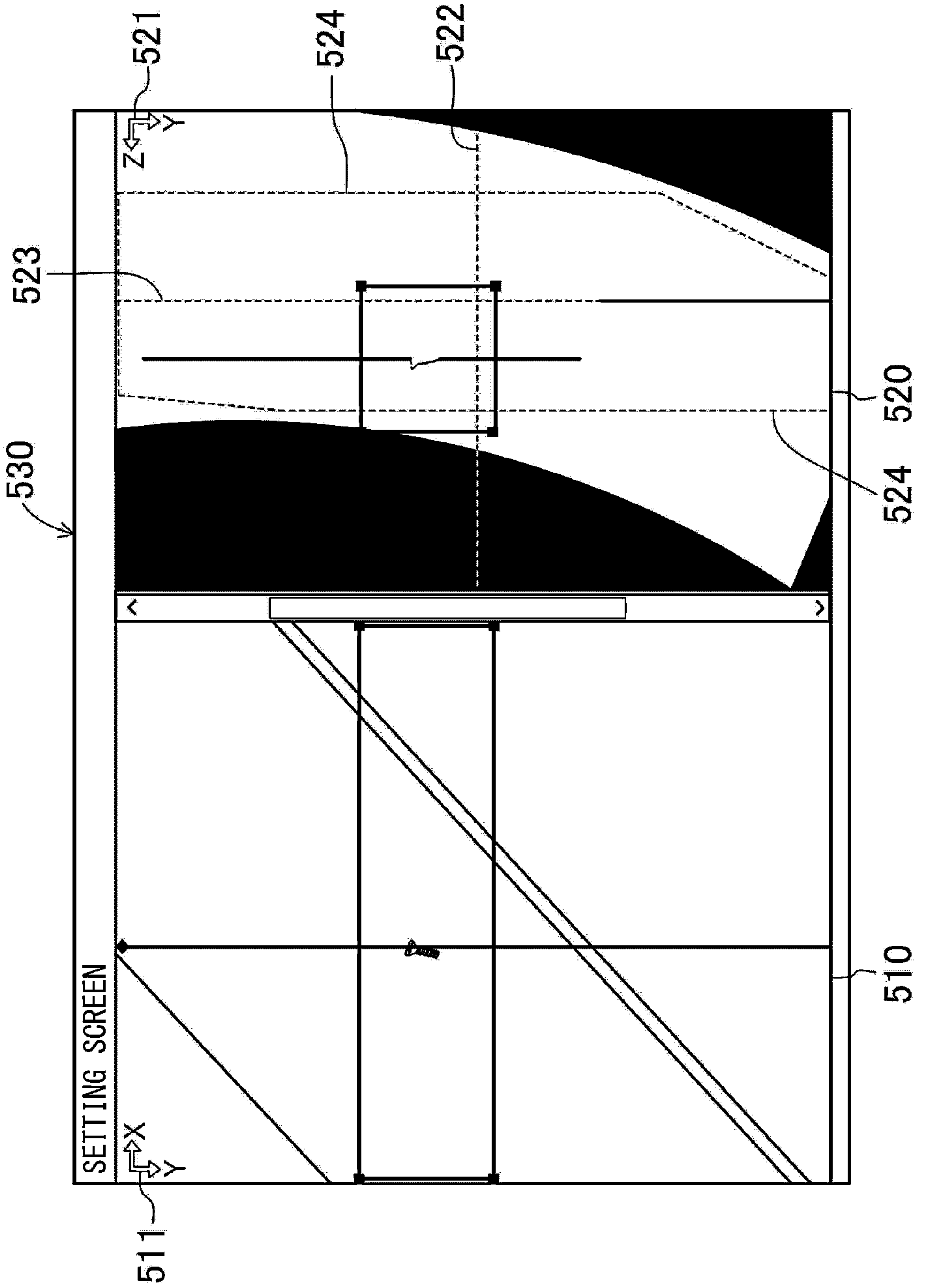
FIG. 29 is a diagram illustrating an example of a setting screen displaying a setting YZ sectional profile.

In a case where it is not known at which portion in the measurement range the workpiece W is disposed, it may be difficult to set the capture range. In such a case, in the present embodiment, three-dimensional measurement is executed in an entire maximum swing range of the light projecting and receiving module 10 regardless of setting of a capture range at a present point in time. Specifically, the motor control unit 30 swings the light projecting and receiving module 10 in a setting angle range wider than the rotation angle range corresponding to the capture range. As a result, the light projecting and receiving module 10 acquires a setting YZ sectional profile corresponding to the setting angle range. As illustrated in FIG. 29, the screen generation unit 38 generates a screen representing the setting YZ sectional profile on the second screen 520. The setting YZ sectional profile includes the YZ sectional profile of the capture range and a YZ sectional profile of a range wider than the capture range. The user can easily set the capture range by viewing the YZ sectional profile in the wider range.

(Flow of Capture Range Setting)

Figure 30:
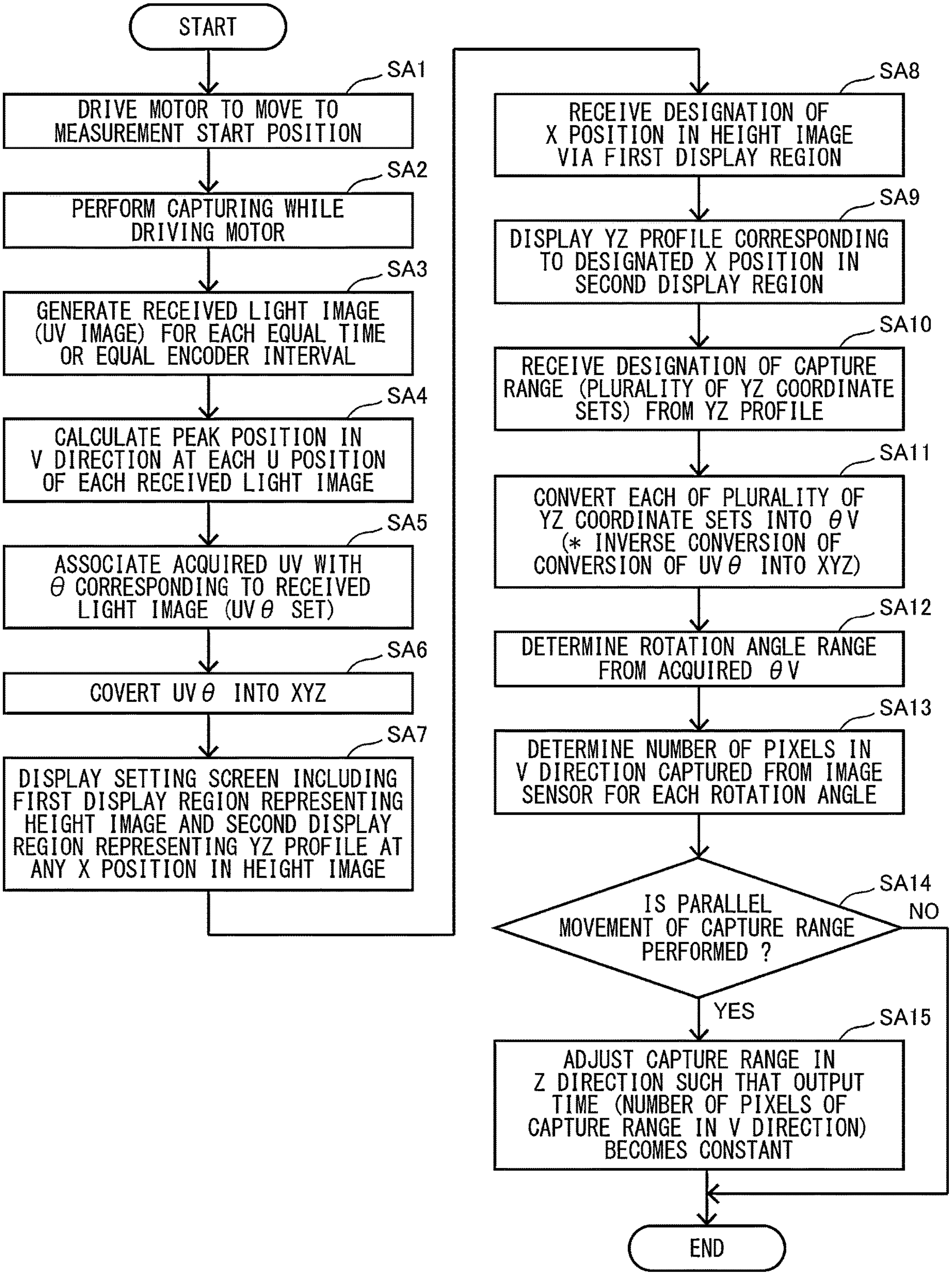
FIG. 30 is a flowchart illustrating an example of a flow of capture range setting processing.

FIG. 30 is a flowchart illustrating a flow of capture range setting processing. In step SA1, the motor control unit 30 drives the motor 20 to move the light projecting and receiving module 10 to a measurement start position. In step SA2, while the motor control unit 30 drives the motor 20 to swing the light projecting and receiving module 10, the light projecting unit 11 emits the slit light S1, and the capturing unit 13 acquires the plurality of received light images. The capturing may be performed at equal time intervals, at equal encoder intervals, at equal pitch intervals in the Y direction with respect to a certain distance in the Z direction, or the like. In step SA3, the capturing unit 13 generates the received light images at equal time intervals or at equal encoder intervals.

In step SA4, the signal processing unit 32 calculates a peak position in the V direction at each U position of each received light image. In step SA5, a set of UVθ is generated by associating the UV coordinates of the peak position acquired in the processing of step SA4 with θ corresponding to the received light image. In step SA6, UVθ is converted into XYZ coordinates. The conversion into the XYZ coordinates can be executed based on prior calibration information. Here, the peak position acquired in the processing of step SA4 may include a true peak position and a false peak position derived from noise such as multiple reflection. Processing of removing the false peak position from the UV coordinates may be executed in step SA4, or processing of removing the false peak position from the XYZ coordinates may be executed after the conversion into the XYZ coordinates including the false peak position is executed in step SA6. In addition, in step SA6, XY equal interval correction may be executed. That is, the signal processing unit 32 can calculate a corrected Z coordinate corresponding to corrected XY coordinates by executing the equal interval correction on the XY coordinates. The signal processing unit 32 creates, for example, a Z column with equal X coordinates from a (X, Z) column after profile adjustment. When interpolation points are obtained in a case where a Z column is created, first, effective points before and after an XZ profile are specified, and the interpolation points can be obtained by linear interpolation from the effective points. The equal interval correction is similarly performed in the Y direction, and thus, the corrected Z coordinate obtained by performing equal interval correction in both directions of the X direction and the Y direction can be calculated. The height image output unit 37 outputs the height image based on the corrected XYZ coordinates obtained by the equal interval correction. The XY equal interval correction is executed, and thus, subsequent image processing is facilitated. Further, visualization is also facilitated.

In step SA7, the screen generation unit 38 generates the setting screen 530 including the first screen 510 representing the height image and the second screen 520 representing the YZ sectional profile at any X position in the height image, and causes the display unit 3A to display the setting screen.

In step SA8, the designation of the X position in the height image is received via the first screen 510 displayed in step SA7. In step SA9, the screen generation unit 38 displays the YZ sectional profile corresponding to the X position designated in step SA8 on the second screen 520. In step SA10, the signal processing unit 32 receives the designation of the capture range (a plurality of YZ coordinate sets) from the YZ sectional profile. In step SA11, the signal processing unit 32 converts each of the plurality of YZ coordinate sets into θV by performing inverse conversion of XYZ conversion from UVθ.

In step SA12, the signal processing unit 32 determines the rotation angle range of the light projecting and receiving module 10 from θV acquired in step SA11. In step SA13, the number of pixels in the V direction captured from the image sensor 13*a* is determined for each rotation angle of the light projecting and receiving module 10. When the number of pixels in the V direction is determined for each rotation angle of the light projecting and receiving module 10, for example, the number of pixels in the V direction can be calculated from information of a conversion table for converting UVθ into XYZ coordinates. Note that, the number of pixels is not limited, and a pixel range in the V direction captured from the image sensor 13*a* may be determined.

In step SA14, the signal processing unit 32 determines whether or not the parallel movement of the capture range is performed (illustrated in FIG. 28). In a case where the parallel movement of the capture range is performed, processing proceeds to step SA15, and the Z-direction height of the capture range is adjusted such that the output time (the number of pixels of the capture range in the V direction) becomes constant before and after the parallel movement, and the capture range after the adjustment is presented to the user.

(Display of Received Light Image)

In the present embodiment, the received light image can be displayed on the display unit 3A. For example, for accuracy of three-dimensional measurement by the optical displacement meter 1 and setting adjustment of the optical displacement meter 1, it may be desired to observe the received light image of the image sensor 13*a* when any section is acquired. In such a case, any section can be easily acquired by moving the light projecting and receiving module 10 to a desired position.

Figure 31:
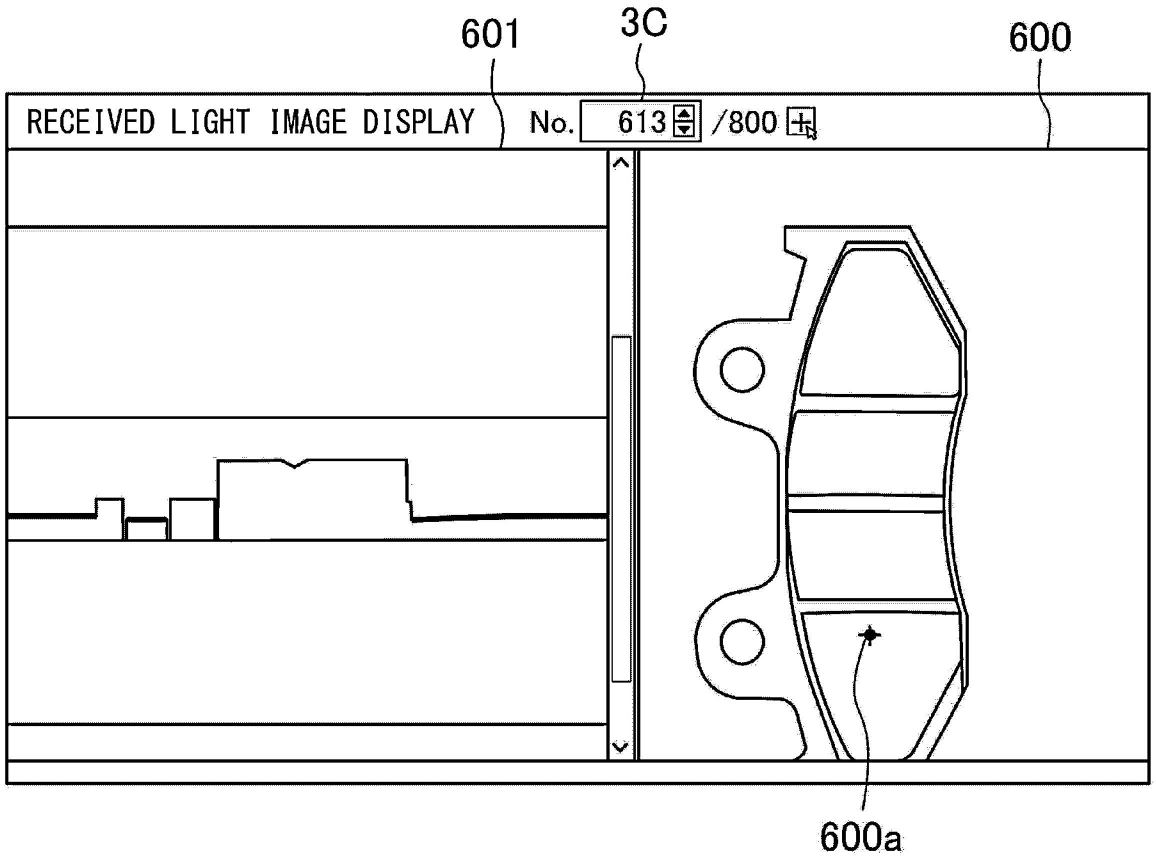
FIG. 31 is a diagram illustrating an example of a screen illustrating a received light image and a height image.

Hereinafter, a configuration in which the received light image is displayed on the display unit 3A will be specifically described. The screen generation unit 38 acquires the light reception amount distribution output from the image sensor 13*a*, and thus, a screen 600 representing the height image illustrated in FIG. 31 is generated. The screen 600 is common to the first screen 510 in FIG. 20 in that the height image is represented. The screen 600 receives designation of one point in the height image. For example, the user operates the operation unit 3B, and thus, a point 600*a* can be disposed at any position on the height image displayed on the screen 600. The point 600*a* is disposed, and thus, the designation of one point in the height image is received.

The signal processing unit 32 acquires the rotation angle of the light projecting and receiving module 10 corresponding to the XYZ coordinates of one point (point 600*a*) based on the predetermined conversion condition described above. The motor control unit 30 controls the motor 20 to move the light projecting and receiving module 10 to a position corresponding to the rotation angle acquired by the signal processing unit 32. The light projecting and receiving module 10 acquires the received light image at the position corresponding to the rotation angle. The screen generation unit 38 generates a screen 601 representing the received light image and displays the screen on the display unit 3A.

The signal processing unit 32 can further acquire the pixel range in the V direction corresponding to the rotation angle of the light projecting and receiving module 10 based on the predetermined conversion condition. In this case, the screen generation unit 38 can display the received light image in which the light reception amount distribution corresponding to the pixel range in the V direction is specified. The motor control unit 30 can move the light projecting and receiving module 10 to the rotation angle at which the received light image is acquired in a procedure of generating the height image.

The rotation angle of the light projecting and receiving module 10 can also be designated by the user. As illustrated in FIGS. 18 and 31, the optical displacement meter 1 includes a rotation angle designation unit 3C that receives the designation of the rotation angle of the light projecting and receiving module 10. The rotation angle designation unit 3C can receive the designation of the rotation angle of the light projecting and receiving module 10 by designating, by the user, a profile number in the measurement range by the light projecting and receiving module 10. As an example, in FIG. 31, a 613-th profile number among a total of 800 profiles is designated. Profile numbers can be assigned in the order in which profiles are acquired. In this case, since the height image is not necessary to designate the rotation angle, and the height image may not be originally generated, the screen generation unit 38 may omit the screen 600 and may generate only the screen 601. The screen generation unit 38 displays the received light image corresponding to the rotation angle designated by the rotation angle designation unit 3C on the display unit 3A. Specifically, when a change in the rotation angle of the light projecting and receiving module 10 is received, the motor control unit 30 controls the motor 20 to move the light projecting and receiving module to have the changed rotation angle, and displays the received light image captured by the image sensor 13*a* at the moved position on the display unit 3A. In addition, coordinates (X, Y, Z) of any point on the height image are designated, any section including the coordinates can be calculated by using the same logic as the inverse conversion of the linear correction described above. As a result, for example, a section in which noise is generated can be observed at pinpoints.

(Display Flow of Received Light Image)

Figure 32:
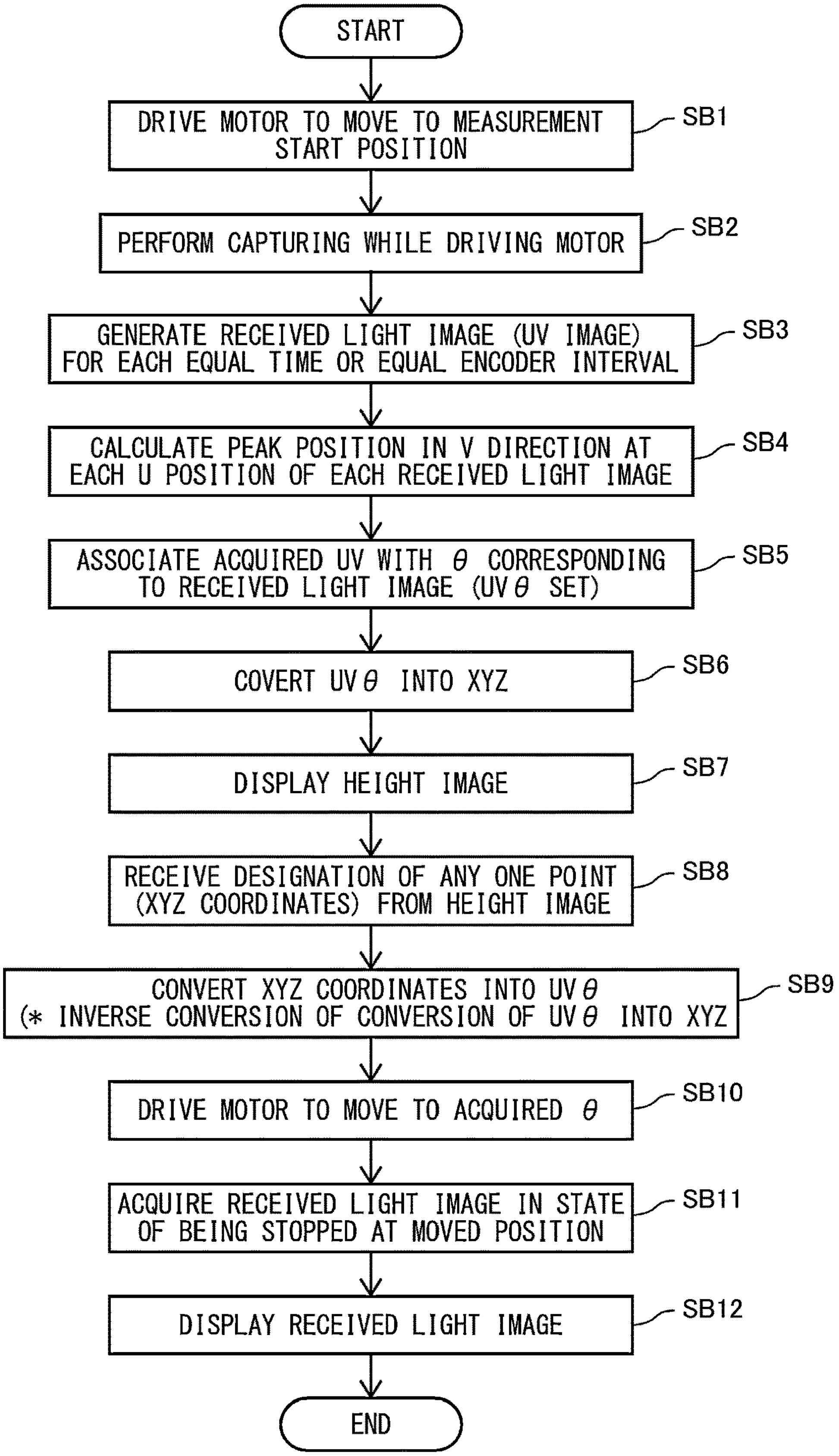
FIG. 32 is a flowchart illustrating an example of a flow of display processing of the received light image.

FIG. 32 is a flowchart illustrating an example of a flow of display processing of the received light image. Steps SB1 to SB6 are the same as steps SA1 to SA6 in FIG. 30, respectively. In step SB7, the screen generation unit 38 displays the height image on the display unit 3A. In step SB8, the signal processing unit 32 receives the designation of one point in the height image displayed in step SB7. In step SB9, the XYZ coordinates of one point received by the signal processing unit 32 are converted into UVθ. In step SB10, the motor control unit 30 drives the motor 20 to move the light projecting and receiving module 10 to θ acquired in step SB9.

In step SB11, the motor control unit 30 stops the light projecting and receiving module 10 at the moved position, and the capturing unit 13 acquires the received light image in the stopped state. In step SB12, the screen generation unit 38 displays the received light image acquired in step SB11 on the display unit 3A. For example, it is conceivable that the received light image is stored in association with θ in step SB2 and the received light image corresponding to the acquired θ is read out at a subsequent stage. However, when all pieces of received light image information are stored, since an information amount is too large and an enormous memory is required, capturing is performed again in step SB11.

(Housing Structure)

Figure 33:
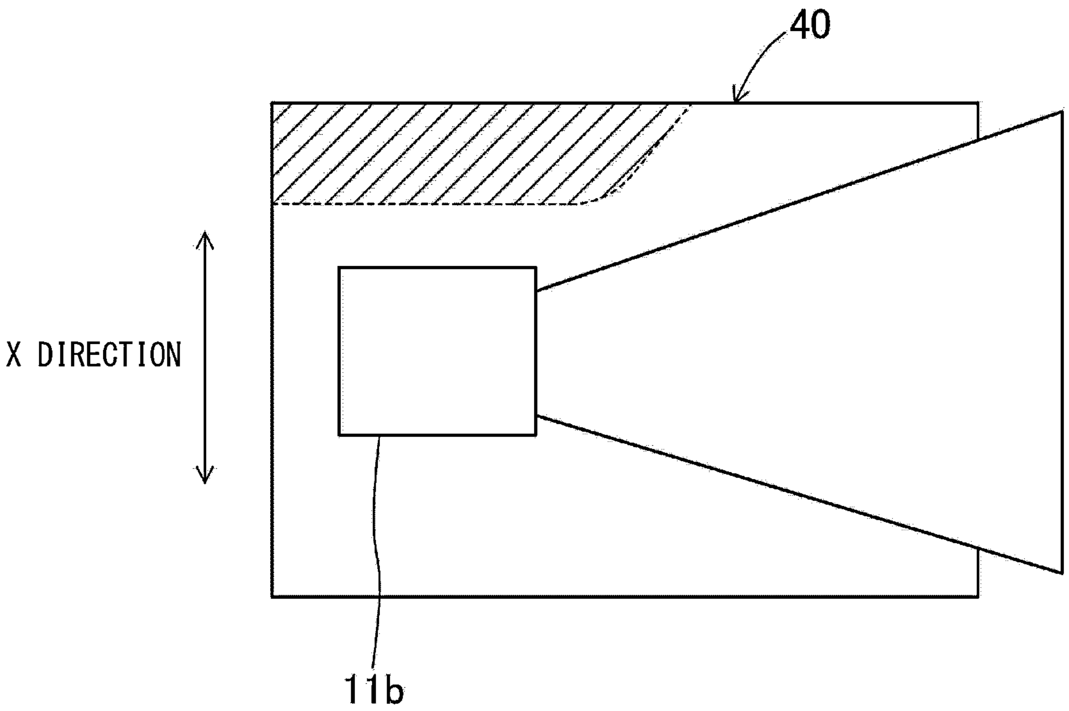
FIG. 33 is a diagram illustrating a case where a housing has a simple rectangular parallelepiped shape.

As illustrated in FIG. 33, a size required as an outer shape of a housing 40 is defined by a field-of-view range of an optical system 11*b*. In addition, since there is an angle of view in the optical system 11*b*, there is a spread of a field-of-view range having a constant inclination with respect to an optical axis, and as illustrated in FIG. 33, a volumetrically useless region (shaded portion) is generated to satisfy the field-of-view range with a simple rectangular parallelepiped shape as the outer shape of the housing 40.

Figure 34:
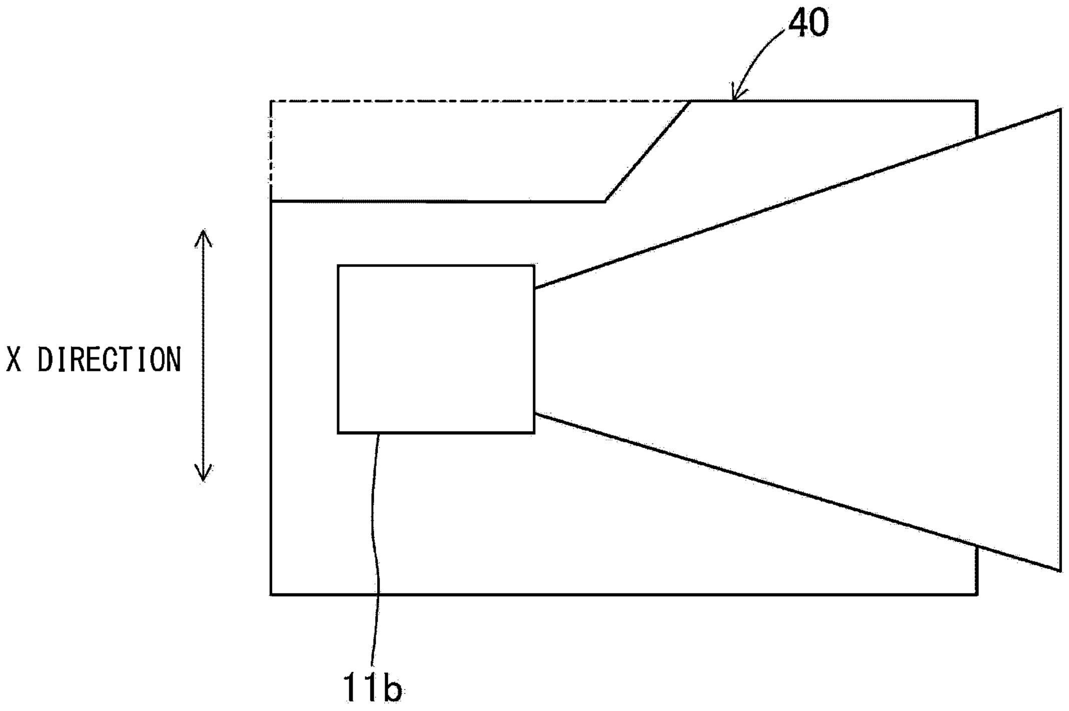
FIG. 34 is a diagram according to a first example in which a thickness of the housing is partially reduced.

On the other hand, as illustrated in FIG. 34 as a first example, in the present embodiment, one side of the housing 40 in a thickness direction is formed in a shape partially scraped, and thus, the volumetrically useless region is removed to form the housing 40. That is, when the thickness direction of the housing 40 is the X direction, a difference can be provided in a thickness between an end portion on an irradiation direction side of the slit light in the housing 40 and an end portion on a side opposite to the irradiation direction in the housing 40. Specifically, the housing 40 can have a first thickness in the X direction at the end portion on the irradiation direction side of the slit light, and a second thickness smaller than the first thickness in the X direction at the end portion on the side opposite to the irradiation direction. As described above, the end portion of the housing 40 on the side opposite to the irradiation direction is set to be relatively thin, and thus, it is possible to eliminate or reduce the volumetrically useless region.

Figure 35:
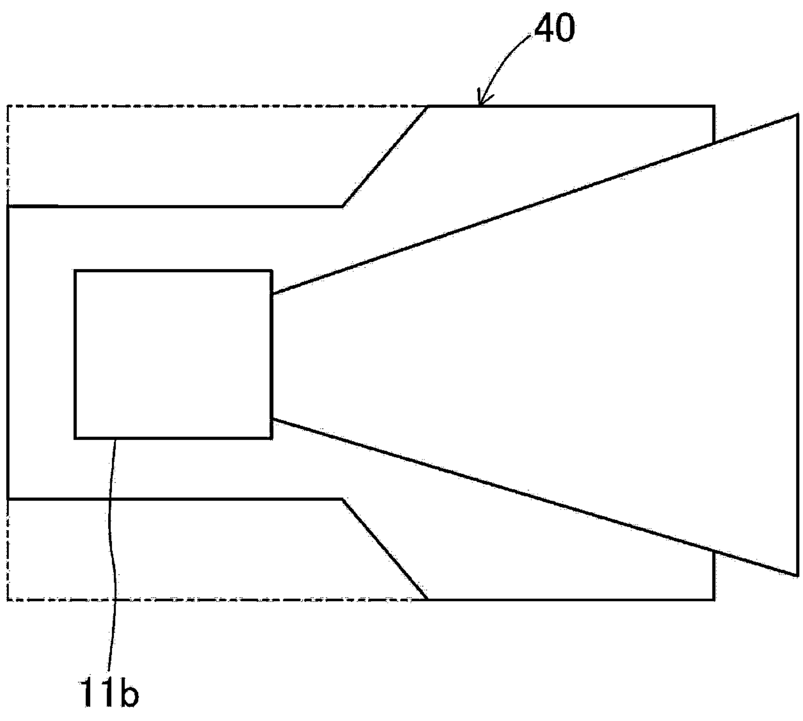
FIG. 35 is a diagram according to a second example in which the thickness of the housing is partially reduced.

In addition, as illustrated in FIG. 35 as a second example, both sides of the housing 40 in the thickness direction may be partially scraped. As a result, it is possible to further reduce the volumetrically useless region.

As described above, the optical displacement meter according to the disclosure can be used, for example, in a case where three-dimensional shape data of a workpiece is acquired.

What is claimed is:

1. An optical displacement meter comprising:

a light projecting and receiving module including a light projecting unit that applies slit light extending in an X direction, a light collecting unit that has a light receiving lens which collects reflected light reflected by a workpiece, a capturing unit that receives the light collected by the light collecting unit, and a support member which integrally holds the light projecting unit, the light collecting unit, and the capturing unit to have a Scheimpflug relationship in which a light receiving surface of the capturing unit is inclined with respect to an optical axis of the light receiving lens;

a motor that integrally rotates the light projecting and receiving module;

a housing that stores the light projecting and receiving module; and a control unit that controls the motor, and rotates the light projecting and receiving module in a state where the Scheimpflug relationship is maintained inside the housing to scan the slit light in a direction orthogonal to the X direction; and a weight unit, wherein the light projecting unit and the light collecting unit of the light projecting and receiving module are provided in a radial direction of a rotation shaft of the light projecting and receiving module, and the light collecting unit is heavier than the light projecting unit, and the weight unit is provided at a position closer to the light projecting unit than the light collecting unit in the light projecting and receiving module to suppress a deviation between a gravity center position and the rotation shaft of the light projecting and receiving module caused by a difference in weight between the light projecting unit and the light collecting unit on a YZ plane orthogonal to the X direction.

2. The optical displacement meter according to claim 1, wherein the rotation shaft of the light projecting and receiving module is disposed to substantially coincide with a gravity center position of the light projecting and receiving module on the YZ plane orthogonal to the X direction.

3. The optical displacement meter according to claim 1, wherein the light projecting unit has a light source and a light source housing that stores the light source, the light collecting unit further has a lens housing that stores the light receiving lens, the light projecting unit and the light collecting unit of the light projecting and receiving module are provided at intervals in the radial direction of the rotation shaft of the light projecting and receiving module, and a volume of the light source housing is smaller than a volume of the lens housing, and the light source housing is made of a maternal having a higher density than the lens housing to suppress a deviation between a gravity center position and the rotation shaft of the light projecting and receiving module caused by a difference in weight between the light projecting unit and the light collecting unit on the YZ plane orthogonal to the X direction.

4. The optical displacement meter according to claim 1, wherein the light projecting and receiving module further includes a reflecting member that is disposed on an optical path of the light collected by the light collecting unit and reflects the collected light toward the capturing unit such that a distance from the rotation shaft of the light projecting and receiving module to the capturing unit is shortened, and the support member integrally holds the reflecting member together with the light projecting unit, the light collecting unit, and the capturing unit to have the Scheimpflug relationship.

5. The optical displacement meter according to claim 1, wherein the light projecting and receiving module further includes a reflecting member that is disposed on an optical path of the reflected light reflected by the workpiece and reflects the reflected light to the light collecting unit such that a distance from the rotation shaft of the light projecting and receiving module to the light collecting unit is shortened, and the support member integrally holds the reflecting member together with the light projecting unit, the light collecting unit, and the capturing unit to have the Scheimpflug relationship.

6. The optical displacement meter according to claim 1, wherein, as viewed along the rotation shaft, the rotation shaft of the light projecting and receiving module is disposed at a position overlapping with the light collecting unit or between the light projecting unit and the light collecting unit.

7. The optical displacement meter according to claim 1, further comprising a bearing that supports the rotation shaft of the light projecting and receiving module, wherein a moment load generated by a difference between a portion of the rotation shaft supported by the bearing and a gravity center position of the light projecting and receiving module is supported by the bearing.

8. The optical displacement meter according to claim 1, further comprising an optical encoder that detects a rotation angle of the rotation shaft of the light projecting and receiving module, wherein the optical encoder is stored in a sealed space in the housing to prevent entrance of a foreign substance from an outside of the housing and entrance of a foreign substance from a space in which the light projecting and receiving module is stored and rotated.

9. The optical displacement meter according to claim 1, wherein the light projecting and receiving module has a dimension which would cause the light projecting and receiving module to come into contact with an inner wall of the housing on the YZ plane orthogonal to the X direction if the light projecting and receiving module were rotated to a first rotation angle, and a rotation angle range of the light projecting and receiving module rotating at the time of measurement is set to a predetermined angle range smaller than the first rotation angle in order to avoid the contact of the light projecting and receiving module with the inner wall of the housing.

10. The optical displacement meter according to claim 9, wherein the control unit controls the motor to avoid the contact of the light projecting and receiving module with the inner wall of the housing by rotating the light projecting and receiving module within the predetermined angle range at the time of measurement.

11. The optical displacement meter according to claim 9, wherein a stopper that prevents the light projecting and receiving module from rotating to the first rotation angle which is an outside of the predetermined angle range and contacting into contact with the inner wall of the housing is provided inside the housing.

12. An optical displacement meter comprising:

a light projecting and receiving module including a light projecting unit that applies slit light extending in an X direction, a light collecting unit that has a light receiving lens which collects reflected light reflected by a workpiece, a capturing unit that receives the light collected by the light collecting unit, and a support member which integrally holds the light projecting unit, the light collecting unit, and the capturing unit to have a Scheimpflug relationship in which a light receiving surface of the capturing unit is inclined with respect to an optical axis of the light receiving lens;

a motor that integrally rotates the light projecting and receiving module;

a housing that stores the light projecting and receiving module; and a control unit that controls the motor, and rotates the light projecting and receiving module in a state where the Scheimpflug relationship is maintained inside the housing to scan the slit light in a direction orthogonal to the X direction, wherein the light projecting unit has a light source and a light source housing that stores the light source, the light collecting unit further has a lens housing that stores the light receiving lens, the light projecting unit and the light collecting unit of the light projecting and receiving module are provided at intervals in a radial direction of a rotation shaft of the light projecting and receiving module, and a volume of the light source housing is smaller than a volume of the lens housing, and the light source housing is made of a maternal having a higher density than the lens housing to suppress a deviation between a gravity center position and the rotation shaft of the light projecting and receiving module caused by a difference in weight between the light projecting unit and the light collecting unit on a YZ plane orthogonal to the X direction.

13. The optical displacement meter according to claim 12, wherein the rotation shaft of the light projecting and receiving module is disposed to substantially coincide with a gravity center position of the light projecting and receiving module on the YZ plane orthogonal to the X direction.

14. The optical displacement meter according to claim 12, wherein the light projecting and receiving module further includes a reflecting member that is disposed on an optical path of the light collected by the light collecting unit and reflects the collected light toward the capturing unit such that a distance from the rotation shaft of the light projecting and receiving module to the capturing unit is shortened, and the support member integrally holds the reflecting member together with the light projecting unit, the light collecting unit, and the capturing unit to have the Scheimpflug relationship.

15. The optical displacement meter according to claim 12, wherein the light projecting and receiving module further includes a reflecting member that is disposed on an optical path of the reflected light reflected by the workpiece and reflects the reflected light to the light collecting unit such that a distance from the rotation shaft of the light projecting and receiving module to the light collecting unit is shortened, and the support member integrally holds the reflecting member together with the light projecting unit, the light collecting unit, and the capturing unit to have the Scheimpflug relationship.

16. The optical displacement meter according to claim 12, wherein, as viewed along the rotation shaft, the rotation shaft of the light projecting and receiving module is disposed at a position overlapping with the light collecting unit or between the light projecting unit and the light collecting unit.

17. An optical displacement meter comprising:

a light projecting and receiving module including a light projecting unit that applies slit light extending in an X direction, a light collecting unit that has a light receiving lens which collects reflected light reflected by a workpiece, a capturing unit that receives the light collected by the light collecting unit, and a support member which integrally holds the light projecting unit, the light collecting unit, and the capturing unit to have a Scheimpflug relationship in which a light receiving surface of the capturing unit is inclined with respect to an optical axis of the light receiving lens;

a motor that integrally rotates the light projecting and receiving module;

a housing that stores the light projecting and receiving module; and a control unit that controls the motor, and rotates the light projecting and receiving module in a state where the Scheimpflug relationship is maintained inside the housing to scan the slit light in a direction orthogonal to the X direction, wherein as viewed along a rotation shaft, the rotation shaft of the light projecting and receiving module is disposed at a position overlapping with the light collecting unit.

18. The optical displacement meter according to claim 17, wherein the rotation shaft of the light projecting and receiving module is disposed to substantially coincide with a gravity center position of the light projecting and receiving module on a YZ plane orthogonal to the X direction.

19. The optical displacement meter according to claim 17, wherein the light projecting and receiving module further includes a reflecting member that is disposed on an optical path of the light collected by the light collecting unit and reflects the collected light toward the capturing unit such that a distance from the rotation shaft of the light projecting and receiving module to the capturing unit is shortened, and the support member integrally holds the reflecting member together with the light projecting unit, the light collecting unit, and the capturing unit to have the Scheimpflug relationship.

20. The optical displacement meter according to claim 17, wherein the light projecting and receiving module further includes a reflecting member that is disposed on an optical path of the reflected light reflected by the workpiece and reflects the reflected light to the light collecting unit such that a distance from the rotation shaft of the light projecting and receiving module to the light collecting unit is shortened, and the support member integrally holds the reflecting member together with the light projecting unit, the light collecting unit, and the capturing unit to have the Scheimpflug relationship.

* * * * *